(12) United States Patent
Huerta et al.

(10) Patent No.: US 10,781,022 B2
(45) Date of Patent: Sep. 22, 2020

(54) EASY OPENING PACKAGING ARTICLE MADE FROM HEAT-SHRINKABLE FILM EXHIBITING DIRECTIONAL TEAR

(71) Applicant: Cryovac, LLC, Charlotte, NC (US)

(72) Inventors: Diana L. Huerta, Tega Cay, SC (US); Robert A. Odabashian, Greer, SC (US); Stephen F. Compton, Spartanburg, SC (US); Sumita Ranganathan, Simpsonville, SC (US); Michael J. Rosinski, Fort Mill, SC (US); H. Walker Stockley, Clover, SC (US); Scott C. Bossong, Greer, SC (US); Richard K. Watson, Fort Mill, SC (US)

(73) Assignee: Cryovac, LLC, Charlotte, NC (US)

( * ) Notice: Subject to any disclaimer, the term of this patent is extended or adjusted under 35 U.S.C. 154(b) by 0 days.

(21) Appl. No.: 16/220,047

(22) Filed: Dec. 14, 2018

(65) Prior Publication Data

US 2019/0135514 A1 May 9, 2019

Related U.S. Application Data

(63) Continuation of application No. 12/313,396, filed on Nov. 20, 2008, now Pat. No. 10,202,229, which is a
(Continued)

(51) Int. Cl.
*B65D 75/00* (2006.01)
*B65D 75/58* (2006.01)
(Continued)

(52) U.S. Cl.
CPC ............ *B65D 75/5805* (2013.01); *B32B 3/02* (2013.01); *B32B 3/266* (2013.01); *B32B 7/05* (2019.01);
(Continued)

(58) Field of Classification Search
CPC .............. B65D 75/5805; B65D 75/002; B65D 81/2023; B32B 7/05; B32B 3/02;
(Continued)

(56) References Cited

U.S. PATENT DOCUMENTS

| 3,516,537 A | 6/1970 | Dreyfus et al. |
| 3,815,810 A | 6/1974 | Wellman |

(Continued)

FOREIGN PATENT DOCUMENTS

| EP | 0940251 | 9/1999 |
| EP | 0957044 | 11/1999 |

(Continued)

OTHER PUBLICATIONS

ASTM D 638-00, Standard Test Method for Tensile Properties of Plastics, pp. 1-13.
(Continued)

*Primary Examiner* — Peter N Helvey
(74) *Attorney, Agent, or Firm* — Jason R. Womer

(57) ABSTRACT

A heat-shrinkable packaging article has one or more tear initiators for initiating a manual tear that can be propagated to open a package and allow a product to be readily removed therefrom, without the use of a knife or scissors or any other implement. The tear initiators are present in a skirt and/or header of the article. The skirt and/or header has a first side and a second side. In one embodiment, some or all of the first side of the skirt and/or header can be heatset in order to reduce the shrink and curling of the skirt and/or header. This improves identification and utilization of the tear initiators by a consumer upon shrinking the packaging article around the product. In another embodiment, the skirt and/or header has a plurality of pairs of tear initiators to allow portions of the package to be torn off to expose a portion of the product that can then be sliced off while the remainder of the
(Continued)

packaged product remains covered by a remainder of the film.

20 Claims, 36 Drawing Sheets

Related U.S. Application Data continuation-in-part of application No. 11/895,960, filed on Aug. 28, 2007, now Pat. No. 10,189,621.

(60) Provisional application No. 60/931,270, filed on May 21, 2007.

(51) Int. Cl.
| | | |
|---|---|---|
| *B32B 7/05* | (2019.01) | |
| *B32B 27/08* | (2006.01) | |
| *B32B 27/32* | (2006.01) | |
| *B32B 27/18* | (2006.01) | |
| *B32B 27/20* | (2006.01) | |
| *B32B 27/30* | (2006.01) | |
| *B32B 27/34* | (2006.01) | |
| *B32B 27/36* | (2006.01) | |
| *B32B 3/02* | (2006.01) | |
| *B32B 3/26* | (2006.01) | |
| *B65D 81/20* | (2006.01) | |

(52) U.S. Cl.
CPC .............. *B32B 27/08* (2013.01); *B32B 27/18* (2013.01); *B32B 27/20* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B65D 75/002* (2013.01); *B65D 81/2023* (2013.01); *B32B 2270/00* (2013.01); *B32B 2307/558* (2013.01); *B32B 2307/7242* (2013.01); *B32B 2307/7244* (2013.01); *B32B 2307/736* (2013.01); *B32B 2439/06* (2013.01); *B32B 2439/46* (2013.01); *B32B 2439/70* (2013.01)

(58) Field of Classification Search
CPC ......... B32B 3/266; B32B 27/08; B32B 27/18; B32B 27/20; B32B 27/302; B32B 27/304; B32B 27/306; B32B 27/308; B32B 27/32; B32B 27/34; B32B 27/36; B32B 27/365
USPC ........................................................ 383/207
See application file for complete search history.

(56) References Cited

U.S. PATENT DOCUMENTS

| | | |
|---|---|---|
| 4,064,296 A | 12/1977 | Bornstein et al. |
| 4,098,406 A | 7/1978 | Otten et al. |
| 4,113,139 A | 9/1978 | Berry et al. |
| 4,278,738 A | 7/1981 | Brax et al. |
| 4,755,403 A | 7/1988 | Ferguson |
| 4,768,411 A | 9/1988 | Su |
| 4,778,058 A | 10/1988 | Yamazaki et al. |
| 4,861,414 A | 8/1989 | Vogan |
| 4,958,735 A | 9/1990 | Odabashian |
| 5,126,211 A | 6/1992 | Mitzutani et al. |
| 5,127,065 A | 6/1992 | Wade |
| 5,308,668 A | 5/1994 | Tsuji |
| 5,413,412 A | 5/1995 | Odabashian |
| 5,468,444 A | 11/1995 | Yazaki et al. |
| 5,540,646 A | 7/1996 | Williams et al. |
| 5,545,419 A | 8/1996 | Brady et al. |
| 5,556,674 A | 9/1996 | Meilhon |
| 5,852,152 A | 12/1998 | Walton et al. |
| 5,966,898 A | 10/1999 | Su |
| 6,054,209 A | 4/2000 | Imanishi et al. |
| 6,060,137 A | 5/2000 | Akao |
| 6,203,867 B1 | 3/2001 | Derkach et al. |
| 6,221,502 B1 | 4/2001 | Takashige et al. |
| 6,260,705 B1 | 7/2001 | Montepiani et al. |
| 6,270,819 B1 | 8/2001 | Wiese |
| 6,296,886 B1 | 10/2001 | DePoorter et al. |
| 6,355,287 B2 | 3/2002 | Noel et al. |
| 6,361,856 B1 | 3/2002 | Wakai et al. |
| 6,383,537 B1 | 5/2002 | Brady et al. |
| 6,476,137 B1 | 11/2002 | Longo |
| 6,479,137 B1 | 11/2002 | Joyner et al. |
| 6,499,598 B2 | 12/2002 | Montepiani et al. |
| 6,663,905 B1 | 12/2003 | Ennis et al. |
| 6,708,826 B1 | 3/2004 | Ginsberg et al. |
| 6,764,729 B2 | 7/2004 | Ramesh et al. |
| 6,780,373 B1 | 8/2004 | Musco |
| 6,790,468 B1 | 9/2004 | Mize, Jr. et al. |
| 6,979,494 B2 | 12/2005 | Berrier et al. |
| 7,048,125 B2 | 5/2006 | Mize et al. |
| 7,118,792 B2 | 10/2006 | Hewitt et al. |
| 7,147,930 B2 | 12/2006 | Schell et al. |
| 7,331,159 B2 | 2/2008 | Osgood |
| 7,357,255 B2 | 4/2008 | Ginsberg et al. |
| 9,561,889 B2 | 2/2017 | Dayrit et al. |
| 10,189,621 B2 | 1/2019 | Dayrit et al. |
| 2004/0043169 A1 | 3/2004 | Subramanian et al. |
| 2004/0109963 A1 | 6/2004 | Zaggia et al. |
| 2004/0118735 A1 | 6/2004 | Mize et al. |
| 2004/0166262 A1 | 8/2004 | Busche et al. |
| 2004/0175464 A1 | 9/2004 | Blemberg et al. |
| 2004/0175465 A1 | 9/2004 | Buelow et al. |
| 2004/0175466 A1 | 9/2004 | Douglas et al. |
| 2004/0175467 A1 | 9/2004 | Mueller et al. |
| 2004/0175592 A1 | 9/2004 | Douglas et al. |
| 2005/0058793 A1 | 3/2005 | Schaefer et al. |
| 2005/0069719 A1 | 3/2005 | Blemberg et al. |
| 2005/0118373 A1 | 6/2005 | Blemberg et al. |
| 2005/0118374 A1 | 6/2005 | Douglas et al. |
| 2005/0254731 A1 | 11/2005 | Berbert et al. |
| 2006/0073317 A1 | 4/2006 | Sato et al. |
| 2006/0134287 A1 | 6/2006 | Vimini et al. |
| 2006/0188619 A1 | 8/2006 | Vimini et al. |
| 2006/0199912 A1 | 9/2006 | Fuchs et al. |
| 2007/0009699 A1 | 1/2007 | Hewitt et al. |
| 2007/0221532 A1 | 9/2007 | DiLiberto |
| 2008/0179780 A1 | 7/2008 | Broadus et al. |
| 2008/0182051 A1 | 7/2008 | Broadus et al. |
| 2008/0182052 A1 | 7/2008 | Broadus et al. |
| 2008/0182053 A1 | 7/2008 | Broadus et al. |
| 2008/0292225 A1 | 11/2008 | Dayrit et al. |
| 2008/0292821 A1 | 11/2008 | Dayrit et al. |
| 2009/0017239 A1 | 1/2009 | Ursino |
| 2009/0116768 A1 | 5/2009 | Huerta et al. |

FOREIGN PATENT DOCUMENTS

| | | |
|---|---|---|
| EP | 1295908 | 3/2003 |
| EP | 1769908 | 4/2007 |
| FR | 2849835 | 7/2004 |
| GB | 1270281 | 4/1972 |
| GB | 2397065 | 7/2004 |
| JP | 1153733 | 10/1989 |
| JP | 7009550 | 1/1995 |
| JP | 7125756 | 5/1995 |
| JP | 7299853 | 11/1995 |
| JP | 7299857 | 11/1995 |
| JP | 7299859 | 11/1995 |
| JP | 9052966 | 2/1997 |
| JP | 9053008 | 2/1997 |
| JP | 9111060 | 4/1997 |
| JP | 9141791 | 6/1997 |
| JP | 10237234 | 9/1998 |
| JP | 63275644 | 11/1998 |
| JP | 2833970 | 12/1998 |
| JP | 2000169597 | 6/2000 |
| JP | 2001064456 | 3/2001 |

(56) References Cited

FOREIGN PATENT DOCUMENTS

| JP | 3356200 | 12/2002 |
|---|---|---|
| JP | 2003201377 | 7/2003 |
| JP | 2003341687 | 12/2003 |
| JP | 2006063134 | 3/2004 |
| JP | 2005161671 | 6/2005 |
| JP | 2006240717 | 9/2006 |
| JP | 2008024744 | 2/2008 |
| WO | 9954398 | 10/1999 |
| WO | 2006138152 | 12/2006 |
| WO | 2007082347 | 7/2007 |
| WO | 9828132 | 7/2008 |

OTHER PUBLICATIONS

ASTM D 882-90, Standard Test Methods for Tensile Properties of Thin Plastic Sheeting, pp. 194-199.

ASTM D 2732-03, Standard Test Method for Unrestrained Linear Thermal Shrinkage of Plastic Film and Sheeting, pp. 1-5.

ASTM D 3763-95A, Standard Test Method for High Speed Puncture properties of Plastics Using Load and Displacement Sensors, Peak Load Impact Strength, pp. 1-6.

ASTM D 4065-01, Standard Practice for Plastics: Dynamic Mechanical properties: Determination and Report of Procedures, pp. 1-5.

ASTM D 5026-95a, Standard Test Method for Measuring the dynamic Mechanical properties of Plastics and Tension, pp. 1-4.

PCT/US2008/006444 International Search Report.

PCT/US2008/006444 Written Opinion of the International Search Authority.

PCT/US2009/003023 International Search Authority.

PCT/US2009/003023 Written Opinion of the International Search Authority.

Patel, Saavedra, Hinton and DeGroot, Comparison of EVA nad Polyolefin Plastomer as Blend Components in Various Film Applications, Journal of Plastic Film and Sheeting, vol. 14, pp. 344-355 (Oct. 1998).

Surround Shrink Bags with Lift & Peel Opening Technology, Curwood Bemis product brochure (undated)_).

Wu et al, "Study on the Morphology and Properties of Metallocene Polyethylene and Ethylene/Vinyl Acetate Blends", Journal of Applied Polymer Science, vol. 91, 905-910 (2004).

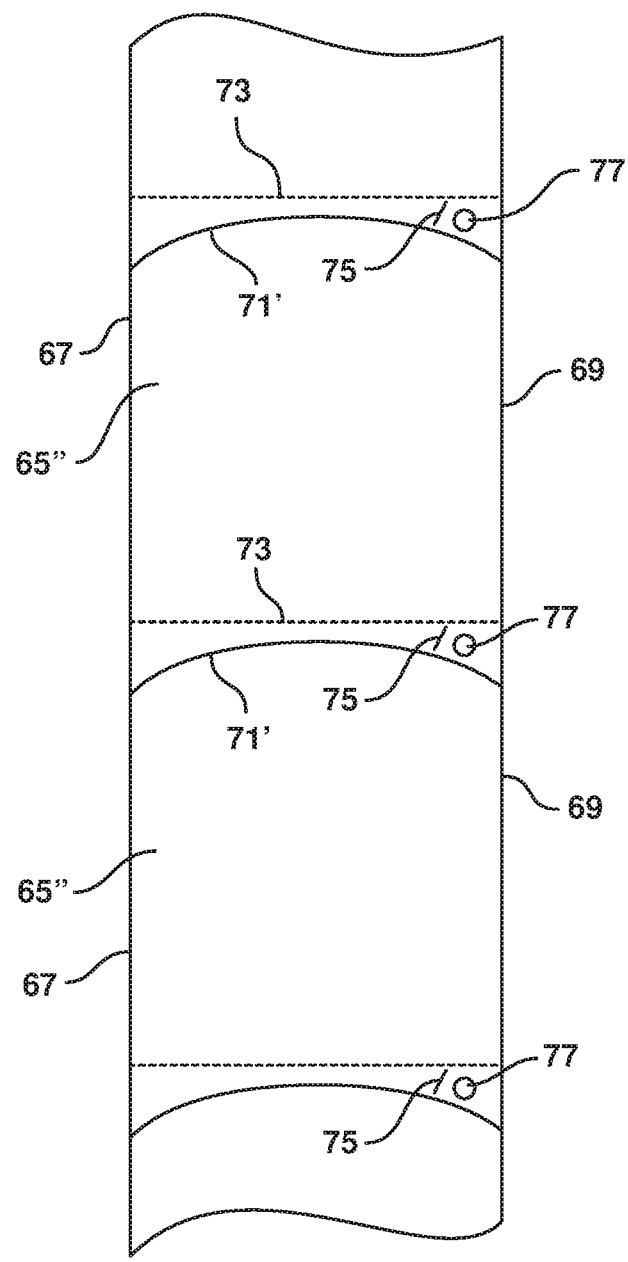

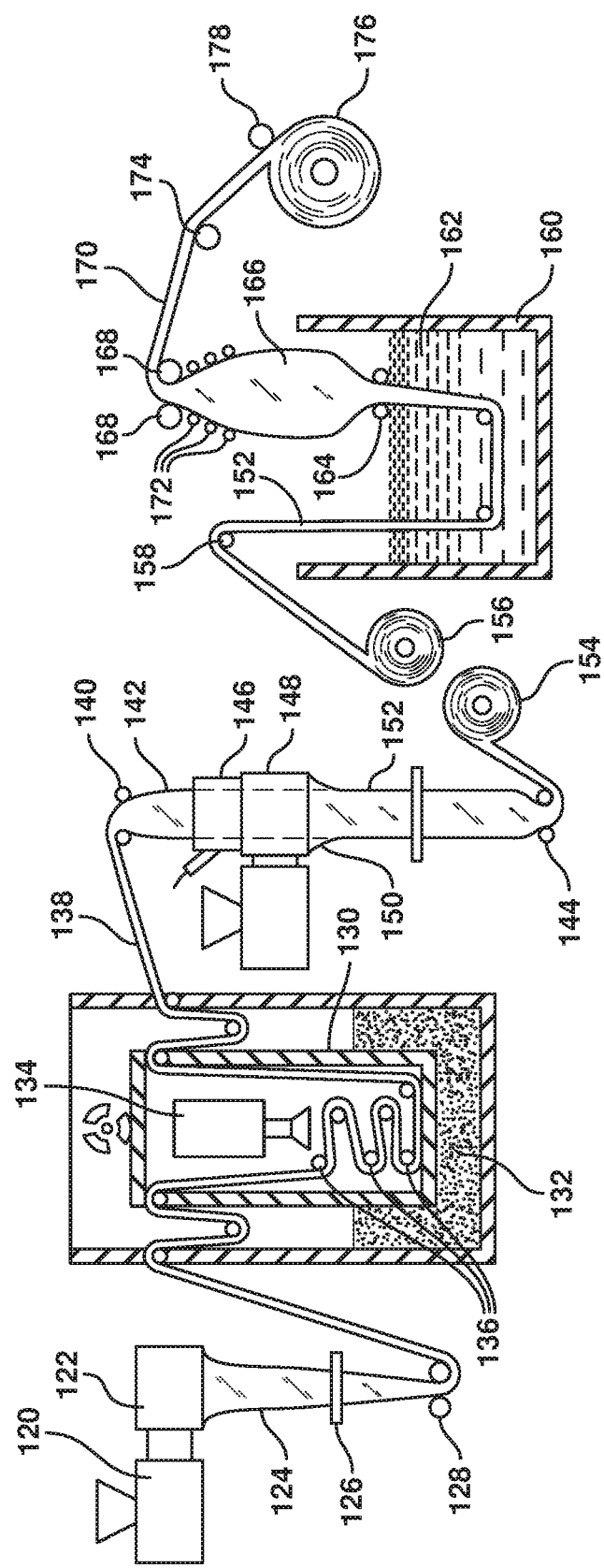

(Comparative)

(COMPARATIVE)

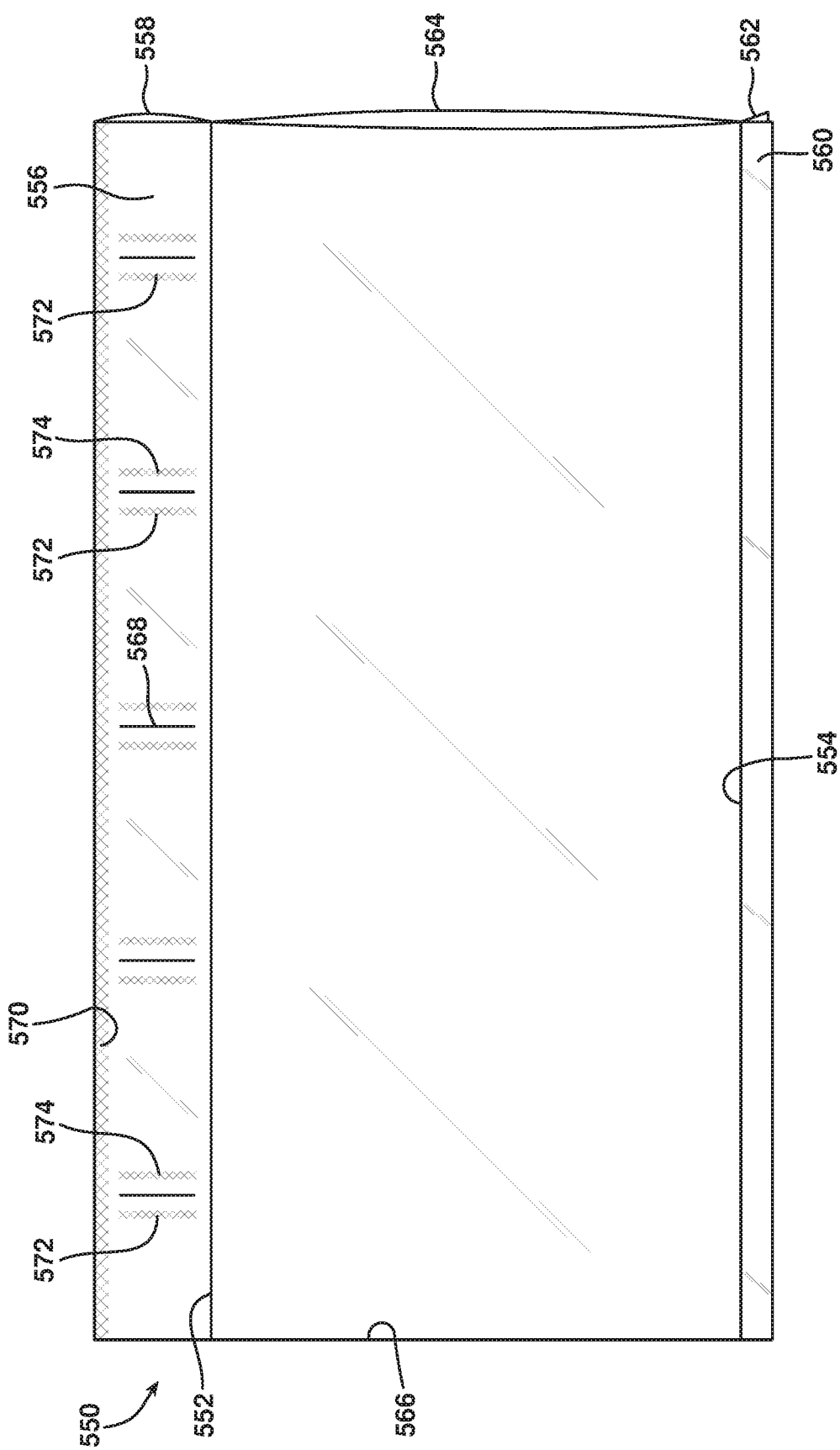

EASY OPENING PACKAGING ARTICLE MADE FROM HEAT-SHRINKABLE FILM EXHIBITING DIRECTIONAL TEAR

This application claims the benefit of provisional application U.S. Ser. No. 60/931,270 filed 21 May 2007, and non-provisional application U.S. Ser. No. 11/895,960, filed 28 Aug. 2007, non-provisional application US 2008/00644, filed 20 May 2008, and non-provisional application Ser. No. 12/313,396 filed 20 Nov. 2008 each of which is incorporated, in its entirety, by reference thereto.

FIELD

The present invention pertains to heat-shrinkable packaging articles that are easy to open, particularly packaging articles for food packaging end use.

BACKGROUND

For several decades, heat-shrinkable packaging articles have been used for the packaging of a variety of products. Food, particularly meat, has been vacuum packaged in such packaging articles. Through the years, these heat-shrinkable packaging articles have developed higher impact strength and higher seal strength, while simultaneously becoming easier to seal, having improved oxygen and moisture barrier properties, and having higher total free shrink at lower temperatures. High seal strength, high impact strength, and high puncture-resistance are particularly important for the packaging of fresh meat products, as leaking packages are less desirable to consumers and retailers alike. Moreover, leaking packages reduce shelf life by allowing atmospheric oxygen and microbes to enter the package.

As a result, the packaging articles used for food packaging, particularly meat packaging, have evolved into being quite tough, and therefore difficult to open. Typically, knives and scissors are used for opening the packaging articles that have been evacuated, sealed around, and shrunken against the food product in the package. The use of knives and scissors to open these tough packaging articles increases the risk of injury for consumers and retailers. Moreover, the opening of such tough packaging requires more time and effort due to the toughness of the shrunken packaging article. For many years, the marketplace has desired a tough, heat-shrinkable, packaging article that can be opened quickly and easily, without the need for knives and scissors, so that the product can be easily removed from the packaging article.

SUMMARY

The heat-shrinkable packaging article of the invention has tear initiators for manually initiating a manual tear that opens the packaging article and allows the product to be readily removed from the torn packaging article, without the use of a knife or scissors or any other implement. A first aspect is directed to a heat-shrinkable packaging article comprising a heat-shrinkable multilayer film having an inside seal layer heat sealed to itself at a heat seal. The packaging article further comprises a first side, a second side, and a skirt or header outward of the heat seal. The skirt or header comprises an article edge and a first tear initiator. The first tear initiator is in the first side of the article. The article skirt or header further comprises a second tear initiator in the second side of the article. The article is capable of having a manually-initiated, manually-propagated first tear in the first side, and a manually-initiated and manually-propagated second tear in the second side, with the first tear and the second tear each being capable of being propagated in a machine direction from the respective first and second tear initiators, with each tear being propagated in the machine direction through the heat seal and down the length of the article, or across the article, with each tear being capable of being manually propagated through to an opposite article edge, so that upon using the multilayer film to make a packaged product by providing a product inside the article with the article being sealed closed around the product so that a package is formed, and thereafter shrinking the film around the product, the resulting package can be manually opened, and the product readily removed from the article, by manually initiating machine-direction tears from the first and second tear initiators, with the tears being manually propagated through the seal and toward the opposite edge of the article. The multilayer film exhibits a Peak Load Impact Strength of at least 50 Newtons per mil measured using ASTM D 3763-95A. The multilayer film has at least one layer containing at least one incompatible polymer blend selected from the group consisting of:

(A) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent;

(B) a blend of ionomer resin with ethylene/unsaturated ester copolymer, and/or polybutylene, and/or propylene homopolymer and/or propylene copolymer (C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and anti-blocking agent;

(D) a blend of ethylene/unsaturated ester copolymer with polypropylene and/or propylene/ethylene copolymer, and/or polybutylene, and/or modified ethylene/alpha-olefin copolymer, and/or styrene homopolymer, and/or styrene/butadiene copolymer;

(E) a blend of ethylene/norbornene copolymer with ethylene/unsaturated ester copolymer and/or polypropylene and/or polybutylene;

(F) a blend of ethylene/alpha-olefin copolymer with polypropylene and/or polybutylene and/or ethylene/norbornene;

(G) a blend of homogeneous propylene homopolymer and/or homogeneous propylene copolymer with homogeneous ethylene/alpha-olefin copolymer and/or ethylene/unsaturated ester copolymer;

(H) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;

(I) a blend of polyamide with polystyrene and/or ethylene/alpha-olefin copolymer and/or ethylene/vinyl acetate copolymer and/or styrene/butadiene copolymer; and (J) a blend of polyamide 6 and polyamide 6I6T.

In one embodiment, the packaging article can be torn in the machine direction after the product is placed into the article and the atmosphere evacuated from the packaging article before the article is sealed closed around the product and the film thereafter shrunk around the product.

A second aspect is directed to a heat-shrinkable packaging article as in the first aspect, except that instead of the multilayer, heat-shrinkable film having at least one layer containing an incompatible polymer blend, at least one layer of the multilayer film contains: (A) at least one member selected from the group consisting of ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, and polyamide, and (B) an inorganic filler selected from the group consisting of silicates, silica, siloxane, silicone resin, zinc sulfide, wollastonite, microspheres, glass fiber, metal oxide, calcium carbonate, sulfate, aluminum trihydrate, feldspar, perlite, gypsum, iron, fluoropolymer, crosslinked polymethylmethacrylate, talc, diatomaceous earth, zeolites, mica, kaolin, carbon black, and graphite. The inorganic filler is present in the at least one layer in an amount of at least 5 weight percent, based on layer weight.

A third aspect is directed to a heat-shrinkable packaging article as in the first aspect, except that instead of at least one of the film layers comprising an incompatible polymer blend, at least one of one layer of the multilayer film comprises a polymer having a Young's modulus of at least 80,000 psi, the polymer comprising at least one polymer selected from the group consisting of high density polyethylene, ultra high molecular weight polyethylene, polypropylene, styrene copolymer, ethylene/norbornene copolymer, polycarbonate, and polyester.

A fourth aspect is directed to a plurality of heat-shrinkable bags in a continuous strand. Each of the bags is connected to an adjacent bag along a weakened tear line. Each bag is a packaging article in accordance with the first, second, and/or third aspects set forth above.

A fifth aspect is directed to a process for making an easy-open packaged product. The process comprises (A) inserting a product into a lay-flat packaging article having at least one layer comprising an incompatible polymer blend in accordance with the first aspect or an inorganic filler in accordance with the second aspect or a high modulus polymer in accordance with the third aspect; (B) sealing the packaging article closed with at least one heat seal, thereby forming a packaged product in which the packaging article surrounds or substantially surrounds the product, with the packaging article having at least one header portion between the at least one heat seal and at least one edge of the package; (C) making a first tear initiator at a first location of the packaging article that is, or later becomes, the header portion of a first side of the packaging article, and a second tear initiator at a second location of the packaging article that is, or later becomes, the header portion of a second side of the packaging article, wherein the first side of the packaging article corresponds with the first lay-flat side of the packaging article, and the second side of the packaging article corresponds with the second lay-flat side of the packaging article; and (D) heating the heat-shrinkable film to shrink the package around the product. The heat-shrinkable multilayer film exhibits a Peak Load Impact Strength, determined using ASTM D 3763-95A, of at least 50 Newtons per mil. While this process can be carried out using a packaging article that is a bag or pouch, it can also be carried out using a seamless or backseamed lay-flat tubing, wherein after the product is inserted into the tubing, a first heat seal is made across the tubing on a first end of the product and a second heat seal is made across the tubing on a second end of the product.

A sixth aspect is directed to a process for making a package and manually opening the package, comprising: (A) placing a product inside a heat-shrinkable packaging article in accordance with the first, second, or third aspects above; (B) sealing the bag closed so that a package is formed; (C) shrinking the film around the product; and (D) manually initiating and manually propagating a first tear in the first side of the package, and a second tear in the second side of the package, the first tear and the second tear each being manually propagated from the respective first and second tear initiators, with each tear being manually propagated through the heat seal and across the package, or down the length of the bag, with the first and second tears being manually propagated towards an opposite edge of the packaging article, so that the product can be readily removed from the package.

In one embodiment, the atmosphere is evacuated from the packaging article before the packaging article is sealed closed with the product therein. The packaging article used in the process is a packaging article in accordance with the first aspect and/or the second aspect and/or the third aspect set forth above.

A seventh aspect is directed to a heat-shrinkable packaging article comprising a heat-shrinkable multilayer film having an inside seal layer heat sealed to itself at a heat seal, with the article having a first side and a second side, a skirt or header outward of the heat seal. The skirt or header comprises an article edge and a plurality of pairs of tear initiators. Each pair of tear initiators having a first tear initiator and a second tear initiator, with the first tear initiator being in the first side of the article, and the second tear initiator being in the second side of the article. Each pair of tear initiators is at a location for generating a manually-initiated, manually-propagated first tear in the first side of the article, and a manually-initiated and manually-propagated second tear in the second side of the article. The first tear and the second tear are each capable of being propagated in a machine direction from the respective first and second tear initiators. Each tear is capable of being propagated in the machine direction through the heat seal and down the length of the article, or across the article. Each tear is capable of being manually propagated in the machine direction through and to an opposite article edge, so that upon using the multilayer film to make a packaged product by providing a product inside the article with the article being sealed closed around the product so that a package is formed, and thereafter shrinking the film around the product, the resulting package can be manually opened. Tearing from one or more of the pairs of tear initiators allows a portion of the package to be removed from the packaged product so that an uncovered portion of the product can be separated from a remainder of the product, leaving a remainder of the package around at least a portion of the remainder of the product, by initiating first and second machine-direction tears from at least one pair of tear initiators, with the tears being propagated through the seal and toward the opposite edge of the article. The multilayer film exhibits a Peak Load Impact Strength of at least 50 Newtons per mil measured using ASTM D 3763-95A. At least layer of the multilayer film containing at least one incompatible polymer blend selected from the group set forth in the first aspect described above, which is further discussed below.

The heat-shrinkable packaging article can be a lay-flat, side-seal bag made from a seamless tubing, the side-seal bag having an open top, a folded bottom edge, and first and second side seals with respective first and second bag skirts outward of respective first and second side seals, with the plurality of pairs of tear initiators being spaced apart along the first bag skirt, with each tear being capable of being manually propagated across the full width of the side-seal bag through both side seals and through second skirt.

In the heat-shrinkable packaging article, at least a portion of the skirt or header comprising the plurality of tear initiators can be heatset, in order to reduce the shrinkage of the skirt or header upon shrinking the film around the product.

In the heat-shrinkable packaging article, at least a portion of a first side of the skirt or header can be heat sealed to the second side of the skirt or header in at least one heat seal.

In the heat-shrinkable packaging article, the first side of the skirt or header can be heat sealed to the second side of the skirt or header in a plurality of spot seals.

In the heat-shrinkable packaging article, the first side of the skirt or header can be heat sealed to the second side of the skirt or header in a heat seal along an outer edge of the skirt or header.

In the heat-shrinkable packaging article, the plurality of pairs of tear initiators can be located at intervals of from 1 to 3 inches, or at intervals of from 1 to 2 inches.

In the heat-shrinkable packaging article, each of the first tear initiators can be coincident or substantially coincident with the second tear initiator with which it is paired, and each of the first tear initiators can be a slit through the first side of the article, and each of the second tear initiators can be a slit through the second side of the article, and each of the slits can be oriented in the machine direction.

In the heat-shrinkable packaging article, each of the slits can be oriented within 20 degrees of the machine direction, or within 10 degrees of the machine direction.

In the heat-shrinkable packaging article, the multilayer film can have been biaxially oriented in the solid state and can have a total free shrink, as measured by ASTM D 2732, of from 20 percent to 105 percent at 185° F., or a total free shrink of from 40 percent to 100 percent at 185° F.

In the heat-shrinkable packaging article, the heat-shrinkable multilayer film can exhibit a Peak Load Impact Strength, determined using ASTM D 3763-95A, of from 50 to 250 Newtons per mil, and the multilayer film can have a total thickness, before shrinking, of from 1.5 mils to 5 mils.

In the heat-shrinkable packaging article, the multilayer film can comprise an $O_2$-barrier layer, and can exhibit an oxygen transmission rate of from 1 to 20 cc/m² day atm at 23° C. and 100% relative humidity.

In the heat-shrinkable packaging article, the multilayer film can comprise: (A) a first layer that is an outer food-contact layer and that also serves as a seal layer, the first layer comprising a blend of homogeneous ethylene/alpha-olefin copolymer and linear low density polyethylene; (B) a second layer comprising a blend of heterogeneous ethylene/alpha-olefin copolymer and ethylene/vinyl acetate copolymer; (C) a third layer comprising ethylene/vinyl acetate copolymer; (D) a fourth layer comprising polyvinylidene chloride; (E) a fifth layer comprising ethylene/vinyl acetate copolymer; (F) a sixth layer comprising a blend of heterogeneous ethylene/alpha-olefin copolymer and ethylene/vinyl acetate copolymer; (G) a seventh layer comprising a blend of homogeneous ethylene/alpha-olefin copolymer and linear low density polyethylene. The layers can be present in the order of first/second/third/fourth/fifth/sixth/seventh.

An eighth aspect is directed to a heat-shrinkable packaging article comprising a heat-shrinkable multilayer film having an inside seal layer heat sealed to itself at a heat seal, with the article having a first side and a second side. The article has a skirt or header outward of the heat seal. The skirt or header comprises an article edge and a pair of tear initiators, each pair of tear initiators having a first tear initiator and a second tear initiator. The first tear initiator of the pair is in the first side of the article, and the second tear initiator of the pair is in the second side of the article. The article is capable of having a manually-initiated, manually-propagated first tear in the first side of the article, and a manually-initiated and manually-propagated second tear in the second side of the article. The first tear and the second tear are each being capable of being propagated in a machine direction from the pair of first and second tear initiators, with each tear being propagated in the machine direction through the heat seal and down the length of the article, or across the article. Each tear is capable of being manually propagated in the machine direction through and to an opposite article edge, so that upon using the multilayer film to make a packaged product by placing a product inside the article with the article being sealed closed around the product so that a package is formed, and thereafter shrinking the film around the product, the resulting package can be manually opened, and the product readily removed from the package, by manually initiating machine-direction tears from the first and second tear initiators, with the tears being manually propagated through the seal and toward the opposite edge of the article. The multilayer film exhibits a Peak Load Impact Strength of at least 50 Newtons per mil measured using ASTM D 3763-95A. At least one layer of the multilayer film containing at least one incompatible polymer blend selected from the group set forth in the first aspect described above, and as further discussed below. At least a portion of the skirt or header is heatset, so that upon forming the package and shrinking the film around the product, the shrinkage and curl of the skirt or header is reduced. The header or skirt further comprises at least one grip assister for assisting grip of the multilayer film during manual tearing.

In the heat-shrinkable article a portion of the skirt or header on the first side of the article can be heatset, and a corresponding portion of the skirt or header on the second side of the article can also be heat-set.

The heat-shrinkable packaging article can be an end-seal bag and the first and second tear initiators can be present in the bag skirt, and a heat seal can be present within the heatset portion of the first and second sides of the article.

In the heat-shrinkable article, the first tear initiator can be aligned over the second tear initiator, and the heat seal present within the heatset portion can be a perimeter seal, and the skirt can further comprise a first grip assister between the pair of tear initiators and a first end of the skirt, and a second grip assister between the pair of tear initiators and a second end of the skirt.

In the heat-shrinkable article, a first portion of a first side of the skirt or header can be spot sealed to the second side of the skirt or header at a first spot seal, and a second portion of the first side of the skirt or header can be spot sealed to the second side of the skirt or header at a second spot seal.

In the heat-shrinkable article, the heat-set portions of the first and seconds sides of the skirt or header can comprise a perimeter seal in the skirt or header.

In the heat-shrinkable article, the first tear initiator can align directly over the second tear initiator, and the skirt or header can further comprise a first spot seal within 1 inch of the first and second tear initiators and a first end of the skirt, and a second spot seal within 1 inch of the first and second tear initiators and a second end of the skirt or header.

In the heat-shrinkable article, the header or skirt can further comprise a first grip assister between the first spot seal and the first end of the header or skirt, and a second grip assister between the first and second tear initiator and a second end of the header or skirt.

The heat-shrinkable article can be a side seal bag or pouch having a skirt comprising a plurality of pairs of first and second tear initiators, with each first tear initiator being aligned directly over the second tear initiator with which is it paired.

The heat-shrinkable article can be a side-seal bag having a skirt that comprises, for each pair of first and second tear initiators, a first spot seal within 1 inch of the pair of tear initiators, the first spot seal being between the pair of tear initiators and a first end of the skirt, and a second spot seal within 1 inch of the pair of tear initiators, with the second spot seal being between the pair of tear initiators and the a second end of the skirt.

The heat-shrinkable article can comprise a multilayer film having an oxygen transmission rate of at least 50 cc/m$^2$ day at stp and 100% relative humidity, or at least 100 cc/m$^2$ day at stp and 100% relative humidity, or at least 150 cc/m$^2$ day at stp and 100% relative humidity.

The heat-shrinkable packaging article can comprise a multilayer film having a non-symmetrical polymeric layer arrangement.

BRIEF DESCRIPTION OF THE DRAWINGS

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative tear initiation features, some of which include manual grip enhancer.

FIG. 7C is a schematic view of a third embodiment of a continuous strand of bags connected by a serration line.

FIG. 8 is a schematic view of the process used to make various heat-shrinkable, seamless film tubings set forth in several of the examples below, this tubing thereafter being converted into end-seal and side-seal bags by heat sealing and cutting operations (not illustrated).

FIG. 28 illustrates a schematic of a heat-shrinkable, easy-open, side-seal bag having a plurality of pairs of tear initiators at intervals along one of the bag skirts, as well as an elongated heat set area on either side of each pair of tear initiators.

DETAILED DESCRIPTION

Figure 1A:
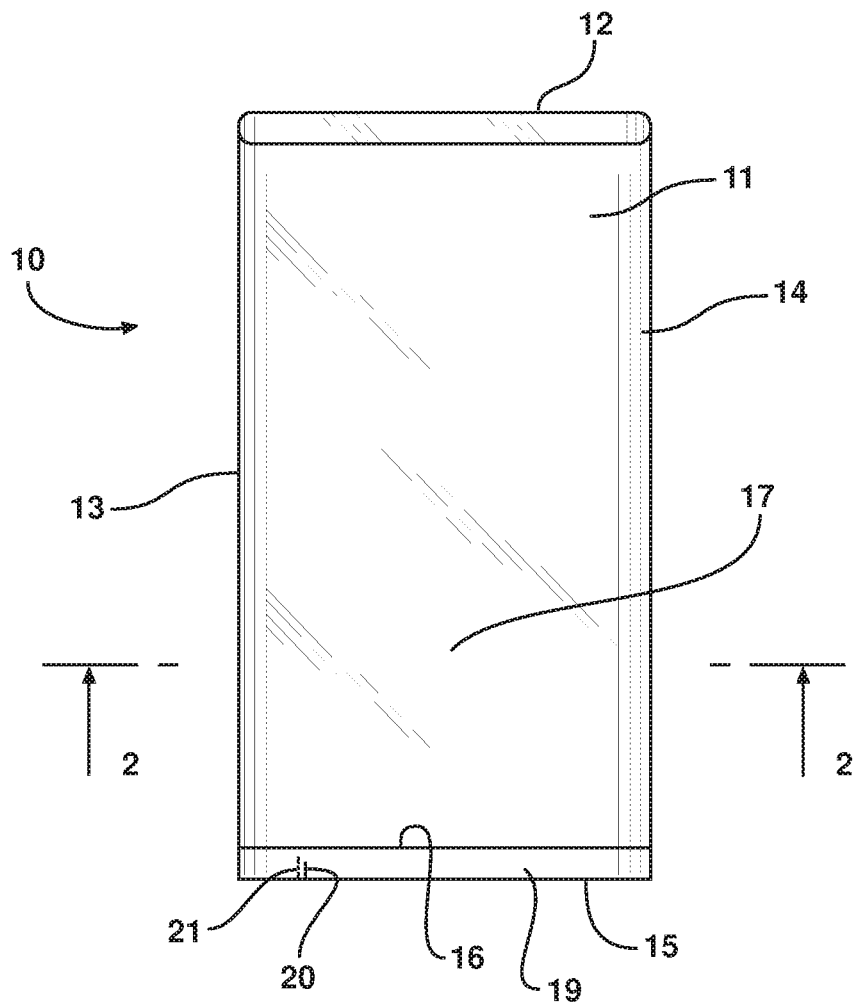
FIG. 1A is a schematic of a first heat-shrinkable, end-seal bag in lay-flat configuration.

As used herein, the term "film" is inclusive of plastic web, regardless of whether it is film or sheet. The film can have a total thickness of 0.25 mm or less, or a thickness of from 1.5 mils to 10 mils, or from 1.5 to 5 mils, or from 1.8 mils to 4 mils, or from 2 mils to 3 mils.

The multilayer, heat-shrinkable film from which the packaging article is made exhibits a Peak Load Impact Strength, determined using ASTM D 3763-95A, of at least 50 Newtons per mil. ASTM D 3763-95A is hereby incorporated, in its entirety, by reference thereto. The heat-shrinkable film can have a Peak Load Impact Strength, determined using ASTM 3763-95A, of from 50 to 250 Newtons per mil, or from 60 to 200 Newtons per mil, or from 70 to 170 Newtons per mil; or from 80 to 150 Newtons per mil; or from 85 to 140 Newtons per mil; or from 95 to 135 Newtons per mil. In one embodiment, the heat-shrinkable multilayer film exhibits a Peak Load Impact Strength, determined using ASTM D 3763-95A, of from 50 to 250 Newtons per mil, and the multilayer film has a total thickness, before shrinking, of from 1.5 mils to 5 mils.

The multilayer film has a seal layer and at least one additional layer. At least one layer of the multilayer film contains a blend of incompatible polymers.

As used herein, the phrase "machine direction" refers to the direction in which the film emerges from the die. Of course, this direction corresponds with the direction the extrudate is forwarded during the film production process. The phrase "machine direction" corresponds with "longitudinal direction". Machine direction and longitudinal direction are abbreviated as "MD" and "LD", respectfully. However, as used herein, the phrase "machine direction" includes not only the direction along a film that corresponds with the direction the film traveled as it passed over idler rollers in the film production process, it also includes directions that deviate up to 44 degrees from the direction the film traveled as it passed over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

As used herein, the phrase "packaging article" is inclusive end-seal bags, side-seal bags, L-seal bags, U-seal bags (also referred to as "pouches"), gusseted bags, backseamed tubings, and seamless casings, as well as packages made from such articles by placing a product in the article and sealing the article so that the product is substantially surrounded by the heat-shrinkable multilayer film from which the packaging article is made.

As used herein, packaging articles have two "sides". Generally, a "side" of a packaging article corresponds with half of the article. For example, an end-seal bag is a lay-flat bag and has two sides (in this case two lay-flat sides), with each side corresponding with a lay-flat side of the seamless tubing from which the end-seal bag is made. Each lay-flat side of a seamless tubing is bounded by the creases formed as the tubing is collapsed into its lay-flat configuration between nip rollers. Each side of an end-seal bag is bounded by the bag top edge, the bag bottom edge, and the two tubing creases running the length of the bag. Likewise, a side-seal bag also has two sides, with each side also being a lay-flat side, with each side of the side-seal bag being bounded by bag side edges, a bag top edge, and a bag bottom corresponding with a tubing crease. A casing, whether seamless or backseamed, also has two sides, with each side being bounded by the ends of the casing and by creases formed as the casing is configured into its lay-flat configuration. While gusseted bags and other packaging articles may not be fully lay-flat in their structure because they have more than two flat sides, they nevertheless have "sides" bounded by creases and edges.

As used herein, the term "package" refers to packaging materials configured around a product being packaged. As such, the term "package" includes all of the packaging around the product, but not the product itself.

As used herein, the phrase "packaged product" refers to the combination of a product and the package that surrounds or substantially surrounds the product. The packaged product can be made by placing the product into a packaging article made from the heat-shrinkable multilayer film, with the article then being sealed closed so that the multilayer film surrounds or substantially surrounds the product. The film can then be shrunk around the product.

As used herein, the term "bag" refers to a packaging article having an open top, side edges, and a bottom edge. The term "bag" encompasses lay-flat bags, pouches, casings (seamless casings and backseamed casings, including lap-sealed casings, fin-sealed casings, and butt-sealed backseamed casings having backseaming tape thereon). Various casing configurations are disclosed in U.S. Pat. No. 6,764,729 B2, to Ramesh et al, entitled "Backseamed Casing and Packaged Product Incorporating Same, which is hereby incorporated in its entirety, by reference thereto. Various bag configurations, including L-seal bags, backseamed bags, and U-seal bags (also referred to as pouches), are disclosed in U.S. Pat. No. 6,970,468, to Mize et al, entitled "Patch Bag and Process of Making Same", which is hereby incorporated, in its entirety, by reference thereto. While the bag configurations illustrated in the '468 patent have a patch thereon, for purposes of the present invention, the patch is optional.

In one embodiment, the packaging article is a lay-flat, end-seal bag made from a seamless tubing, the end-seal bag having an open top, first and second folded side edges, and an end seal across a bottom of the bag, with the first and second tear initiators being in the bag skirt that is outward of the end seal, with the first tear being a machine-direction tear of the film, and the second tear being a machine-direction tear of the film, with each tear being capable of being manually propagated down the length of the end-seal bag to the opposite edge of the end-seal bag.

In one embodiment, the packaging article is a lay-flat, side-seal bag made from a seamless tubing, the side-seal bag having an open top, a folded bottom edge, and first and second side seals with respective first and second bag skirts outward of respective first and second side seals, with the first and second tear initiators being in the first bag skirt and outward of the first side seal, with the first tear being a machine-direction tear and the second tear being a machine-direction tear, with each tear being capable of being manually propagated across the full width of the side-seal bag to the opposite edge of the side-seal bag.

In one embodiment, the packaging article is a lay-flat, side-seal bag made from a seamless tubing, the side-seal bag having an open top, a folded bottom edge, a first side seal with a first bag skirt outward thereof, a second side seal with a second bag skirt outward thereof, and a third seal that extends from the first side seal to the second side seal, the third seal being at an opposite end of the bag from the open top, the third seal having a third bag skirt outward thereof, the folded bottom edge being in the third bag skirt, the third bag skirt comprising the first and second tear initiators, with the first tear being a transverse-direction tear and the second tear being a transverse-direction tear, with the first and second tears each being capable of being manually propagated down the length of the side-seal bag and to the opposite edge of the side-seal bag.

In one embodiment, the packaging article is a lay-flat pouch made by heat sealing two flat films to one another, the pouch having an open top, a first side seal with a first bag skirt outward thereof, a second side seal with a second bag skirt outward thereof, a bottom seal with a third bag skirt outward thereof, the bottom seal extending from the first side seal to the second side seal, the bottom seal being at an opposite end of the bag from the open top, with at least one of the bag skirts having first and second tear initiators for tearing each of the two flat films in the machine direction.

End-seal bags, side-seal bags, L-seal bags, T-seal bags (also referred to as backseamed bags), and U-seal bags all have an open top, closed sides, a closed bottom, and at least one heat seal. Each of these heat seals is referred to as a "factory seal" because these seals are made in a bag-making factory, rather than in a packaging factory where the bag is used to package a product. Each of the heat seals illustrated in FIGS. 1A-1F, 3, 4, 5, 6A-6FF, 7A-C, and 13-16 is a factory seal. Each of the factory seals is generally made a short distance inward of the edge of the article, so that a relatively small amount of film remains outward of the heat seal, i.e., on the other side of the seal from the film that envelopes the product. A gusseted bag can also be made with a bottom seal that has a skirt, and a casing (backseamed or seamless) can have a transverse heat seal with a skirt. As used herein, the term "skirt" refers to that portion of the film that is outward of any one or more of the factory seals. The "length" of a skirt is the distance corresponding to the length of the seal inward of the skirt, and the "width" of the skirt is the distance taken perpendicular to from this seal, across the skirt, to the edge of the article. Length and width of a header (described below) are determined in the same manner. The length of a skirt or header terminates in the "ends" of the skirt or header.

Figure 9:
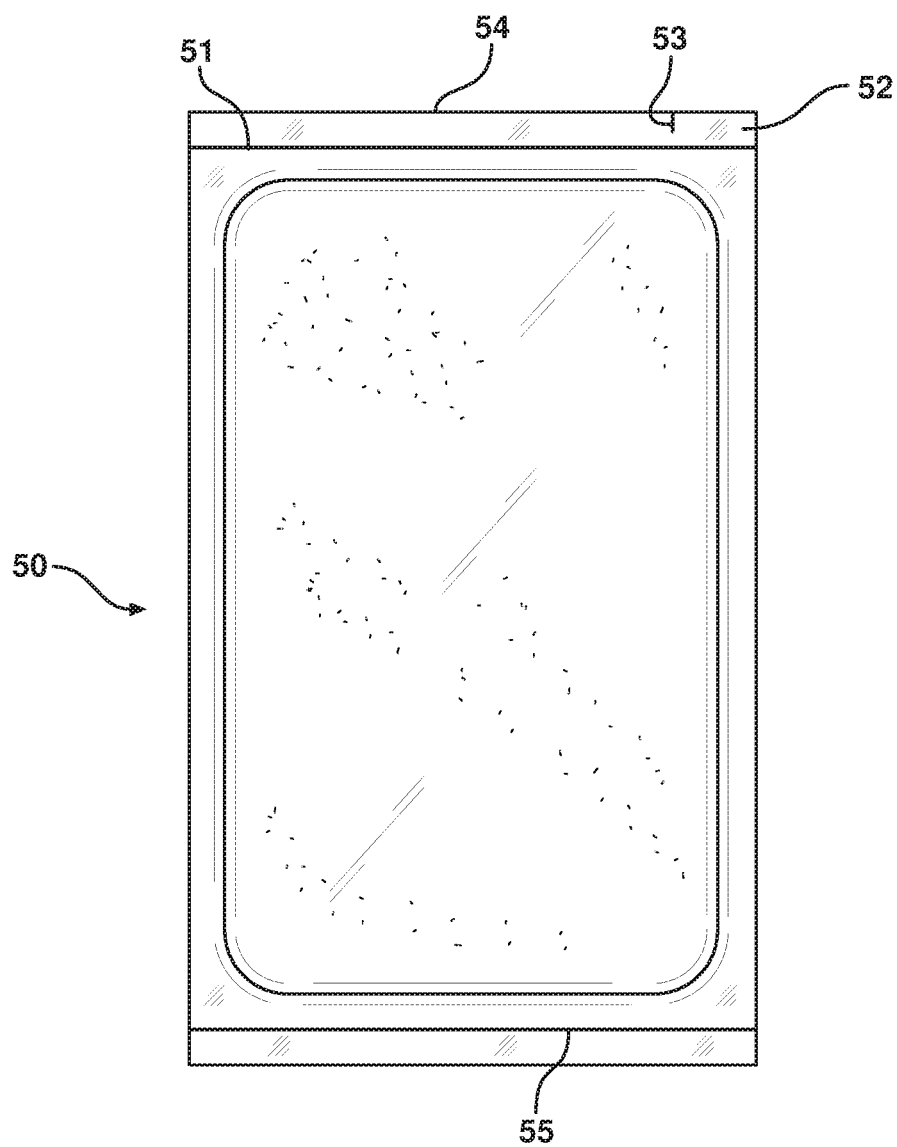
FIG. 9 is a schematic of a packaged product made up of a meat product vacuum packaged in a shrunken end-seal bag having the tear initiation feature in the bag skirt.

In contrast, only one of the heat seals on the packaged product of FIGS. 9-12 is a factory seal. The other seal is made after the product is placed in the packaging article, and is herein referred to as a "packers seal" or as an "applied seal" or as a "customer seal". While the film outward of a factory heat seal is referred to as a "skirt", the film outward of a customer seal is referred to as a "tail" or "header" of the packaging article. In the packaged product illustrated in FIGS. 9-12 and 18, one of the heat seals is a factory seal and the other heat seal is a customer seal. If tear initiator 53 in FIG. 9 is in the skirt, then heat seal 51 is the factory seal and heat seal 55 is the customer seal. While a tear initiator may be in a skirt, it may also be in a header region of the bag. If tear initiator 53 is in the header, then heat seal 51 is the customer seal and heat seal 55 is the factory seal. Usually, the header is larger (i.e., longer) than the skirt.

The term "bag" also includes that portion of a package that is derived from a bag. That is, once a product is placed inside a bag, the bag is sealed closed so that it surrounds the product. Excess bag length (i.e., the bag tail or bag header) can optionally be cut off along a line close to the seal made across the bag to enclose the product within the bag, and thereafter optionally the film can be shrunk around the product. The portion of the bag that remains and is configured around the product is herein also within the term "bag". The phrase "an opposite edge of the packaging article" refers to the edge of the bag that is directly across from the edge of the packaging article having the tear initiator. For example, a bag top edge is opposite the bag bottom edge; a first bag side edge is opposite the second bag side edge. As used herein, the phrase "a side of the bag" is used with reference to each of the first and second sides of a lay-flat bag, as well as each of the two principal, flat sides of a gusseted bag.

As used herein, the phrase "skirt" refers to that portion of the packaging article that is outward of a heat seal, e.g., the excess length or width on the non-product side of any factory heat seal on the packaging article. In an end-seal bag, the bag skirt is short in the machine direction and long in the transverse direction. In a side-seal bag, the bag skirt is long in the machine direction and short in the transverse direction. In either case, the "width" of the bag skirt is the shorter dimension of the skirt, and the "length" of the bag skirt is the longer dimension of the skirt. A bag skirt (or any skirt of any packaging article) can have a width, before the film is shrunk, of at least 5 millimeters, or at least 10 millimeters, or at least 15 millimeters, or at least 20 millimeters, or at least 25 millimeters, or at least 30 millimeters. Alternatively, the skirt can have a width of from 5 to 100 millimeters, or from 10 to 50 millimeters, or from 15 to 40 millimeters, or from 20 to 35 millimeters.

As used herein, the phrase "lay-flat bag" refers generically to non-gusseted bags used for the packaging of a variety of products, particularly food products. More specifically, the phrase "lay-flat bag" includes side seal bag, end-seal bag, L-seal bag, U-seal bag (also referred to as a pouch), and backseamed bag (also referred to as T-seal bag). The backseam can be a fin seal, a lap seal, or a butt-seal with a backseaming tape. Before the bag is shrunk, it can have a length-to-width ratio of from 1:1 to 20:1; or from 1.5:1 to 8:1; or from 1.8:1 to 6:1; or from 2:1 to 4:1.

The tear initiator can be a cut in the skirt or header of the packaging article. As used herein, the term "cut" refers to the penetration through the film, or shearing through the film, with a shearing means or edged instrument. Preferably the cut is made through both sides of the packaging article. The term "cut" is inclusive of both slits and notches. As used herein, the term "slit" refers to a cut through the film without the separation and removal of a piece of film from the packaging article. A slit can be from the edge of the packaging article (i.e., an "edge slit") or internal, i.e., not extending to an edge (i.e., "internal slit" also referred to as a "slit hole"). The slit can be straight or curved or wavy.

The term "hole", as used herein, includes both an internal puncture (i.e., internal hole) or internal cut (i.e., an internal slit) through the packaging article, as well as an internal cut that removes a piece of film from the article. The hole can utilize a straight cut or a curved cut. The hole can be round or square or rectangular or irregular in shape.

A "notch" is formed by a cut that removes a piece of film along an otherwise straight or smooth curved edge of an article skirt or Tail®, producing a point for stress concentration during the subsequent manual application of tearing force. A notch can be V-shaped or round or square or rectangular or oval or of any regular or irregular profile.

The slit or notch or hole in the skirt or tail can extend across at least 10 percent of the width of the skirt before the bag is shrunk; or at least 20 percent, or at least 30 percent or at least 40 percent, or at least 50 percent, or at least 60 percent, or at least 70 percent, or at least 80 percent, or at least 90 percent, of the width of the skirt or tail. The slit or notch or hole can angle inward, toward the center of the packaging article.

In end-seal and side-seal bags, as well as other packaging articles, a portion of the skirt is in a first lay-flat side of the article (e.g., bag), and a portion of the same skirt is in a second lay-flat side of the article (e.g., bag). The first lay-flat side of the skirt can have a first tear initiator, and the second lay-flat side of the skirt can have a second tear initiator.

The first tear initiator can overlap the second tear initiator when the end-seal or side-seal bag (or any other packaging article) is in its lay-flat configuration, as well as in the shrunken package. Overlapping enhances the ease of simultaneously initiating and propagating the tears in the first and second sides of the packaging article. Moreover, the first tear initiator can coincide (i.e., be positioned directly over and correspond with in length and shape) with the second tear initiator when the packaging article is in its lay-flat configuration.

The packaging article can be provided with both a first tear initiator that is overlapping or coincident with the second tear initiator, and a third tear that is overlapping or coincident with a fourth tear initiator. The first and second tear initiators can be positioned in a skirt or header portion of the article for making a manual tear in a machine direction, with the third and fourth tear initiators being positioned for making a manual tear in a transverse direction. The third and fourth tear initiators can be positioned in a skirt or a header.

As used herein, the verb "to tear" refers to pulling an object apart by force. The noun "tear" refers to the resulting break in the object being torn. The tearing of the film results from placing the film under enough tension that it is pulled apart by the force. The pulling force is concentrated by the tear initiator, which allows a smaller pulling force to pull the film apart, i.e., tear the film. High impact strength heat-shrinkable films are not susceptible to being manually torn without the presence of the tear initiator. In the heat-shrinkable packaging article, the high impact strength multilayer film undergoes tearing from the tear initiator toward the opposite edge of the packaging article.

Figure 6A:
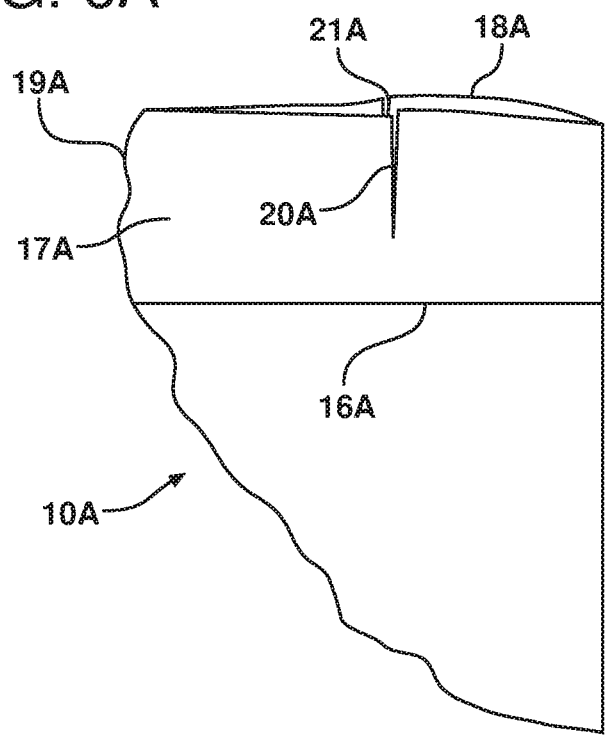
FIG. 6A is an enlarged detailed view of the tear initiation feature of the heat-shrinkable, end-seal bag of FIG. 1.

The phrase "tear initiator", as used herein, refers to any one or more of a variety of means that can be located in the skirt or header of a packaging article. The tear initiator allows manual tearing force to be concentrated on a point or small region of the film(s), so that tear initiation and tear propagation can be produced manually. A slit in the bag skirt, as illustrated in FIG. 6A, can serve as the tear initiator. Alternatively, the tear initiator can be a V-shaped notch in a bag skirt (see FIG. 6B) or a rounded notch in the bag skirt (see FIG. 6C), or a rectangular notch in the bag skirt (see FIG. 6D), or a slit hole in the bag skirt (see FIG. 6E) or a round hole in the bag skirt (see FIG. 6F), or a pointed oval hole in the bag skirt (see FIG. 6G), or a rectangular hole in the bag skirt (see FIG. 6H).

As used herein, the terms "overlapping" and "coincident" are used with respect to the relative positioning of paired tear initiators both when the article is in its lay-flat configuration and/or after a product is placed in the article and the article sealed closed around the product. The term "coincident" refers to two paired tear initiators that are directly on top of one another. The term "overlapping" refers to two paired tear initiators that are close enough to one another than an effort to manually tear one side of the packaging article at one of the tear notches results in tearing both sides of the article, i.e., from each of the paired tear initiators. The phrase "substantially coincident" is used interchangeably with the term "overlapping". Typically, tear initiators within one half inch of being coincident with one another are deemed to be "overlapping".

As used herein, the phrase "manual" and the term "manually" are both used with reference to tearing with the hands alone i.e., without the need for a knife, scissors, or any other implement to assist with initiating or propagating tearing of the film. The term "manual" is used with respect to tear initiation, i.e., the manual starting of the tearing action, as well as with respect to tear propagation, i.e., the manual continuation (i.e., extension) of a tear that has been manually initiated.

In addition to the tear initiator, the packaging article can be provided with "grip assister", also referred to herein as a "grip enhancer". The grip assister can enhance the ease with which the film can be torn. The grip assister can be in one lay-flat side of the packaging article or in both lay-flat sides of the packaging article. The grip assister can be a hole in the skirt (and/or in the header), an integral extension of the skirt or header, or a separate film tab fastened to the skirt or header. The separate film tab can be made from a thermoplastic polymer, paper, or other material, and can be heat-shrinkable or non-heat-shrinkable. The packaging article can be provided with the combination of a tear-initiator and a grip-assister. For example, the skirt can have a slit as the tear-initiator and a hole as the grip-assister. See FIG. 6I. The skirt can have a slit as the tear initiator and two holes providing serving as the grip assister. See FIG. 6J. Alternatively, the grip assister can be a tab, as illustrated in FIG. 6K, this figure further illustrating the tab being used in combination with a slit.

With respect to the tearing of the film from which the packaging article is made, as used herein the phrase "the tear is capable of being propagated . . . " refers to the manner in which the film tends to propagate the tear when the bag is subjected to an ordinary manual opening thereof, i.e., the packaging article can be "gripped and ripped" or "gripped and torn" in the ordinary course of opening. The packaging article exhibits substantially linear tear. Usually, the linear tear is substantially in line with the machine direction, or substantially in line with the transverse direction. The tearing is carried out after shrinking the heat-shrinkable film.

If the tear is being made in the machine direction of the film, the tear may be within from 0 to 44 degrees of the actual machine direction of the film, i.e., so long as the tear can be propagated toward and to the opposite side edge of the bag; or the tear may be within from 0 to 20 degrees, or within from 0 to 15 degrees, or within from 1 to 20 degrees, or within from 0 to 10 degrees; or within from 0 to 5 degrees, or within from 0 to 2 degrees of the machine direction of the film. The same holds true of transverse direction tearing, i.e., the tear may be within from 0 to 44 degrees of the actual transverse direction of the film; or the tear may be within 0 to 20 degrees, or within 1 to 20 degrees, or within from 0 to 10 degrees; or within from 0 to 5 degrees, or within from 0 to 2 degrees of the transverse direction of the film.

As used herein, the phrase "readily removed" is applied to the removal of a product from a packaging article surrounding or substantially surrounding the product. As used herein, the phrase "readily removed" refers to the manual removal of the product from within the confines of the packaging article without any further substantial amount of tearing, and without any substantial further permanent deformation of the film. As used herein, the phrase "substantial tearing of the film" refers to tearing greater than or equal to 2 millimeters in length. As used herein, the phrase "substantial permanent deformation of the film" refers to a permanent stretching of the film greater than or equal to 2 millimeters at any location on the film.

As used herein, the phrases "seal layer," "sealing layer," "heat seal layer," and "sealant layer," refer to an outer film layer, or layers, involved in heat sealing the film to itself, another film layer of the same or another film, and/or another article which is not a film. Heat sealing can be performed in any one or more of a wide variety of manners, such as melt-bead sealing, thermal sealing, impulse sealing, ultrasonic sealing, hot air sealing, hot wire sealing, infrared radiation sealing, ultraviolet radiation sealing, electron beam sealing, etc.). A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling.

In some embodiments, the seal layer can comprise a polyolefin, particularly an ethylene/alpha-olefin copolymer and/or an ionomer resin. For example, the seal layer can contain a polyolefin having a density of from 0.88 g/cc to 0.917 g/cc, or from 0.90 g/cc to 0.917 g/cc. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 g/cm$^3$. The homogeneous ethylene/alpha-olefin copolymer in the seal layer can have a density of from 0.880 g/cm$^3$ to 0.910 g/cm$^3$, or from 0.880 g/cm$^3$ to 0.917 g/cm$^3$. Homogeneous ethylene/alpha-olefin copolymers useful in the seal layer include metallocene-catalyzed ethylene/alpha-olefin copolymers having a density of from 0.917 g/cm$^3$ or less, as well as a very low density polyethylene having a density of 0.912 g/cm$^3$, these polymers providing excellent optics. Plastomer-type metallocene sealants with densities less than 0.910 g/cm$^3$ also provided excellent optics.

As used herein, the term "barrier", and the phrase "barrier layer", as applied to films and/or film layers, are used with reference to the ability of a film or film layer to serve as a barrier to one or more gases. The multilayer heat-shrinkable film used to make the article can optionally comprise a barrier layer. In the packaging art, oxygen (i.e., gaseous $O_2$) barrier layers can comprise, for example, at least one member selected from the group consisting of hydrolyzed ethylene/vinyl acetate copolymer (designated by the abbreviations "EVOH" and "HEVA", and also referred to as "saponified ethylene/vinyl acetate copolymer" and "ethylene/vinyl alcohol copolymer"), polyvinylidene chloride, amorphous polyamide, polyamide MXD6 (particularly MXD6/MXDI copolymer), polyester, polyacrylonitrile, etc., as known to those of skill in the art. In addition to the first and second layers, the heat-shrinkable film may further comprise at least one barrier layer.

The heat-shrinkable film can exhibit $O_2$-transmission rate of from 1 to 20 cc/m$^2$ day atm at 23° C. and 100% relative humidity, or from 2 to 15 cc/m$^2$ day atm at 23° C. and 100% relative humidity, or from 3 to 12 cc/m$^2$ day atm at 23° C. and 100% relative humidity, or from 4 to 10 cc/m$^2$ day atm at 23° C. and 100% relative humidity. Alternatively, the heat-shrinkable film can exhibit an $O_2$-transmission rate of from 21 cc/m$^2$ day atm to 15,000 cc/m$^2$ day atm, or from 500 cc/m$^2$ day atm to 10,000 cc/m$^2$ day atm, or from 2000 cc/m$^2$ day atm to 6,000 cc/m$^2$ day atm. $O_2$-transmission rate can be measured in accordance with ASTM-D-3985.

As used herein, the phrase "tie layer" refers to any internal layer having the primary purpose of adhering two layers to one another. Tie layers can comprise any polymer having a polar group grafted thereon. Such polymers adhere to both nonpolar polymers such as polyolefin, as well as polar polymers such as polyamide and ethylene/vinyl alcohol copolymer. Tie layers can comprise at least one member selected from the group consisting of polyolefin (particularly homogeneous ethylene/alpha-olefin copolymer), anhydride-modified polyolefin, ethylene/vinyl acetate copolymer, and anhydride-modified ethylene/vinyl acetate copolymer, ethylene/acrylic acid copolymer, and ethylene/methyl acrylate copolymer. Typical tie layer polymers comprise at least one member selected from the group consisting of anhydride modified linear low density polyethylene, anhydride modified low density polyethylene, anhydride modified polypropylene, anhydride modified methyl acrylate copolymer, anhydride modified butyl acrylate copolymer, homogeneous ethylene/alpha-olefin copolymer, and anhydride modified ethylene/vinyl acetate copolymer.

As used herein, the phrases "inner layer" and "internal layer" refer to any layer, of a multilayer film, having both of its principal surfaces directly adhered to another layer of the film.

As used herein, the phrase "outer layer" refers to any film layer having less than two of its principal surfaces directly adhered to another layer of the film. A multilayer film has two outer layers, each of which has a principal surface adhered to only one other layer of the multilayer film.

As used herein, the term "adhered" is inclusive of films which are directly adhered to one another using a heat seal or other means, as well as films which are adhered to one another using an adhesive which is between the two films. This term is also inclusive of layers of a multilayer film, which layers are of course adhered to one another without an adhesive therebetween. The various layers of a multilayer film can be "directly adhered" to one another (i.e., no layers therebetween) or "indirectly adhered" to one another (i.e., one or more layers therebetween).

Once a multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the article.

While the multilayer heat-shrinkable film can be sealed to itself to form a packaging article, optionally a heat-shrinkable patch film can be adhered to article (particularly to a bag). The patch film can be heat-shrinkable, and can have a total free shrink at 185° F. of at least 35 percent, measured in accordance with ASTM D-2732. The bag film and the patch film can have a total free shrink at 185° F. that are within 50 percent of one another, or within 20 percent of one another, or with 10 percent of one another, or within 5 percent of one another, or within 2 percent of one another. The patch may or may not cover the heat seal. If the patch covers a heat seal, optionally the heat seal may be made through the patch. If the tear is to be made through the bag and through the patch, the patch should cover a heat seal, and the tear initiator should be through both the bag film and the patch film. The bag can have a curved seal and the patch can extend into and through the region of the curved seal and over and past the curved seal. If the bottom edge of the bag is curved, a bottom edge of the patch can also be curved. The patch bag can have any desired configuration of patch on bag as disclosed in any one or more of U.S. Pat. Nos. 4,755,403, 5,540,646, 5,545,419, 6,296,886, 6,383,537, 6,663,905, and 6,790,468, each of which is hereby incorporated, in its entirety, by reference thereto.

End-seal bags with curved heat seals, and end-seal patch bags with curved heat seals, can be designed for have manual tear initiation and manual directional tear propagation. While the end-seal may be curved, the bottom edge of the bag may be straight across the tubing, or may also be curved. A curved bottom heat seal and a straight across bag bottom edge leaves more space in the bottom corners of the bag skirt for providing tear initiators, as well as for grip assisters. Patch bags with curved end seals are disclosed in U.S. Pat. No. 6,270,819, to Wiese, which is hereby incorporated, in its entirety, by reference thereto.

The term "polymer", as used herein, is inclusive of homopolymer, copolymer, terpolymer, etc. "Copolymer" includes copolymer, terpolymer, etc.

Blends of incompatible polymers in one or more film layers can enhance the tear initiation, tear propagation, and linear tear properties of the film, including the ability to manually tear down the full length or across the full width of a package made from a packaging article comprising a multilayer packaging film, i.e., tearing through a seal and through and to an opposite edge of the package. For a package made from an end-seal bag, a machine-direction tear can be manually initiated in the bag skirt, and the machine-direction tear can be manually propagated through the seal and down the length of the bag, for a distance up to the full length of the package, i.e., to that portion of the package that corresponds with the opposite edge of the package after the packaging article is used to make the package. For a package made from a side-seal bag, the machine direction tear can be manually initiated in a bag skirt, and the machine direction tear can be manually propagated through the skirt and through the associated heat seal, with the tear thereafter being propagated in the machine direction, across the full width of the package, i.e., to that portion of the package that corresponds with the opposite edge of the side-seal bag after the bag is used to make the package.

As used herein, the phrase "incompatible polymers" refers to two polymers (i.e., a blend of at least two polymers) that are incapable of forming a solution or even a stable two-phase blend, and that tend to separate after being mixed. When blended, incompatible polymers are not miscible with one another, and phase separate into a continuous domain and a discontinuous domain that may be finely dispersed. The presence of one or more film layers comprising a blend of incompatible polymers may assist, enhance, or even cause the linear tear property of the multilayer heat-shrinkable film used to make the heat-shrinkable bag.

The blend of incompatible polymers comprises at least one blend selected from the group of (A) through (I) set forth above under the first aspect of the invention. In the (A) blend above, the ethylene homopolymer and/or ethylene/alpha-olefin copolymer can be present in an amount of from 80 to 40 weight percent, or from 70 to 50 weight percent, based on total blend weight. The ethylene/unsaturated ester can be present in an amount of from 20 to 60 weight percent, or from 30 to 50 weight percent, based on total blend weight. The ethylene/unsaturated ester copolymer can have an unsaturated ester content of from 10 to 85 weight percent, or 10 to 50 weight percent, or 10 to 30 weight percent, or 12 to 30 weight percent, based on weight of ethylene/unsaturated ester copolymer.

In the (D) blend above, the ethylene/unsaturated ester copolymer can be present in an amount of from 10 to 75 weight percent, 20 to 50 weight percent, or 25 to 40 weight percent, or 25 to 35 weight percent, based on total blend weight. The polypropylene and/or propylene/ethylene copolymer and/or polybutylene and/or modified ethylene/alpha-olefin copolymer, and/or styrene homopolymer, and/or styrene/butadiene copolymer can be present in the blend in an amount of from 90 to 15 weight percent, or from 80 to 50 weight percent, or from 75 to 60 weight percent, or from 75 to 65 weight percent, based on total blend weight.

In the (F) blend above, the ethylene/alpha-olefin copolymer can be present in the blend in an amount of from 90 to 15 weight percent, based on total blend weight, or from 80 to 50 weight percent, or from 75 to 60 weight percent, or from 25 to 65 weight percent, based on total blend weight, with polypropylene (particularly propylene/ethylene copolymer) and/or polybutylene and/or ethylene/norbornene in an amount of from 10 to 85 weight percent, or from 20 to 50 weight percent, or from 25 to 40 weight percent, or from 25 to 35 weight percent, based on total blend weight.

In the (G) blend above, the homogeneous propylene homopolymer and/or homogeneous propylene copolymer can be present in the blend in an amount of from 90 to 25 weight percent, or 85 to 50 weight percent, or 80 to 60 weight percent, or 75 to 65 weight percent, based on total blend weight, with homogeneous ethylene/alpha-olefin copolymer and/or ethylene/unsaturated ester copolymer in an amount of from 10 to 75 weight percent, or 15 to 50 weight percent, or 20 to 40 weight percent, or 25 to 35 weight percent, based on total blend weight.

In one embodiment, the film comprises an incompatible blend of ethylene/alpha-olefin copolymer and ethylene/vinyl acetate copolymer having a vinyl acetate content of from 10 to 50 weight percent based on copolymer weight, the blend containing the ethylene/alpha-olefin copolymer in an amount of from 80 to 35 weight percent based on blend weight and ethylene/unsaturated ester copolymer in an amount of from 20 to 65 weight percent based on blend weight, with the multilayer film containing the blend in an amount of from 20 to 95 weight percent, based on the weight of the multilayer film, wherein the multilayer film has been biaxially oriented in the solid state and has a total free shrink, as measured by ASTM D 2732, of from 15 percent to 120 percent at 185° F.

In another embodiment the film can comprises an incompatible blend of ethylene/alpha-olefin copolymer and ethylene/vinyl acetate copolymer having a vinyl acetate content of from 10 to 30 weight percent based on copolymer weight, the blend containing the ethylene/alpha-olefin copolymer in an amount of from 75 to 45 weight percent based on blend weight and ethylene/unsaturated ester copolymer in an amount of from 25 to 55 weight percent based on blend weight, with the multilayer film containing the blend in an amount of from 30 to 70 weight percent, based on the weight of the multilayer film, wherein the multilayer film has been biaxially oriented in the solid state and has a total free shrink, as measured by ASTM D 2732, of from 20 percent to 105 percent at 185° F.

In another embodiment, the film can comprise an incompatible blend of ethylene/alpha-olefin copolymer and ethylene/vinyl acetate copolymer having a vinyl acetate content of from 12 to 30 weight percent, the blend containing the ethylene/alpha-olefin copolymer in an amount of from 70 to 50 percent based on blend weight and ethylene/unsaturated ester copolymer in an amount of from 30 to 50 weight percent based on blend weight, the multilayer film containing the blend in an amount of from 30 to 70 weight percent, based on the weight of the multilayer film, and wherein the multilayer film has been biaxially oriented in the solid state and has a total free shrink, as measured by ASTM D 2732, of from 40 percent to 100 percent at 185° F. The shrinking is typically carried out by immersion in hot water, such as water at 185° F., for a period of from 2 to 60 seconds.

If any one or more of the incompatible blends comprises an ethylene/alpha-olefin copolymer, the ethylene/alpha-olefin copolymer can comprise at least one member selected from the group consisting of: (i) ethylene/hexene copolymer having a density of from about 0.90 g/cc to about 0.925 g/cc, and (ii) ethylene/octene copolymer having a density of from about 0.90 g/cc to about 0.925 g/cc.

Other blends of incompatible polymers that may be used include the following: (i) a blend of 50 weight percent cyclic olefin copolymer with 50 weight percent propylene homopolymer; (ii) a blend of 70 wt. percent polystyrene with 30 wt. percent ethylene/vinyl acetate copolymer having a vinyl acetate content of 9 percent or 15 percent; (iii) a blend of 70 wt. percent very low density polyethylene and 30 wt. percent cyclic olefin copolymer; (iv) a blend of 70 weight percent ethylene/propylene copolymer and 30 weight percent homogeneous ethylene/alpha-olefin copolymer; (v) a blend of 70 weight percent ethylene/propylene copolymer and 30 wt. percent ethylene/vinyl acetate copolymer having a vinyl acetate content of 9 percent or 15 percent; (vi) a blend of 70 weight percent ethylene/propylene copolymer and 30 weight percent ethylene/methyl acrylate copolymer; (vii) a blend of 70 weight percent polystyrene with 30 weight percent amorphous nylon; (viii) a blend of 70 weight percent ionomer resin with 30 weight percent ethylene/vinyl acetate copolymer having a vinyl acetate content of 4 percent; (ix) a blend of 70 weight percent polyamide with 30 weight percent low density polyethylene; (x) a blend of 65 weight percent amorphous polyamide with 35% styrene/butadiene/styrene block copolymer.

The tear initiation, tear propagation, and linear tear property of a multilayer heat-shrinkable film may also be enhanced by providing one or more layers of the film with a filler material, such as an inorganic filler. Polymeric systems that incorporate high filler concentrations may also enhance linear tear behavior. Depending on the particle size and dispersion, a filler concentration as low as 5 weight percent filler (i.e., based on total layer weight) in ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, polyamide, etc., may contribute to the linear tear behavior. More particularly, the presence of filler in an amount of from 5 to 95 weight percent, or in an amount of from 5 to 50 weight percent, or in an amount of from 10 to 40 weight percent, or from 20 to 35 weight percent, may be used.

Suitable fillers include silicates (particularly sodium silicate, potassium silicate, and aluminum silicate, alkali alumino silicate), silica (particularly amorphous silica), siloxane, silicone resin, zinc sulfide, wollastonite, microspheres, glass fiber, metal oxide (particularly oxides of titanium, zinc, antimony, magnesium, iron, and aluminum), calcium carbonate, sulfate (particularly barium sulfate and calcium sulfate), aluminum trihydrate, feldspar, perlite, gypsum, iron, fluoropolymer, crosslinked polymethylmethacrylate, talc, diatomaceous earth, zeolites, mica, kaolin, carbon black, and graphite.

The filler concentration required to achieve low tear initiation force is dependent on particle geometry, particle size, particle aspect ratio, and compatibility of the filler and the polymer matrix. Some fillers are chemically treated to improve the compatibility of the particle and the polymer into which it is dispersed.

The tear initiation, tear propagation, and linear tear property of a multilayer heat-shrinkable film may also be enhanced by providing one or more layers of the film with a polymer that provides the film with a relatively high Young's modulus, e.g., a polymer having a Young's modulus of at least 80,000 psi. Such polymers can comprise at least one member selected from the group consisting of high density polyethylene, ultra high molecular weight polyethylene, polypropylene (particularly propylene homopolymer), styrene copolymer (particularly styrene/butadiene block copolymer), ethylene/norbornene copolymer, polycarbonate, and polyester. The multilayer heat-shrinkable film may have a Young's Modulus of at least 80,000 psi. Young's modulus may be measured in accordance with one or more of the following ASTM procedures: D638, D882; D5026-95a; D4065-89, each of which is incorporated herein in its entirety by reference. The film may have a Young's modulus of at least about, and/or at most about, any of the following: 100,000; 130,000; 150,000; 200,000; 250,000; 300,000; 350,000; and 400,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus (e.g., polymers of the genus having substituent groups thereon).

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer".

The phrase "ethylene/alpha-olefin copolymer" is particularly directed to heterogeneous copolymers such as linear low density polyethylene (LLDPE), very low and ultra low density polyethylene (VLDPE and ULDPE), as well as homogeneous polymers such as metallocene catalyzed polymers such as EXACT® resins obtainable from the Exxon Chemical Company, and TAFMER® resins obtainable from the Mitsui Petrochemical Corporation. All these latter copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the film and process described herein.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer can have a Mw/Mn of ≤3.0.

As used herein, the term "polyamide" refers to a polymer having amide linkages, more specifically synthetic polyamides, either aliphatic or aromatic, either in semi-crystalline or amorphous form. It is intended to refer to both polyamides and co-polyamides. The polyamides can be selected from nylon compounds approved for use in producing articles intended for use in processing, handling, and packaging food, including homopolymers, copolymers and mixtures of the nylon materials described in 21 C.F.R. 177.1500 et seq., which is incorporated herein by reference. Exemplary of such polyamides include nylon homopolymers and copolymers such as those selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-laurallactam)), nylon 6,6/6 (poly(hexamethylene adipamide-co-caprolactam)), nylon 6/66 (poly(caprolactam-co-hexamethylene adipamide)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polyauryllactam), nylon MXD6, nylon MXDI, nylon 6I/6T, and copolymers or mixtures thereof. Unless otherwise indicated, the phrase "semi-crystalline polyamide" includes all polyamides that are not considered to be amorphous polyamides. All semi-crystalline polyamides have a determinable melting point.

The film is a heat-shrinkable film. The film can be produced by carrying out only monoaxial orientation, or by carrying out biaxial orientation. As used herein, the phrase "heat-shrinkable" is used with reference to films which exhibit a total free shrink (i.e., the sum of the free shrink in both the machine and transverse directions) of at least 10% at 185° F., as measured by ASTM D 2732, which is hereby incorporated, in its entirety, by reference thereto. All films exhibiting a total free shrink of less than 10% at 185° F. are herein designated as being non-heat-shrinkable. The heat-shrinkable film multilayer film can have a total free shrink at 185° F. of from 10 percent to 150 percent, or from 15 percent to 120 percent, or from 20 percent to 100 percent, or from 45 to 95 percent, or from 40 to 90 percent, or from 30 percent to 80 percent, or from 35 percent to 60 percent, as measured by ASTM D 2732.

Heat shrinkability can be achieved by carrying out orientation in the solid state (i.e., at a temperature below the glass transition temperature of the polymer). The total orientation factor employed (i.e., stretching in the transverse direction multiplied by drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

In the packaging of a product in a heat-shrinkable film that is thereafter shrunk around the product, the header and/or skirt of the packaging article tends to shrink and curl. This is because the shrinkage of the film making up the header and/or skirt is relatively unrestrained during the period it is heated to induce shrinkage. Since the tear initiators are present in the header and/or skirt, the relatively unrestrained shrinking and curling of the header and/or skirt makes it more difficult for a consumer to detect the presence and location of the tear initiators, as well as making it more difficult to manually (or automatically) grab and use the tear initiators to tear the package open or to tear off a portion of the package.

Heatsetting at least a portion of the header and/or skirt reduces the unrestrained shrink and curling of the header and/or skirt as the film shrinks around the product. As used herein, the term "heatsetting" refers to reheating the film under restraint, i.e., so that it cannot undergo substantial shrinkage during reheating. Heatsetting is carried out by heating the film (while under restraint) to a temperature, and for a time, so that the resulting heatset portion of the film exhibits a total free shrink at 185° F. of no more than 49% of the total free shrink at 185° F. of the film before the onset of the heatsetting process. The reheating can be of the entire skirt and/or header, or of one or more regions of the skirt and/or header. Small regions can be heatset, including isolated spots or lines or even elongated regions across the skirt or header, such as heat seal lines and areas extending outward therefrom. The heatsetting of at least a portion of the header and/or skirt allows the packaging article to later be shrunk around the product while leaving the header and/or skirt more apparent and more accessible for the consumer to use.

Heatsetting can be carried out in a variety of manners. For example, the skirt and/or header (or any portion thereof) can be subjected to heat and pressure by contact with a hot platen, such as applying heat and pressure using a hot iron, a heated platen press, or even a seal bar, such as an impulse sealer. Heat sealing devices, such as a spot sealer or an impulse sealer using a hot wire or hot seal bar, inherently heatset that portion (i.e., region) of the film being heat sealed during the heat sealing process, as the amount of heat required to heatset is less than the amount of heat needed to seal the film to itself or another component of the package. Heat sealing utilizes enough heat that regions extending outward from the seal are also heatset. The size of these regions outward of the seal depends upon the manner in which the heat seal is made, and the characteristics of the film being heat sealed. The processes used for heatsetting generally causes both lay-flat sides of a packaging article to be heatset in "corresponding" areas or portions or regions, i.e., areas or portions or regions of substantially equal size that are in contact with one another but which are on opposite sides of the article.

Heatsetting reduces the total free shrink exhibited by the heatset portion of the heat-shrinkable film. While heatsetting can be carried out to any desired degree, the heatset film can exhibit a total free shrink at 185° F. of up to 50 percent; or up to 40%; or up to 30%; or up to 20%, or up to 10%; or from 0 to 5%. Heatsetting a skirt or header of a package, or regions of the skirt or header, reduces the unrestrained shrinkage of at least the heatset regions of the skirt or header during the heating of the package to shrink the film against the product inside the package. Reducing the unrestrained shrinkage of the even a portion of the skirt or header allows the skirt and/or header to remain closer to its initial size and shape after the remainder of the film is shrunk around the product. Heatsetting also reduces the curling of the skirt and/or header as the film is shrunk around the product, particularly when the heatsetting is carried out by heat sealing a first side of the skirt and/or header to the second side of the skirt and/or header. Reductions in unrestrained shrinkage and unrestrained curling of the skirt and/or header make it easier for a consumer to detect and utilize tear initiators located in the skirt and/or header.

As used herein, the term "spot" is used with reference to heat sealing and heat-setting, the term referring any discrete area of a packaging article in which (i) the film of one or both sides of the article are heat-set in the discrete area, or (ii) a first side of the article is heat sealed to a second side of the article in the discrete area. The term "spot" is used with reference to both a "spot seal" as well as a "spot heatset area". Spot seals of a first side of a skirt to the second side of the skirt have been made using a HAKO 936 soldering station set for 100° C., attached to which is a HAKO 907 soldering iron designated as being 24V/50W.

As used herein, the phrase "perimeter seal" refers to a seal in a skirt or header of an article, the seal extending along at least 51 percent of the length of the skirt or header, the seal being outward of any tear initiators and grip assisters present in the skirt or header.

In one embodiment, the film does not comprise a crosslinked polymer network. In another embodiment, the film comprises a crosslinked polymer network. Optionally, the film can be irradiated to induce crosslinking of polymer, particularly polyolefin in the film. The film can be subjected to irradiation using an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16 to 166 kGy, more preferably about 30 to 90 kGy, and still more preferably, 30 to 50 kGy. Preferably, irradiation is carried out by an electron accelerator and the dosage level is determined by standard dosimetry processes. Other accelerators such as a van der Graaf or resonating transformer may be used. The radiation is not limited to electrons from an accelerator since any ionizing radiation may be used.

The heat-shrinkable, multilayer film in the packaging article can be fully coextruded, or prepared using an extrusion-coating process. Optionally, an annular extrudate (herein also referred to as a "tape") can be irradiated before the additional layers are extrusion coated onto the substrate tape. Irradiation produces a stronger polymer network by crosslinking the polymer chains. Extrusion-coating allows a portion of the final multilayer structure to be crosslinked by irradiation (and thereby strengthened), in combination with avoiding irradiation of, for example, a layer of polyvinylidene chloride applied to the substrate via extrusion coating. Irradiation of polyvinylidene chloride is undesirable because irradiation can cause degradation of polyvinylidene chloride. Extrusion coating and irradiation are disclosed in U.S. Pat. No. 4,278,738, to Brax et al, which is hereby incorporated, in its entirety, by reference thereto.

In the multilayer, heat-shrinkable film, all of the film layers can be arranged symmetrically with respect to the polymeric composition of each film layer. In addition, all of the film layers can be arranged symmetrically with respect to both composition and thickness. In one embodiment, the seal layer is thicker than the second outer layer. The seal layer can have a thickness of from 110% to 300% of the thickness of the second outer layer, or from 150% to 250% of the thickness of the second outer layer.

One heat-shrinkable multilayer film from which the packaging article can be made comprises seven layers in the order: 1/2/3/4/5/6/7. The first layer is an outer food-contact layer and seal layer, and comprises homogeneous ethylene/alpha-olefin copolymer. The second layer comprising ethylene/methyl acrylate copolymer. The third layer comprises a blend of polyamide 6 with polyamide 6I,6T. The fourth layer comprises EVOH. The fifth layer comprises a blend of polyamide 6 with polyamide 6I,6T. The sixth layer comprises ethylene/methyl acrylate copolymer. The seventh layer comprises a blend of low density polyethylene and linear low density polyethylene. See Example 16, below.

Another heat-shrinkable film from which the packaging article can be made has the structure: seal/tie/barrier/blend of polyamide 6 and/or polyamide 6/66 with polyamide 6I6T/tie/outer abuse layer. The seal layer can contain ethylene/alpha-olefin copolymer or other polymer suitable for use in a seal layer. The tie layers can contain an anhydride-modified ethylene/alpha-olefin copolymer or other suitable polymer for use in a tie layer. The barrier layer can contain EVOH or any other suitable polymer for use in a barrier layer. The outer abuse layer can contain polyester or any other suitable polymer for use in an outer abuse layer, e.g., polyolefin or polyamide, particularly high density polyethylene or linear low density polyethylene.

Another heat-shrinkable multilayer film from which the packaging article can be made comprises three layers in the order: 1/2/3. The first layer is an outer food-contact layer that also serves as a seal layer. The first layer comprises a blend of ethylene/vinyl acetate copolymer, linear low density polyethylene, and homogeneous ethylene/alpha-olefin copolymer. The second layer comprising polyvinylidene chloride. The third layer comprises a blend of ethylene/vinyl acetate copolymer, linear low density polyethylene, and homogeneous ethylene/alpha-olefin copolymer. See Example 12, below.

Another heat-shrinkable multilayer film from which the packaging article can be made comprises seven layers in the order: 1/2/3/4/5/6/7. The first layer that is an outer food-contact layer and that also serves as a seal layer. The first layer comprises a blend of homogeneous ethylene/alpha-olefin copolymer and linear low density polyethylene. The second layer comprises a blend of heterogeneous ethylene/alpha-olefin copolymer and ethylene/vinyl acetate copolymer. The third layer comprises ethylene/vinyl acetate copolymer. The fourth layer comprises polyvinylidene chloride. The fifth layer comprises ethylene/vinyl acetate copolymer. The sixth layer comprises a blend of heterogeneous ethylene/alpha-olefin copolymer and ethylene/vinyl acetate copolymer. The seventh layer comprises a blend of homogeneous ethylene/alpha-olefin copolymer and linear low density polyethylene. See Examples 1 and 2, below.

Figure 2:
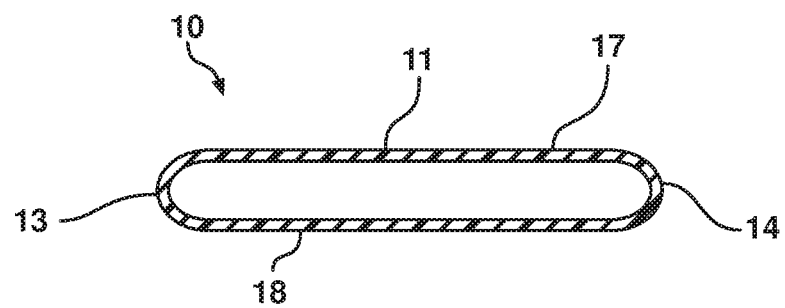
FIG. 2 is a transverse cross-sectional view of the heat-shrinkable, end-seal bag of FIG. 1.

FIGS. 1A and 2 together illustrate a schematic of end-seal bag 10, in a lay-flat position. End-seal bag 10 can be made from a seamless film tubing. FIG. 2 is a transverse cross-sectional view of end-seal bag 10 of FIG. 1A, taken through section 2-2 of FIG. 1A. Viewing FIGS. 1A and 2 together, end-seal bag 10 comprises heat-shrinkable bag film 11, bag top edge 12 defining an open top, folded first side edge 13, folded second side edge 14, bottom edge 15, and end seal 16. End seal 16 is commonly referred to as a "factory seal" because it is a seal made at the bagmaking factory, rather than at the site where the bag is used to package a product. End-seal bag 10 further has first lay-flat side 17, second lay-flat side 18, and bag skirt 19. Bag skirt 19 is outward of end seal 16 (i.e., "outward" in that bag skirt 19 is further from the center of end-seal bag 10, and exterior of the product-containing cavity within end-seal bag 10). Bag skirt 19 includes a portion of first lay-flat side 17 and a portion of second lay-flat side 18. Bag skirt 19 further comprises first tear initiator 20 in first lay-flat side 17, and second tear initiator 21 (illustrated by a dashed line because it is underneath first lay-flat side 17) in second lay-flat side 18.

Figure 1B:
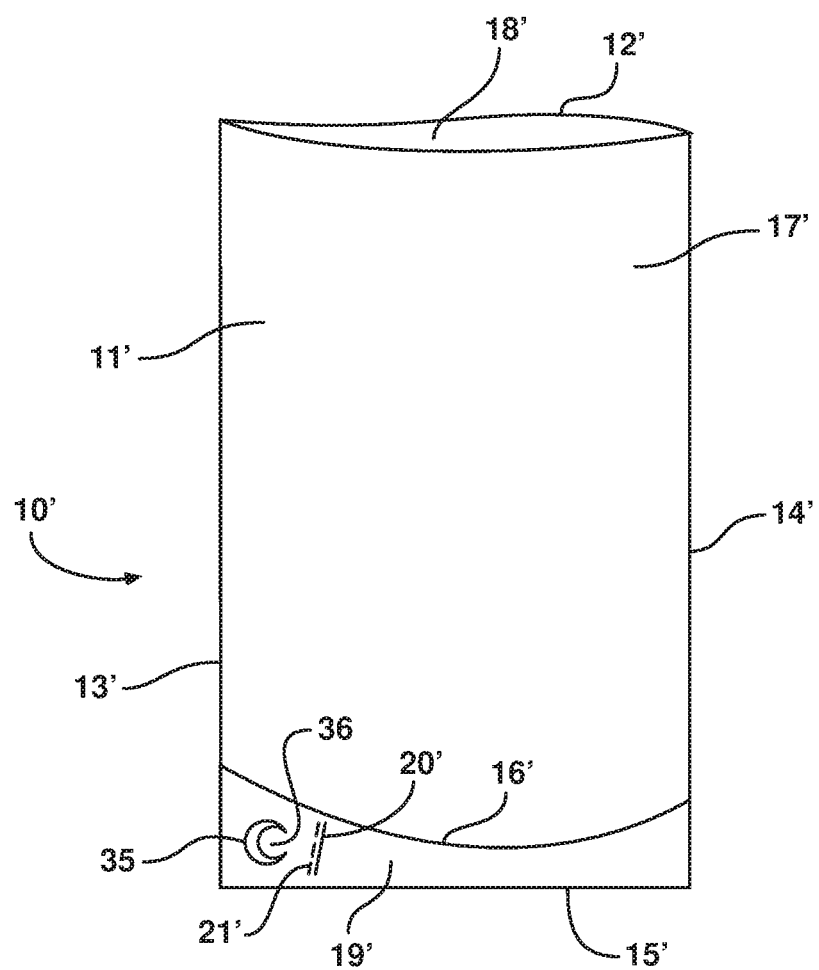
FIG. 1B is a schematic of a second heat-shrinkable, end-seal bag in lay-flat configuration.

FIG. 1B illustrates a schematic of an alternative end-seal bag 10', in a lay-flat position. End-seal bag 10' can be made from a seamless film tubing. End-seal bag 10' comprises heat-shrinkable bag film 11', bag top edge 12' defining an open top, folded first side edge 13', folded second side edge 14', bottom edge 15', and curved end seal 16'. End-seal bag 10' further has first lay-flat side 17', second lay-flat side 18', and bag skirt 19'. Bag skirt 19' is outward of curved end seal 16'. Bag skirt 19' comprises first tear initiator 20' in first lay-flat side 17', and second tear initiator 21' (illustrated by a dashed line because it is underneath first lay-flat side 17') in second lay-flat side 18'. Both first tear-initiator 20' and second tear initiator 21' are slits though the bag that do not extend to either curved end seal 16' or bag bottom edge 15'. End seal bag 10' also has grip assist hole 35 in first lay-flat side 17' and second grip assist hole (not illustrated) in second lay-flat side 18'. These grip-assist holes facilitate gripping the bag for the manual tear initiation and manual tear propagation.

Grip assist holes can be sized to allow a user's finger(s) to be inserted therethrough to assist in gripping the film. Grip assist holes work in conjunction with the tear initiators, by providing a secure manual grip of the bag in a location designed to assist in generating tear initiation force along a tear line emanating from the tear initiators.

The grip assist hole in a first lay-flat side of the packaging article can overlap or coincide with the grip assist hole in a second lay-flat side of the packaging article. While grip assist holes can have any desired shape (e.g., round, rectangular, square, triangular, pentagonal, hexagonal, etc.), preferably the holes are round, or any "corners" on the holes are rounded, to reduce the presence of stress concentration points that could cause a tear to initiate from the grip assist hole, as an objective is to have the tear initiated from the tear initiator, with the tear running to an opposite side edge of the bag.

In one embodiment, the grip-assist holes can be made by cutting through both lay-flat sides of the packaging article to remove a piece of film to form the holes. However, this process is more difficult to carry out, and it produces small, loose pieces of film corresponding with the size of the cut hole. These pieces of film may lodge inside the packaging article and thereafter adhere to a food product placed in the packaging article, which of course is an undesirable result. In order to prevent the production of a small, loose pieces of film, a cut can be made in the film in a shape that corresponds with a "partial hole cut", i.e., a cut through the film to make a portion of the hole, the cut not being complete so that a hole is formed. Such a cut leaves a "hanging chad" so that no separated small pieces of film are produced by the cut.

Figure 1C:
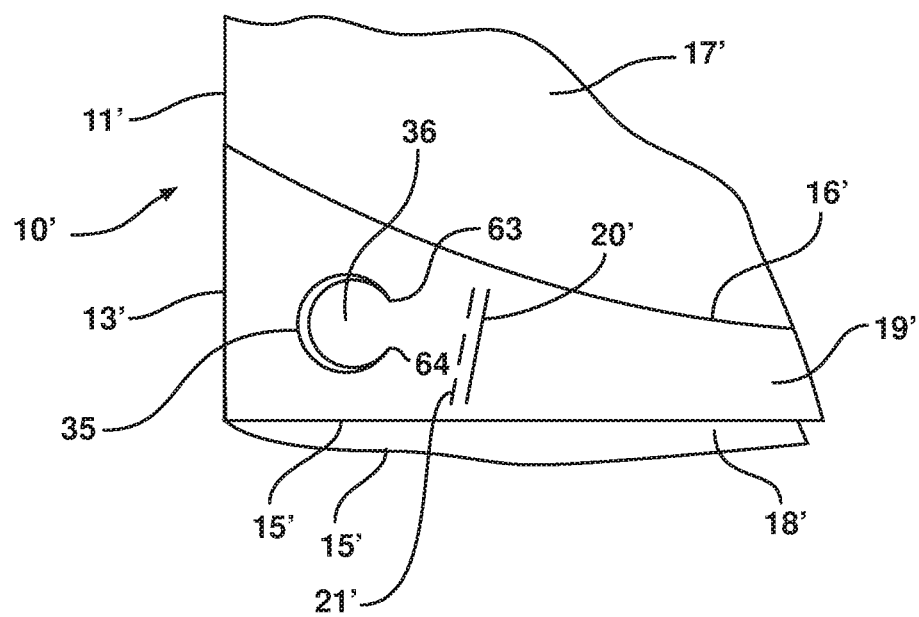
FIG. 1C is an enlarged, detailed view of a portion of the bag of FIG. 1B.
Figure 1D:
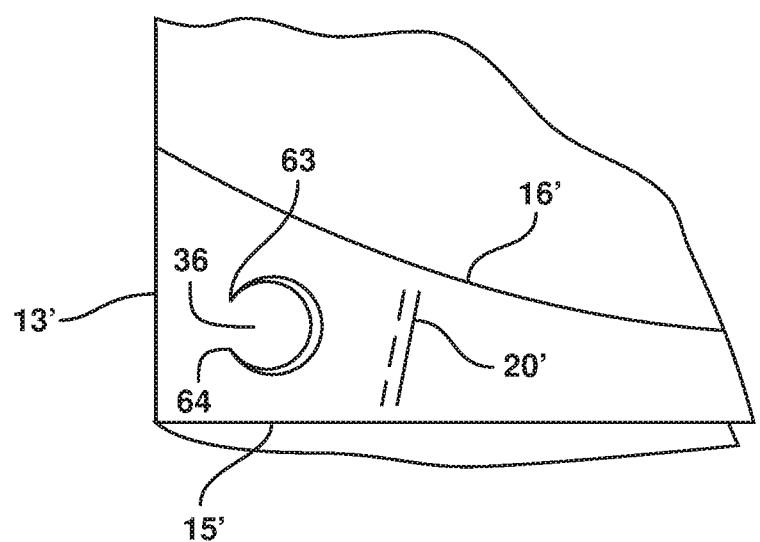
FIG. 1D is an enlarged, detailed view of a first less desirable embodiment of a bag otherwise corresponding with the bag of FIG. 1B.
Figure 1E:
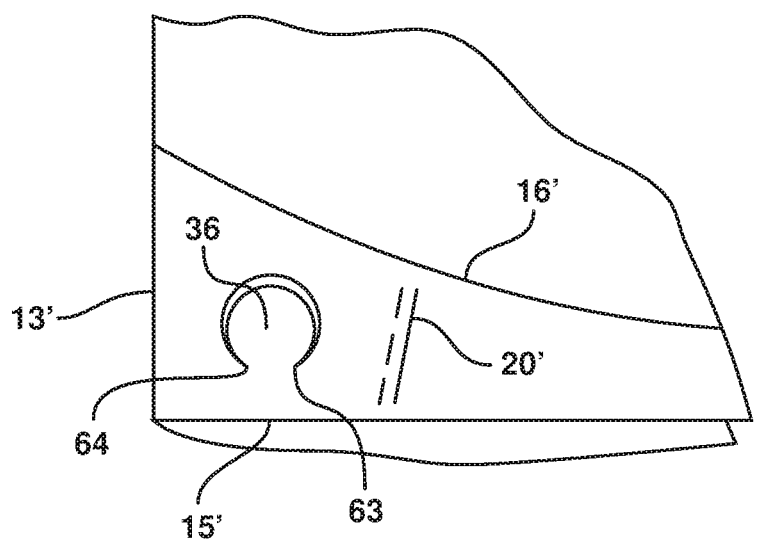
FIG. 1E is an enlarged, detailed view of a second less desirable embodiment of a bag otherwise corresponding with the bag of FIG. 1B.
Figure 1F:
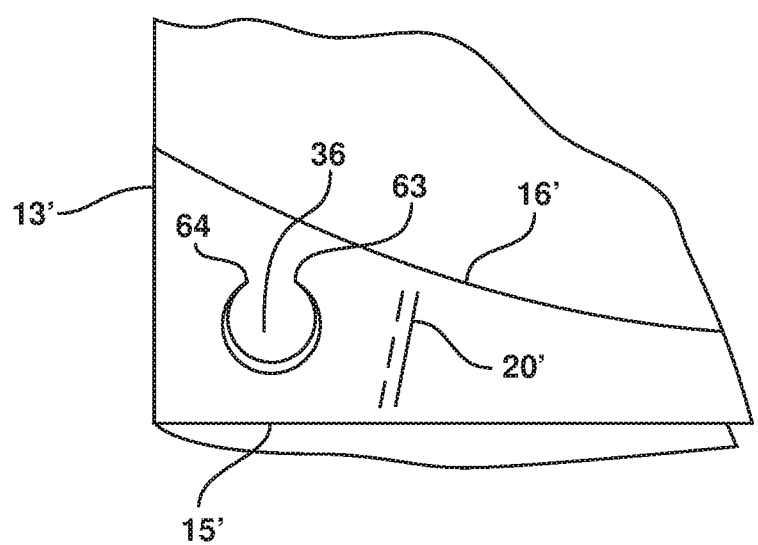
FIG. 1F is an enlarged, detailed view of a third less desirable embodiment of a bag otherwise corresponding with the bag of FIG. 1B.

FIG. 1B and FIG. 1C each illustrate hanging chad 36 formed by the partial hole cut made in bag 10'. As illustrated in FIG. 1C, hanging chad 36 is formed by a cut having endpoints 63 and 64. It has been found that leaving hanging chad 36 connected to film 11' by the film connecting cut endpoints 63 and 64 results in a tear emanating from tear initiation cuts 20' and 21', with the tear running through seal 16' and through the length of bag 11'. On the other hand, if a hanging chad is formed by a cut as illustrated in FIG. 1D, or FIG. 1E, or FIG. 1F, use of the partial hole cut as some grip assistors results in a tear that likely will not emanate from tear initiation cuts 20' and 21', but rather is likely to initiate a tear from the partial hole cut towards side edge 13' or towards bottom edge 15', as illustrated by the dashed lines in each of FIGS. 1D, 1E, and 1F.

Hanging chad 36 can be made so that it is connected to film 11' at a region oriented towards tear initiation cuts 20' and 21', as illustrated in FIG. 1B and FIG. 1C. The cut that forms hanging chad 36 can have endpoints that, if connected by a line, provide a line that is parallel to side edge 13' and/or parallel to tear initiation cuts 20' and 21', or by a line within plus or minus 30 degrees of being parallel to side edge 13' and/or tear initiation cuts 20' and 21', or by a line within plus or minus 25 degrees of being parallel to side edge 13' and/or tear initiation cuts 20' and 21', or by a line within plus or minus 20 degrees of being parallel to side edge 13' and/or tear initiation cuts 20' and 21', or by a line within plus or minus 15 degrees of being parallel to side edge 13' and/or tear initiation cuts 20' and 21', or by a line within plus or minus 10 degrees of being parallel to side edge 13' and/or tear initiation cuts 20' and 21', or by a line within plus or minus 5 degrees of being parallel to side edge 13' and/or tear initiation cuts 20' and 21', or by a line within plus or minus 3 degrees of being parallel to side edge 13' and/or tear initiation cuts 20' and 21', or by a line within plus or minus 2 degrees of side edge 13' and/or tear initiation cuts 20' and 21'.

Figure 3:
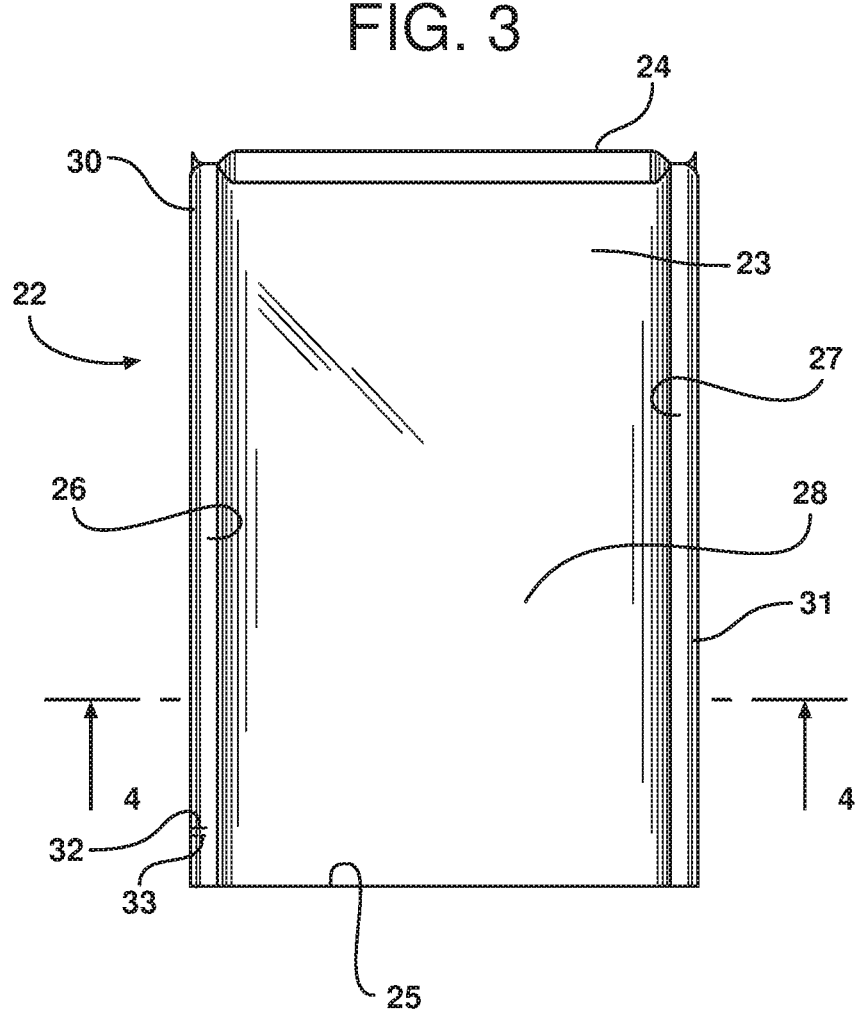
FIG. 3 is a schematic of a first heat-shrinkable, side-seal bag in lay-flat configuration.
Figure 4:
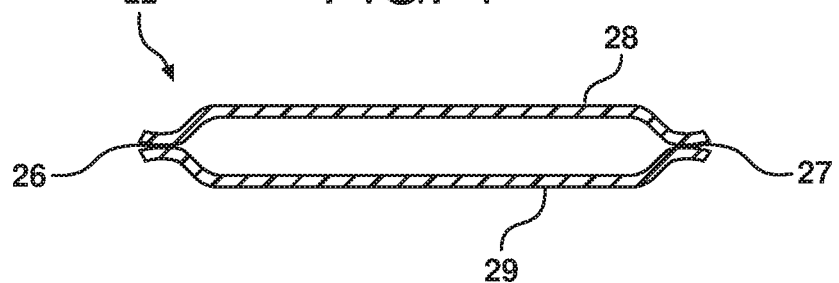
FIG. 4 is a transverse cross-sectional view of the heat-shrinkable, side-seal bag of FIG. 3

FIGS. 3 and 4 together illustrate a schematic of side-seal bag 22, in a lay-flat position. Side-seal bag 22 can be made from a seamless film tubing. FIG. 4 is a transverse cross-sectional view of side-seal bag 22 of FIG. 3, taken through section 4-4 of FIG. 3. Side-seal bag 22 comprises heat-shrinkable bag film 23, top edge 24 defining an open top, folded bottom edge 25, first side seal 26, and second side seal 27. Side-seal bag 22 has first lay-flat side 28, second lay-flat side 29, first bag skirt 30, and second bag skirt 31. First bag skirt 30 is outward of first side seal 26 and second bag skirt 31 is outward of second side seal 27. First bag skirt 30 includes a portion of first lay-flat side 28 and a portion of second lay-flat side 29. First bag skirt 30 further comprises first tear initiator 31 in first lay-flat side 28, and second tear-initiator 33 (illustrated by a dashed line because it is underneath first lay-flat side 28) in second lay-flat side 29.

Figure 5:
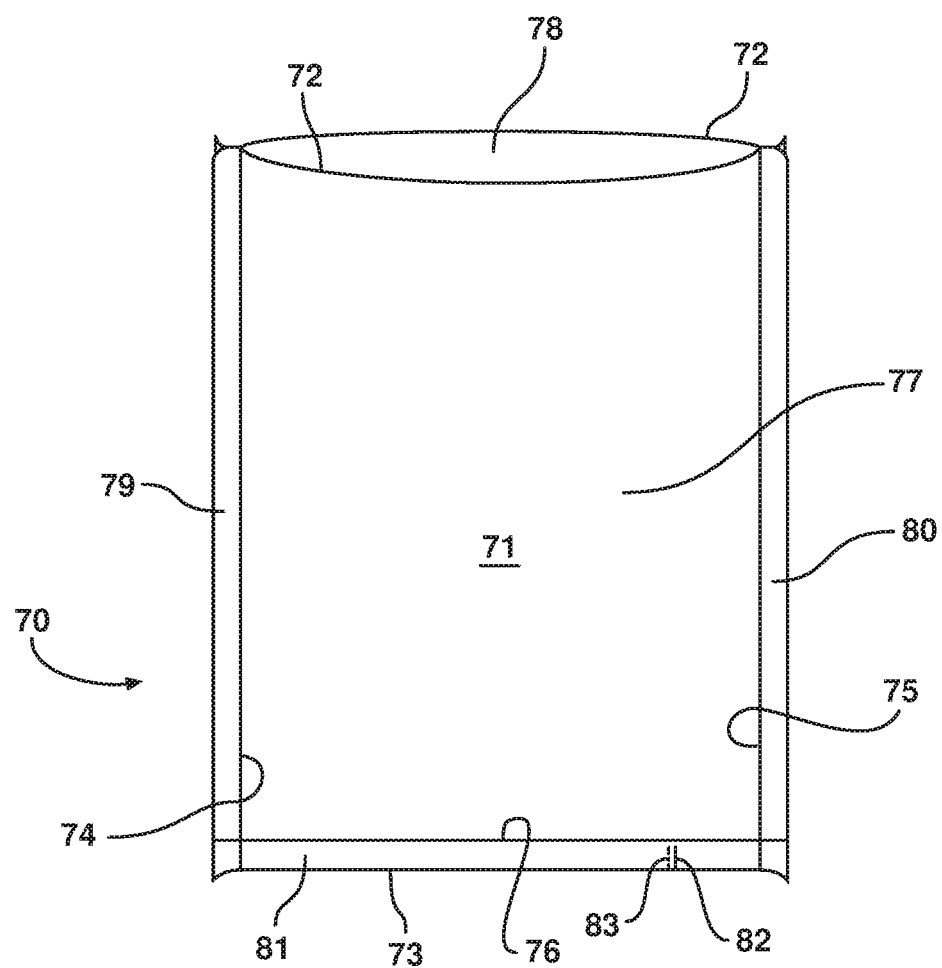
FIG. 5 is a schematic of a second heat-shrinkable, side-seal bag in lay-flat configuration.

FIG. 5 illustrates a schematic of alternate side-seal bag 70, also in lay-flat position. Alternate side-seal bag 70 can be made from a seamless film tubing. Alternate side-seal bag 70 comprises heat-shrinkable bag film 71, top edge 72 defining an open top, folded bottom edge 73, first side seal 74, second side seal 75, and bottom seal 76. Alternate side-seal bag 70 has first lay-flat side 77, second lay-flat side 78, first bag skirt 79, second bag skirt 80, and third bag skirt 81. First bag skirt 79 is outward of first side seal 74. Second bag skirt 80 is outward of second side seal 75. Third bag skirt 81 is outward of bottom seal 76. Third bag skirt 81 includes a portion of first lay-flat side 77 and a portion of second lay-flat side 78. Third bag skirt 81 further comprises first tear initiator 82 in first lay-flat side 77, and second tear initiator 83 (illustrated by a dashed line because it is underneath first lay-flat side 77) in second lay-flat side 78.

FIGS. 6A through 6L illustrate enlarged cutaway portions of various embodiments of for a heat-shrinkable end-seal bag such as the bag illustrated in FIG. 1 and FIG. 2.

In FIG. 6A, bag 10A has end seal 16A and bag skirt 19A in first and second lay-flat sides of bag 10A. First lay-flat side 17A of bag 10A has slit 20A, and second lay-flat side 18A of bag 10A has coinciding slit 21A.

Figure 6B:
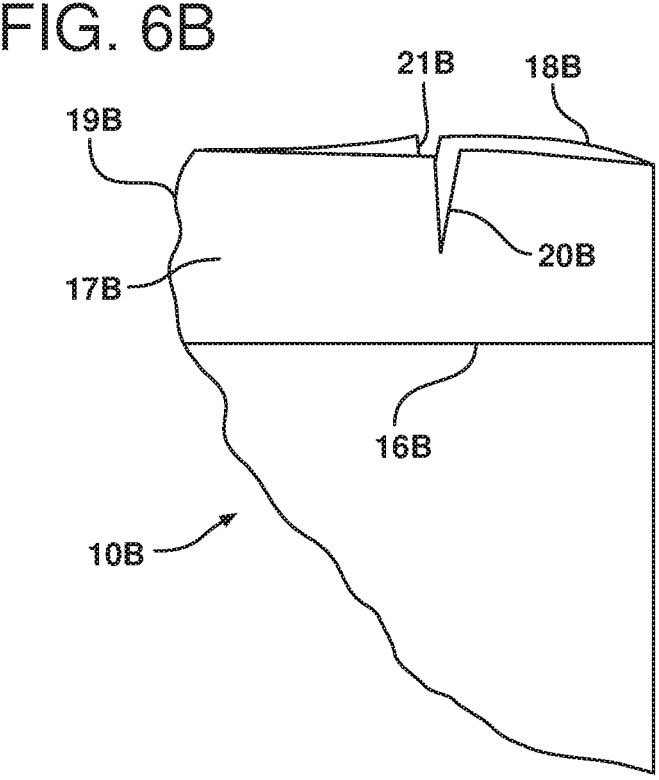
FIG. 6B is an enlarged detailed view of an alternative tear initiation feature to be used on an alternative heat-shrinkable, end-seal bag.

In FIG. 6B, bag 10B has end seal 16B and bag skirt 19B in first and second lay-flat sides of bag 10B. First lay-flat side 17B of bag 10B has V-notch 20B, and second lay-flat side 18B of bag 10B has coinciding V-notch 21B.

Figure 6C:
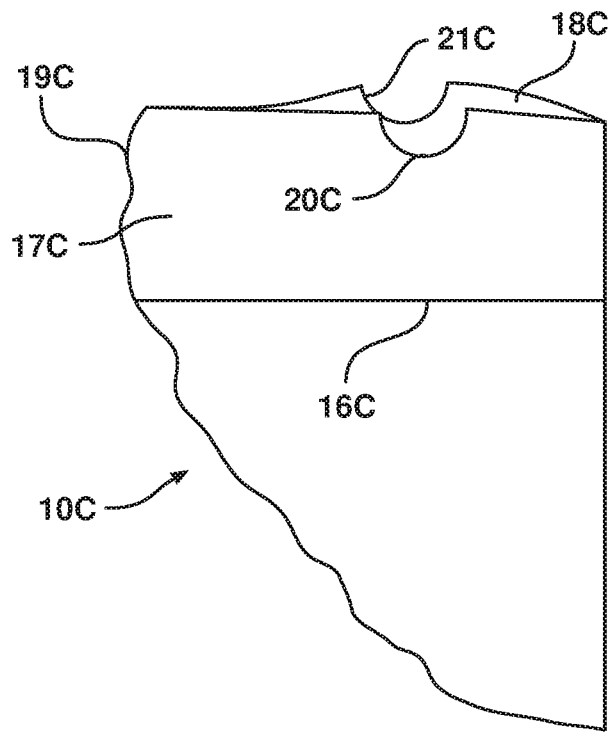
FIG. 6C is an enlarged detailed view of an alternative tear initiation feature to be used on another alternative heat-shrinkable, end-seal bag.

In FIG. 6C, bag 10C has end seal 16C and bag skirt 19C in first and second lay-flat sides of bag 10C. First lay-flat side 17C of bag 10C has round notch 20C, and second lay-flat side 18C of bag 10C has coinciding round notch 21C.

Figure 6D:
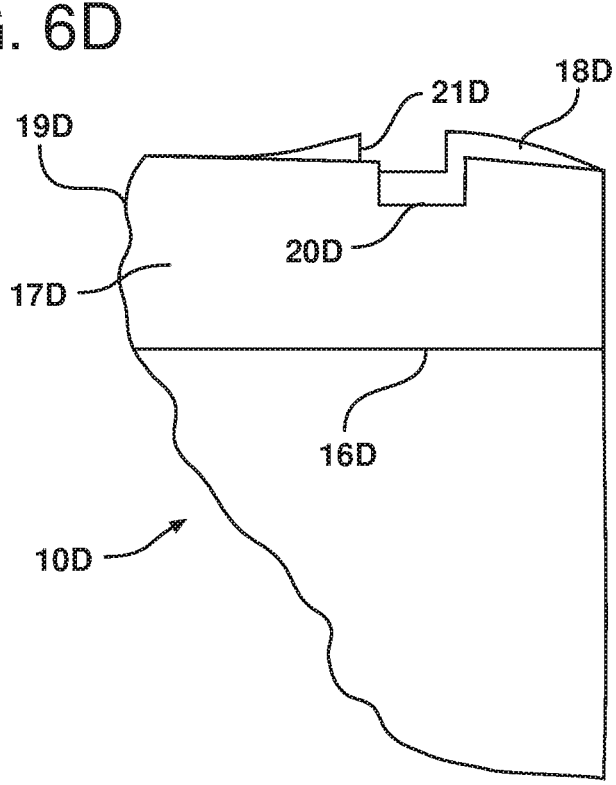
FIG. 6D is an enlarged detailed view of an alternative tear initiation feature to be used on another alternative heat-shrinkable, end-seal bag.

In FIG. 6D, bag 10D has end seal 16D and bag skirt 19D in first and second lay-flat sides of bag 10D. First lay-flat side 17D of bag 10D has rectangular notch 20D, and second lay-flat side 18D of bag 10D has coinciding rectangular notch 21D.

Figure 6E:
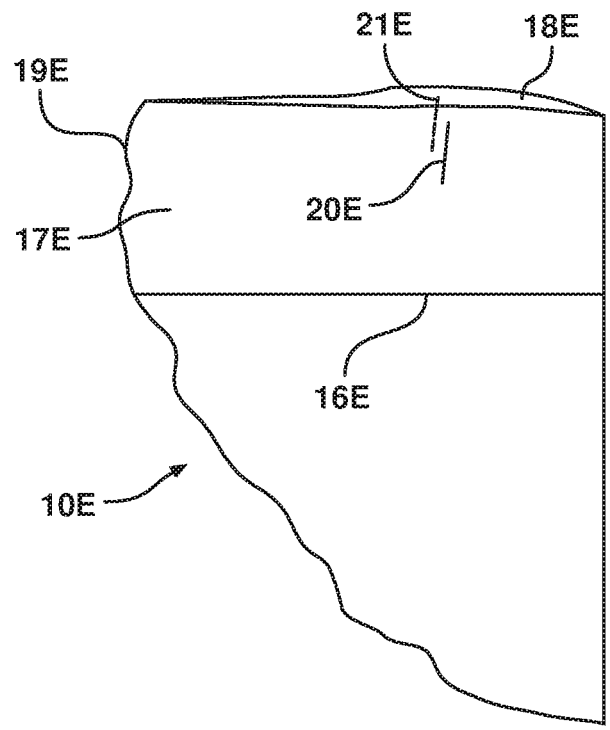
FIG. 6E is an enlarged detailed view of an alternative tear initiation feature to be used on another alternative heat-shrinkable, end-seal bag.

In FIG. 6E, bag 10E has end seal 16E and bag skirt 19E in first and second lay-flat sides of bag 10E. First lay-flat side 17E of bag 10E has slit hole 20E, and second lay-flat side 18E of bag 10E has coinciding slit hole 21E.

Figure 6F:
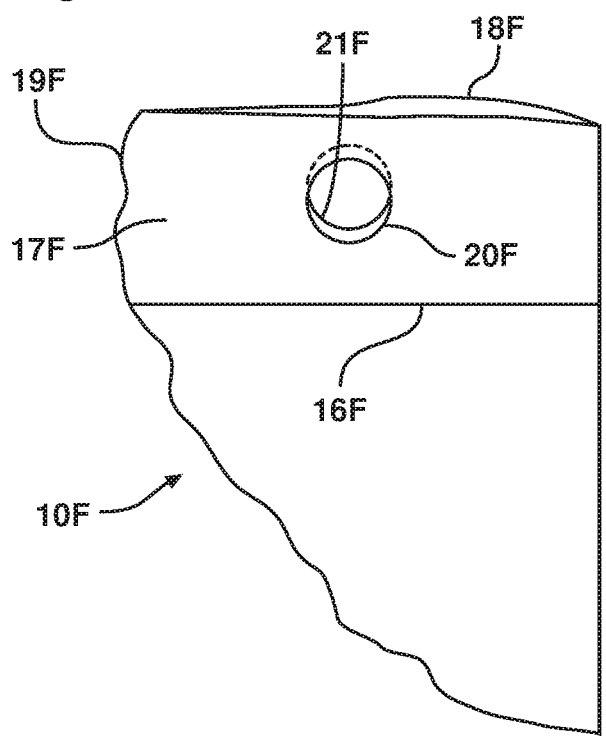
FIG. 6F is an enlarged detailed view of an alternative tear initiation feature to be used on another alternative heat-shrinkable, end-seal bag.

In FIG. 6F, bag 10F has end seal 16F and bag skirt 19F in first and second lay-flat sides of bag 10F. First lay-flat side 17F of bag 10F has round hole 20F, and second lay-flat side 18F of bag 10F has coinciding round hole 21F.

Figure 6G:
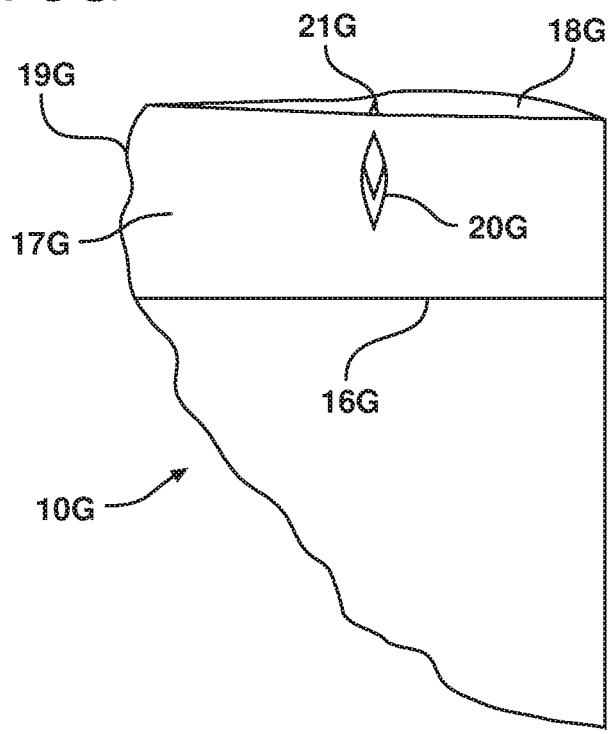
FIG. 6G is an enlarged detailed view of an alternative tear initiation feature to be used on another alternative heat-shrinkable, end-seal bag.

In FIG. 6G, bag 10G has end seal 16G and bag skirt 19G in first and second lay-flat sides of bag 10G. First lay-flat side 17G of bag 10G has pointed oval hole 20G, and second lay-flat side 18G of bag 10G has coinciding pointed oval hole 21G.

Figure 6H:
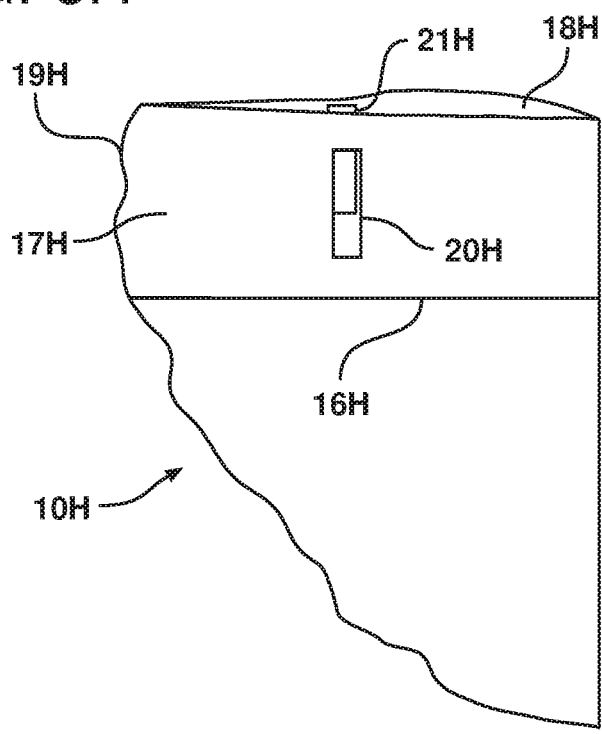
FIG. 6H is an enlarged detailed view of an alternative tear initiation feature to be used on another alternative heat-shrinkable, end-seal bag.

In FIG. 6H, bag 10H has end seal 16H and bag skirt 19H in first and second lay-flat sides of bag 10H. First lay-flat side 17H of bag 10H has rectangular hole 20H, and second lay-flat side 18H of bag 10H has coinciding rectangular hole 21H.

Figure 6I:
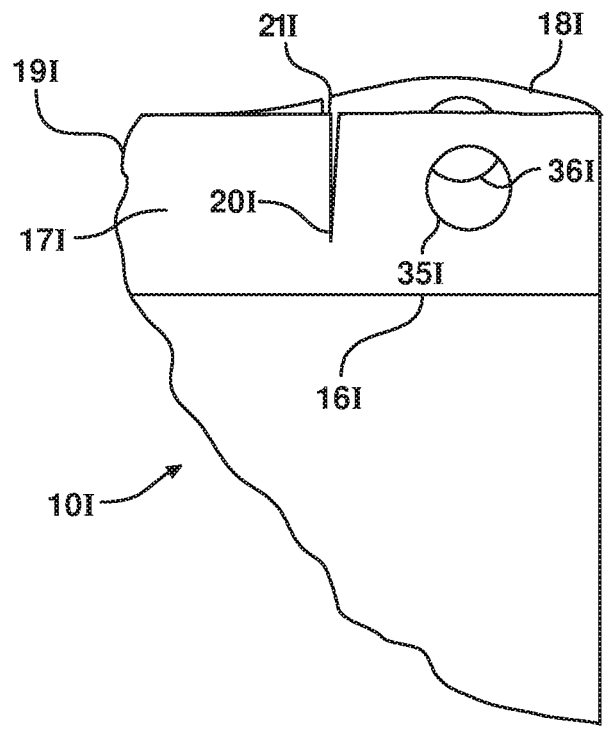
FIG. 6I is an enlarged detailed view of the tear initiation feature of the bag of FIG. 1, with the further addition of a manual grip-enhancer.

In FIG. 6I, bag 10I has end seal 16I and bag skirt 19I in first and second lay-flat sides of bag 10I. First lay-flat side 17I of bag 10I has slit 20I and grip-assist hole 35I, and second lay-flat side 18I of bag 10I has coinciding slit 21I and coinciding grip-assist hole 36I.

Figure 6J:
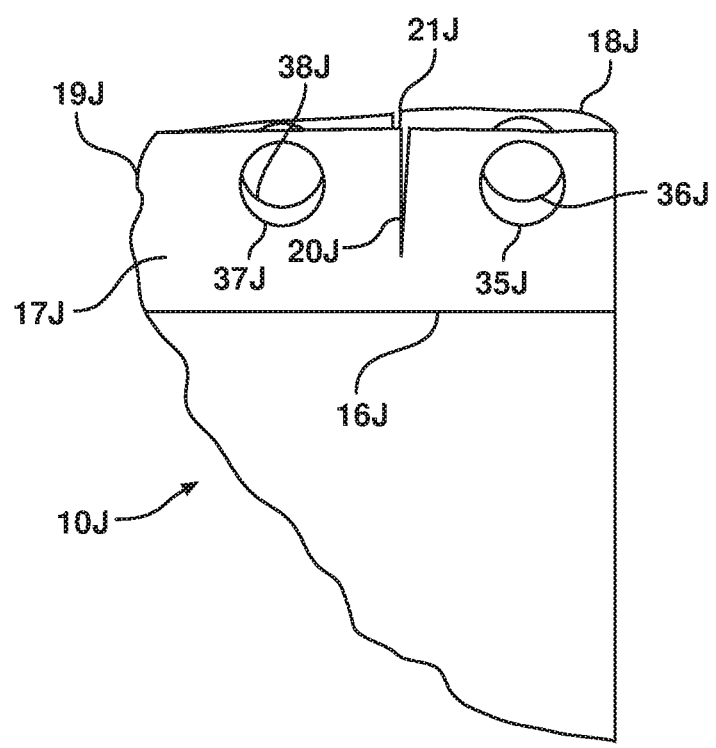
FIG. 6J is an enlarged detailed view of the tear initiation feature of the bag of FIG. 1, with the further addition of another manual grip enhancer.
Figure 6K:
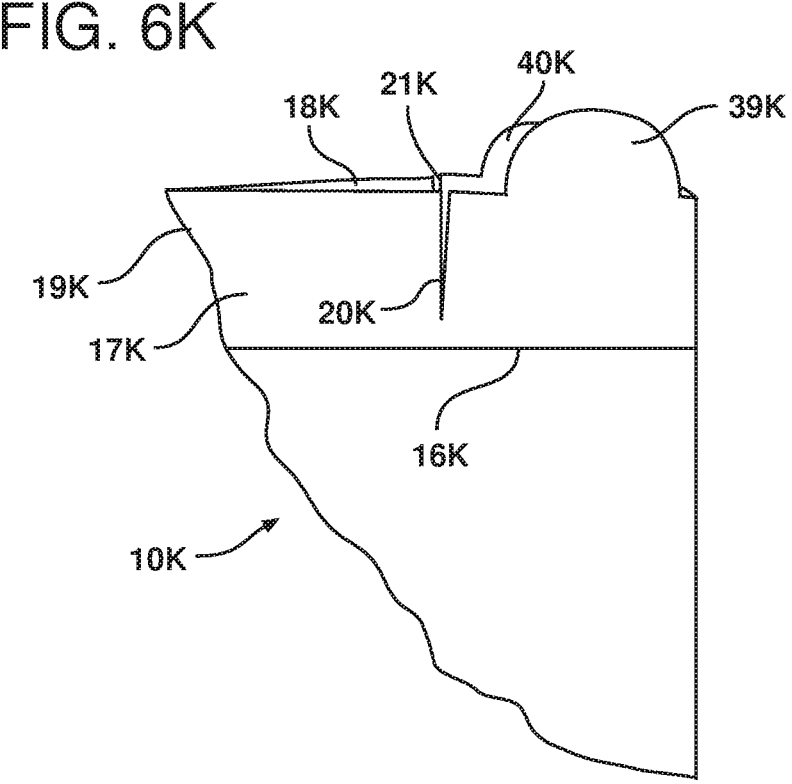
FIG. 6K is an enlarged detailed view of the tear initiation feature of the bag of FIG. 1, with the further addition of another manual grip enhancer.

In FIG. 6J, bag 10J has end seal 16J and bag skirt 19J in first and second lay-flat sides of bag 10J. First lay-flat side 17J of bag 10J has slit 20J and grip-assist holes 35J and 37J, and second lay-flat side 18J of bag 10J has coinciding slit 21J and coinciding grip-assist holes 36J and 38J.

In FIG. 6K, bag 10K has end seal 16K and bag skirt 19K in first and second lay-flat sides of bag 10K. First lay-flat side 17K of bag 10K has slit 20K and grip-assist tab 39K, and second lay-flat side 18K of bag 10K has coinciding slit 21K and coinciding grip-assist tab 40K.

Figure 6L:
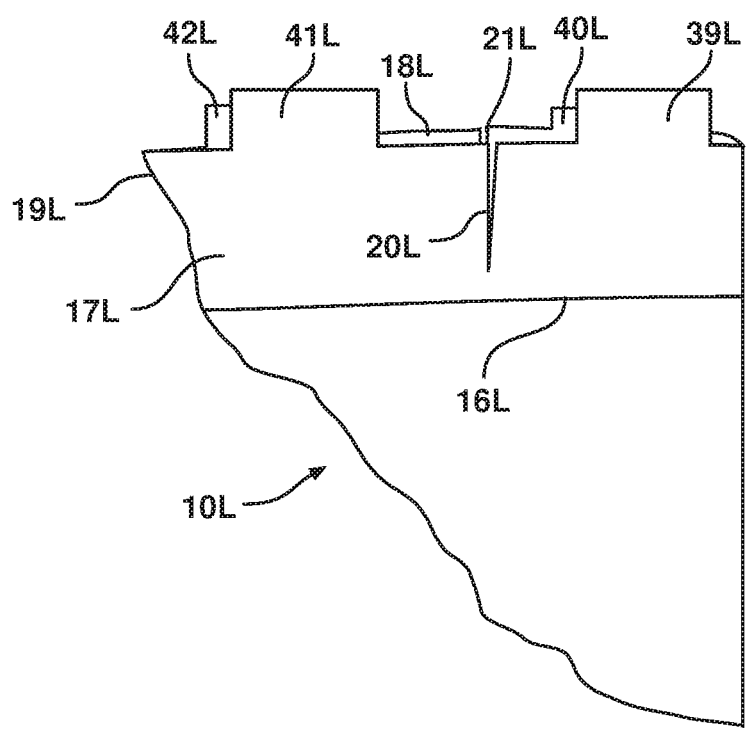
FIG. 6L is an enlarged detailed view of the tear initiation feature of the bag of FIG. 1, with the further addition of another manual grip enhancer.

In FIG. 6L, bag 10L has end seal 16L and bag skirt 19L in first and second lay-flat sides of bag 10L. First lay-flat side 17L of bag 10L has slit 20L and grip-assist tabs 39L and 41L, and second lay-flat side 18L of bag 10L has coinciding slit 21L and coinciding grip-assist tabs 40L and 42L.

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative embodiments including tear initiator, with most of these embodiments further including a grip assister. The grip assister is illustrated as a chadless-hole in FIGS. 6M, 6Q, 6U, 6BB, 6CC, and 6DD. The grip assister is illustrated as a hole with hanging chad in FIGS. 6N, 6O, 6P, 6R, 6S, 6T, 6V, 6W, 6X, 6Y, and 6FF.

Figure 6M:
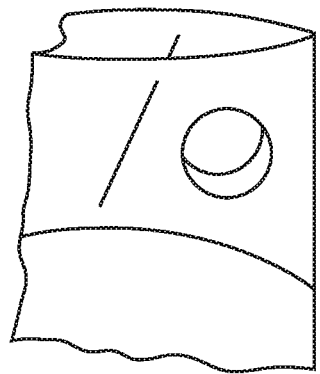
Figure 6N:
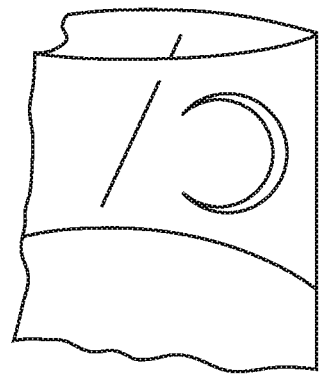
Figure 6O:
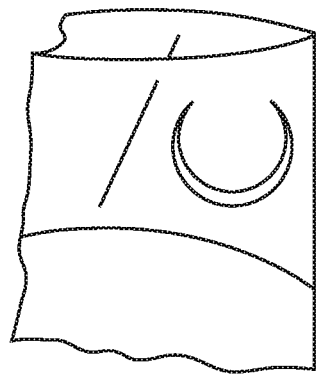
Figure 6P:
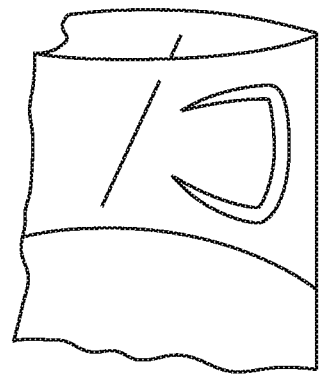
Figure 6Q:
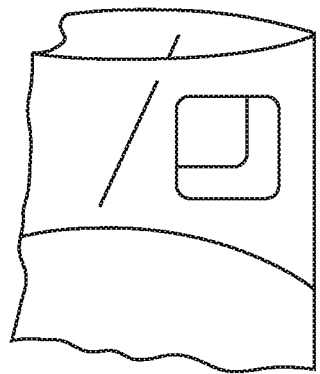
Figure 6R:
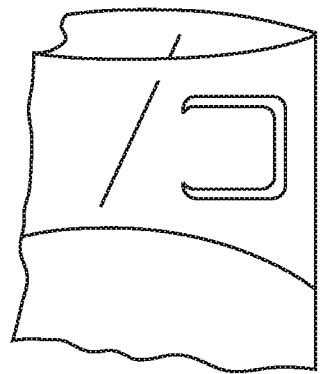
Figure 6S:
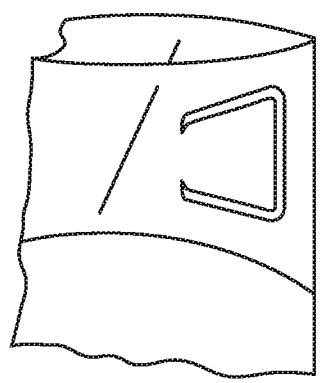
Figure 6T:
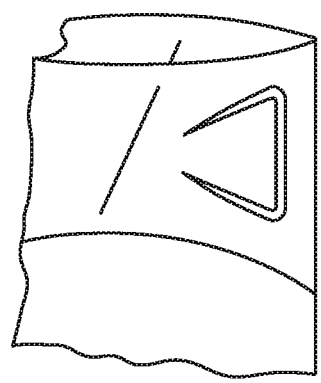
Figure 6U:
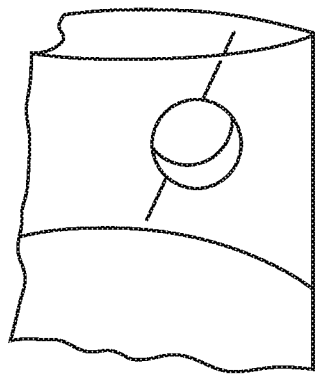
Figure 6V:
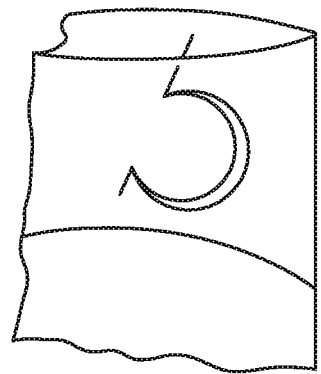
Figure 6W:
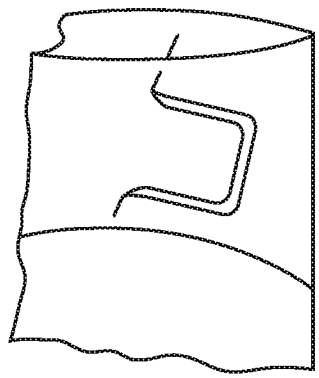
Figure 6X:
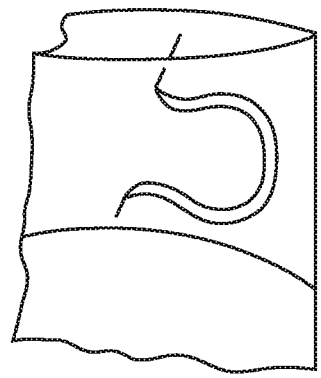
Figure 6Y:
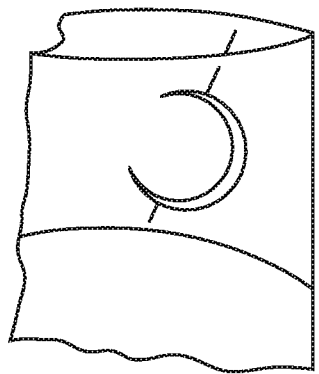
Figure 6Z:
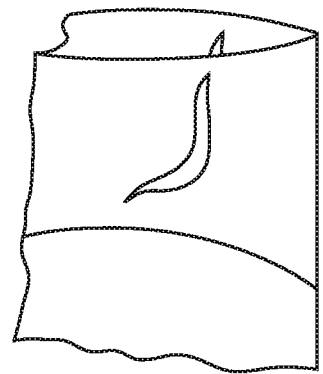
Figure 6A:
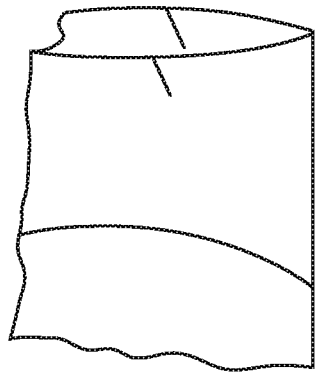
Figure 6B:
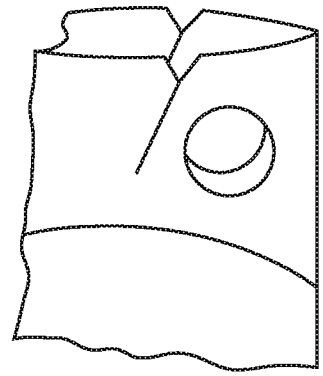
Figure 6C:
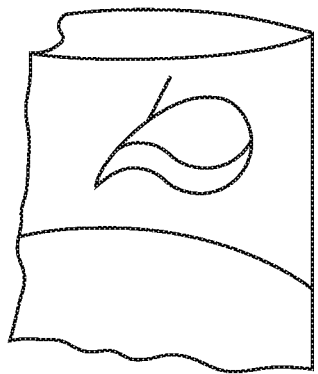
Figure 6D:
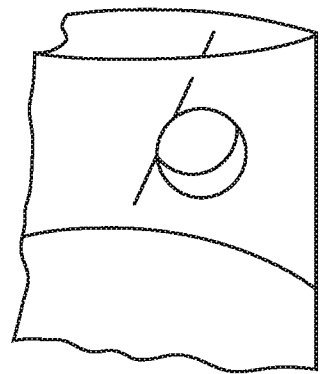
Figure 6E:
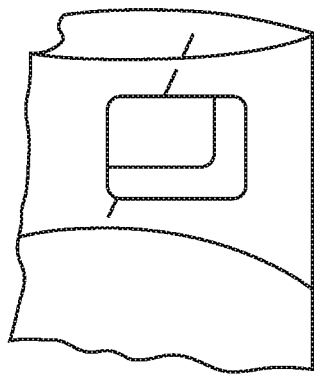
Figure 6F:
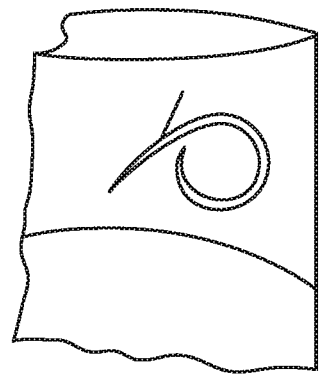

It has been found that tear initiation can be generated with less force if the tear initiator is a slit angled relative to the side edge of the packaging article, i.e., into the packaging article, as illustrated in, for example, FIG. 6M. The slit can be angled from 1 to 45 degrees off of the machine direction, or angled from 3 to 30 degrees, or angled from 5 to 25 degrees, or angled from 10 to 20 degrees, or angled about 15 degrees.

A plurality of the heat-shrinkable end-seal bags of can be supplied individually in a container, or as a set of individual bags in shingled relationship on one or more tapes in accordance with U.S. Pat. No. 4,113,139, hereby incorporated, in its entirety, by reference thereto.

Figure 7A:
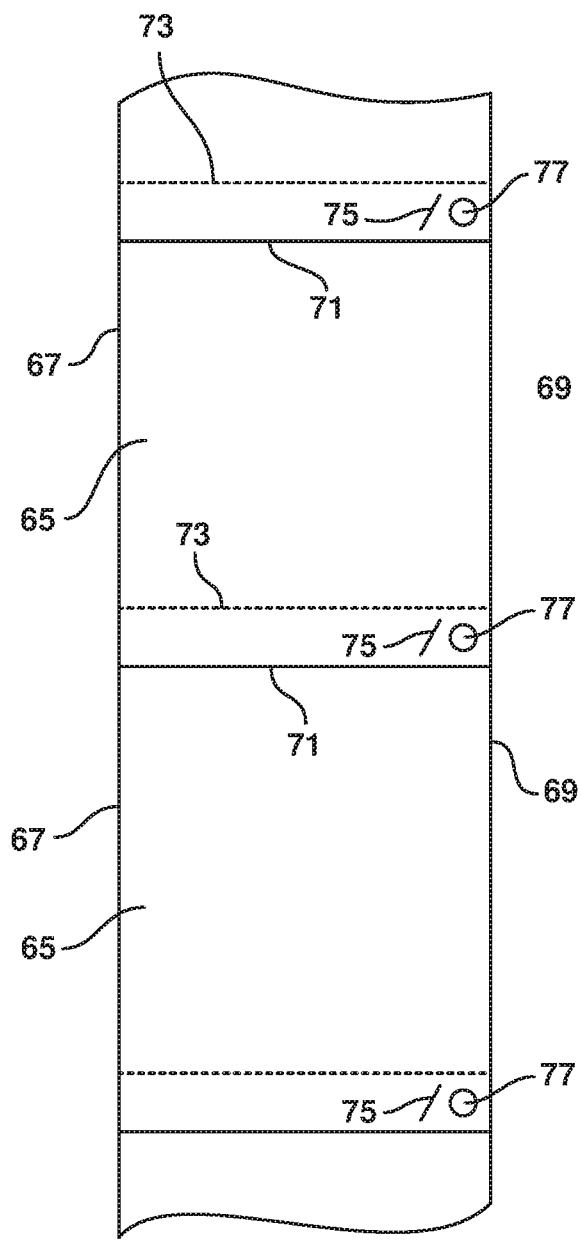
FIG. 7A is a schematic view of a first embodiment of a continuous strand of bags connected by a serration line.
Figure 7B:
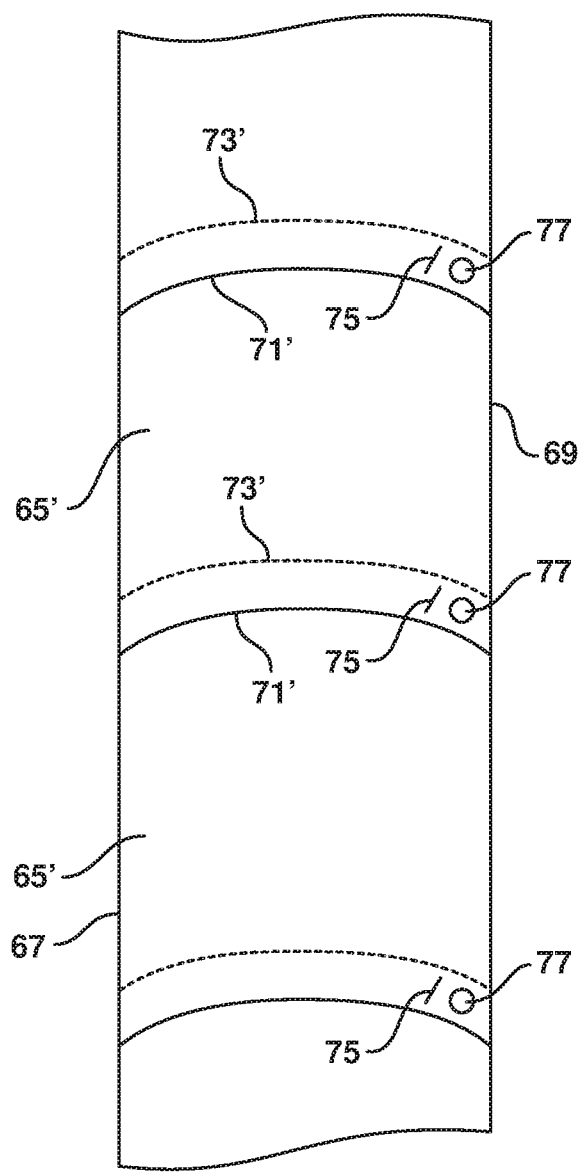
FIG. 7B is a schematic view of a second embodiment of a continuous strand of bags connected by a serration line.

Alternatively, a plurality of bags can be provided as a continuous strand of serrated bags, as illustrated in FIGS. 7A, 7B, and 7C. The continuous strands of bags in these figures are end-seal bags connected to one another in end-to-end, with a tear line of perforations being present so that bags can be torn off of the strand. FIG. 7A illustrates a portion of an elongate strip composed of a large number of end seal bags 65 made from a continuous seamless film tubing. Each end-seal bag has first side edge 67, second side edge 69, bottom seal 71, a bottom edge connected to top edge of adjoining bag along frangible tear line 73 formed by perforations through both lay-flat sides of the seamless film tubing. Each end-seal bag 65 is also provided with tear initiator 75 and grip assister 77, in the form of a hole through each lay-flat side of the bag. One or both of the holes can be made with a hanging chad therein, as described above.

FIG. 7B illustrates an alternative set of bags 65' also made from a continuous seamless film tubing. Each end-seal bag 65' has first side edge 67, second side edge 69, curved bottom seal 71', a curved bottom edge connected to a curved top edge of the adjoining bag along curved tear line 73' formed by perforations through both lay-flat sides of the seamless film tubing. Each end-seal bag 65' is also provided with tear initiator 75, and grip assister 77 in the form of a hole through each lay-flat side of the bag.

FIG. 7C illustrates an alternative set of bags 65" also made from a continuous seamless film tubing. Each end-seal bag 65" has first side edge 67, second side edge 69, curved bottom seal 71', and straight bottom edge connected to a straight top edge of the adjoining bag along straight tear line 73 formed by perforations through both lay-flat sides of the seamless film tubing. Each end-seal bag 65" is also provided with tear initiator 75, and grip assister 77 in the form of holes through each lay-flat side of the bag.

The combination of the straight tear line 73 and the curved bottom seal 71' in the strand of serrated bags illustrated in FIG. 7C, provide extra space for the tear initiators and manual grip assisters while at the same time providing a curved seal to better fit a variety of meat products to be packaged in the shrinkable bags. Otherwise, the tear initiators and the manual grip assisters require greater bag skirt length (e.g., the bags in FIGS. 7A and 7B) to provide the same amount of space for the tear initiators and grip assisters. Moreover, straight tear line 73 provides bags that avoid the curvature at the open top end of the bag. Curved top edge of the packaging articles of a curved edge bag top as in the bags of FIG. 7B can cause problems on various commercial automated bag loaders that utilize pressurized air inflation to open the bag, as the pointed edge regions of the bags tend to fold inward. Moreover, the pointed edge of a curved edge bag top may get out of the required alignment for use with suction cup style bag commercial bag opening devices.

FIG. 8 illustrates a schematic of a preferred process for producing the multilayer heat-shrinkable film from which the packaging article can be made. In the process illustrated in FIG. 8, solid polymer beads (not illustrated) are fed to a plurality of extruders 120 (for simplicity, only one extruder is illustrated). Inside extruders 120, the polymer beads are forwarded, melted, and degassed, following which the resulting bubble-free melt is forwarded into die head 122, and extruded through an annular die, resulting in tubing 124 which is 10 to 30 mils thick, more preferably 15 to 25 mils thick.

After cooling or quenching by water spray from cooling ring 126, tubing 124 is collapsed by pinch rolls 128, and is thereafter fed through irradiation vault 130 surrounded by shielding 132, where tubing 124 is irradiated with high energy electrons (i.e., ionizing radiation) from iron core transformer accelerator 134. Tubing 124 is guided through irradiation vault 130 on rolls 136. Preferably, tubing 124 is irradiated to a level of about 4.5 MR.

After irradiation, irradiated tubing 138 is directed through nip rolls 140, following which tubing 138 is slightly inflated, resulting in trapped bubble 142. However, at trapped bubble 142, the tubing is not significantly drawn longitudinally, as the surface speed of nip rolls 144 are about the same speed as nip rolls 140. Furthermore, irradiated tubing 138 is inflated only enough to provide a substantially circular tubing without significant transverse orientation, i.e., without stretching.

Slightly inflated, irradiated tubing 138 is passed through vacuum chamber 146, and thereafter forwarded through coating die 148. Second tubular film 150 is melt extruded from coating die 148 and coated onto slightly inflated, irradiated tube 138, to form two-ply tubular film 152. Second tubular film 150 preferably comprises an $O_2$-barrier layer, which does not pass through the ionizing radiation. Further details of the above-described coating step are generally as set forth in U.S. Pat. No. 4,278,738, to BRAX et. al., which is hereby incorporated, in its entirety, by reference thereto.

After irradiation and coating, two-ply tubing film 152 is wound up onto windup roll 154. Thereafter, windup roll 154 is removed and installed as unwind roll 156, on a second stage in the process of making the tubing film as ultimately desired. Two-ply tubular film 152, from unwind roll 156, is unwound and passed over guide roll 158, after which two-ply tubular film 152 passes into hot water bath tank 160 containing hot water 162. The now collapsed, irradiated, coated tubular film 152 is submersed in hot water 162 (having a temperature of about 210° F.) for a retention time of at least about 5 seconds, i.e., for a time period in order to bring the film up to the desired temperature for biaxial orientation. Thereafter, irradiated tubular film 152 is directed through nip rolls 164, and bubble 166 is blown, thereby transversely stretching tubular film 152. Furthermore, while being blown, i.e., transversely stretched, nip rolls 168 draw tubular film 152 in the longitudinal direction, as nip rolls 168 have a surface speed higher than the surface speed of nip rolls 164. As a result of the transverse stretching and longitudinal drawing, irradiated, coated biaxially-oriented blown tubing film 170 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 166 is maintained between pinch rolls 164 and 168, blown tubing film 170 is collapsed by rolls 172, and thereafter conveyed through nip rolls 168 and across guide roll 174, and then rolled onto wind-up roll 176. Idler roll 178 assures a good wind-up.

FIG. 9 illustrates a perspective view of package 50 made by placing a meat product into an end-seal bag having end seal 51, evacuating the atmosphere from within the bag, and sealing the bag closed with packing seal 55, and thereafter trimming off and discarding the excess bag length. Bag skirt 52 has slit 53 therein as the tear initiators for initiating manual opening of package 50. Slit 53 extends in the machine direction, toward end seal 51 from bag bottom edge 54.

Figure 10:
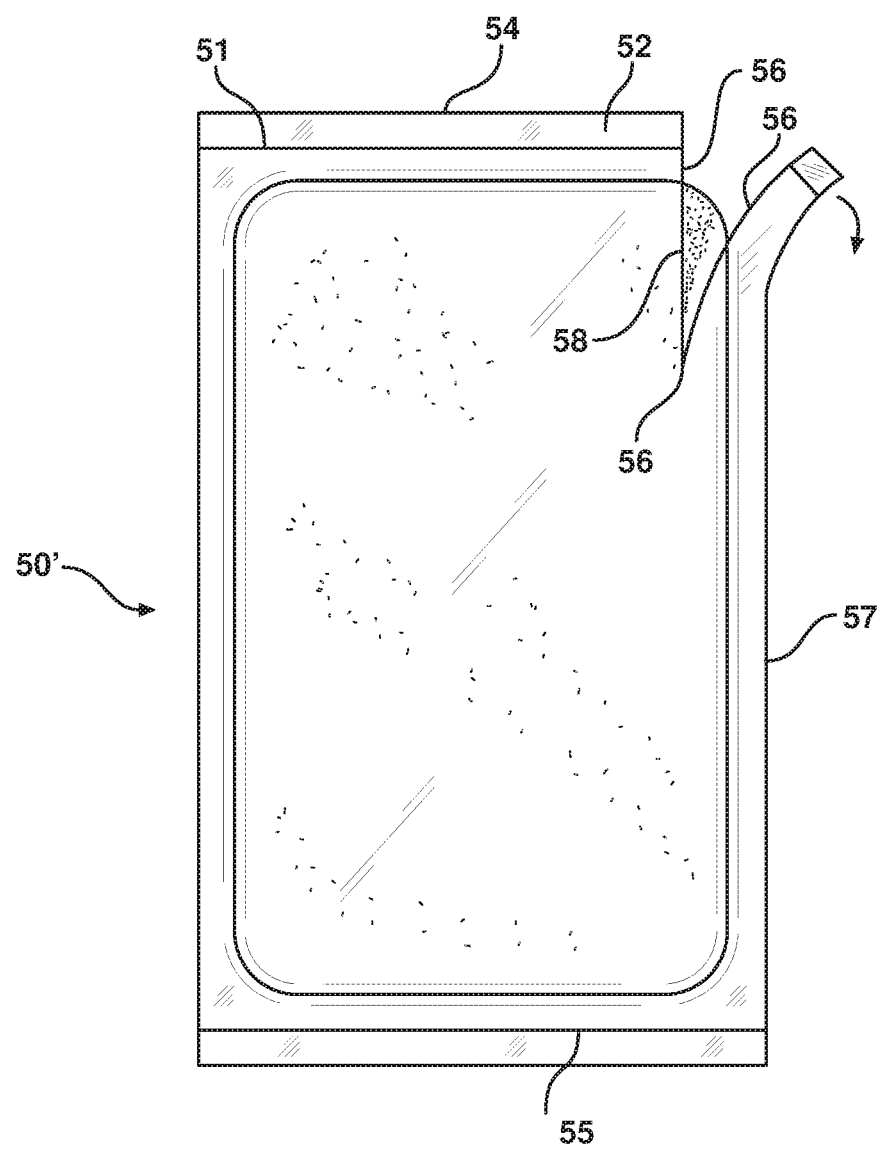
FIG. 10 is a schematic of the packaged product of FIG. 9 after the tearing has been initiated, but as the tearing remains in an intermediate state, the tearing proceeding down the bag film in the machine direction.

FIG. 10 illustrates package 50' at an intermediate stage of the manual opening process, i.e., after having initiated tearing of the bag for a distance of about 25% of the length of the bag, revealing meat product 58. Linear, machine-direction tear 56 has been manually propagated through end seal 51 and down the length of the end-seal bag. Note that machine direction tear 56 is not terminated by being propagated to side edge 57 of package 50.

Figure 11:
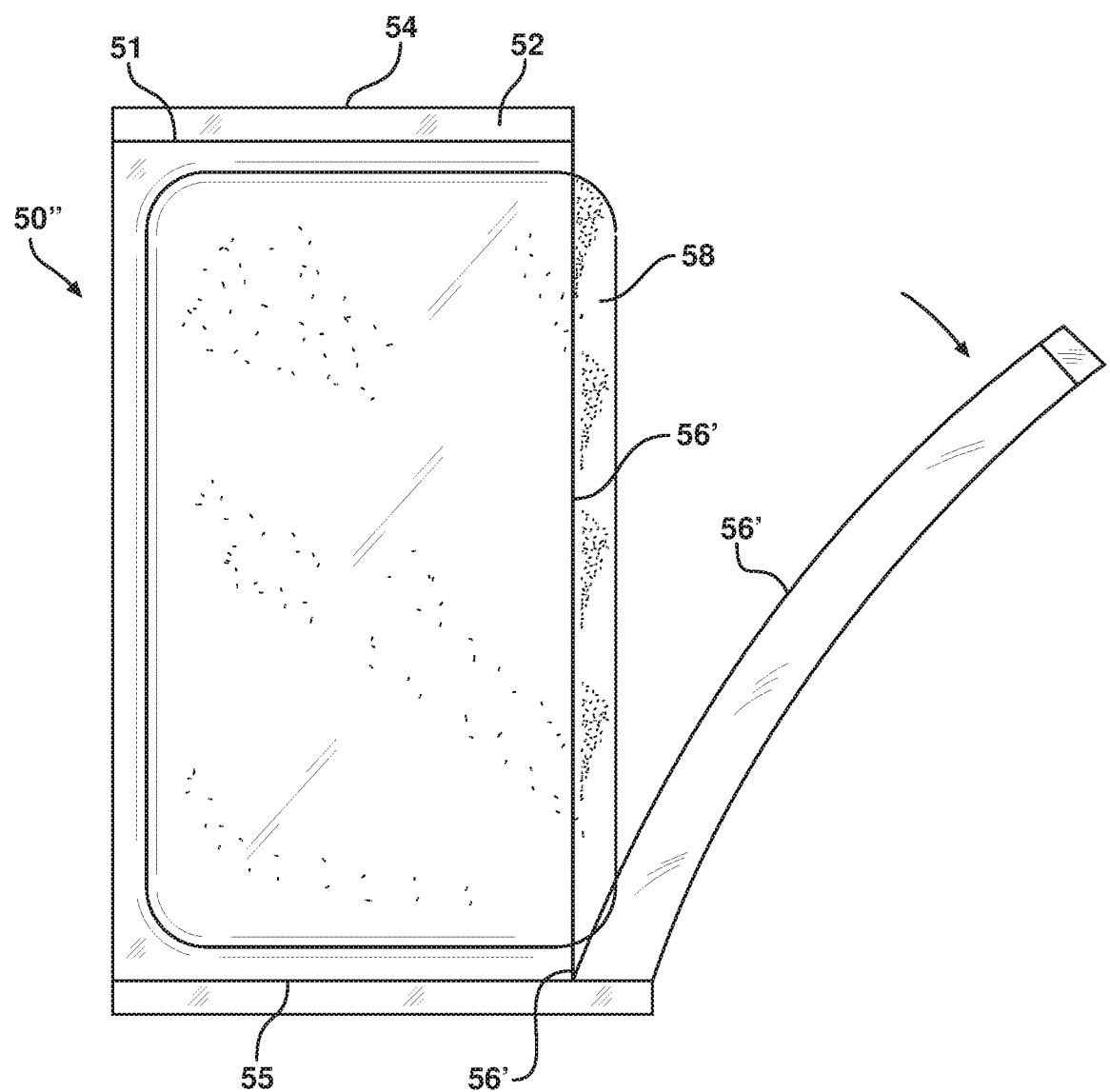
FIG. 11 is a schematic of the packaged product of FIGS. 8 and 9, after the tearing is completed.

FIG. 11 illustrates package 50" at a final stage in the manual opening process, i.e., after having torn the end-seal bag for a distance corresponding with over 90% of its length, toward the opposite edge of the packaging article of the package, exposing enough of the length of meat product 58 that the product can be readily removed from package 50". Linear, machine-direction tear 56' has been manually propagated through end seal 51 and down the length of the end-seal bag.

Figure 12:
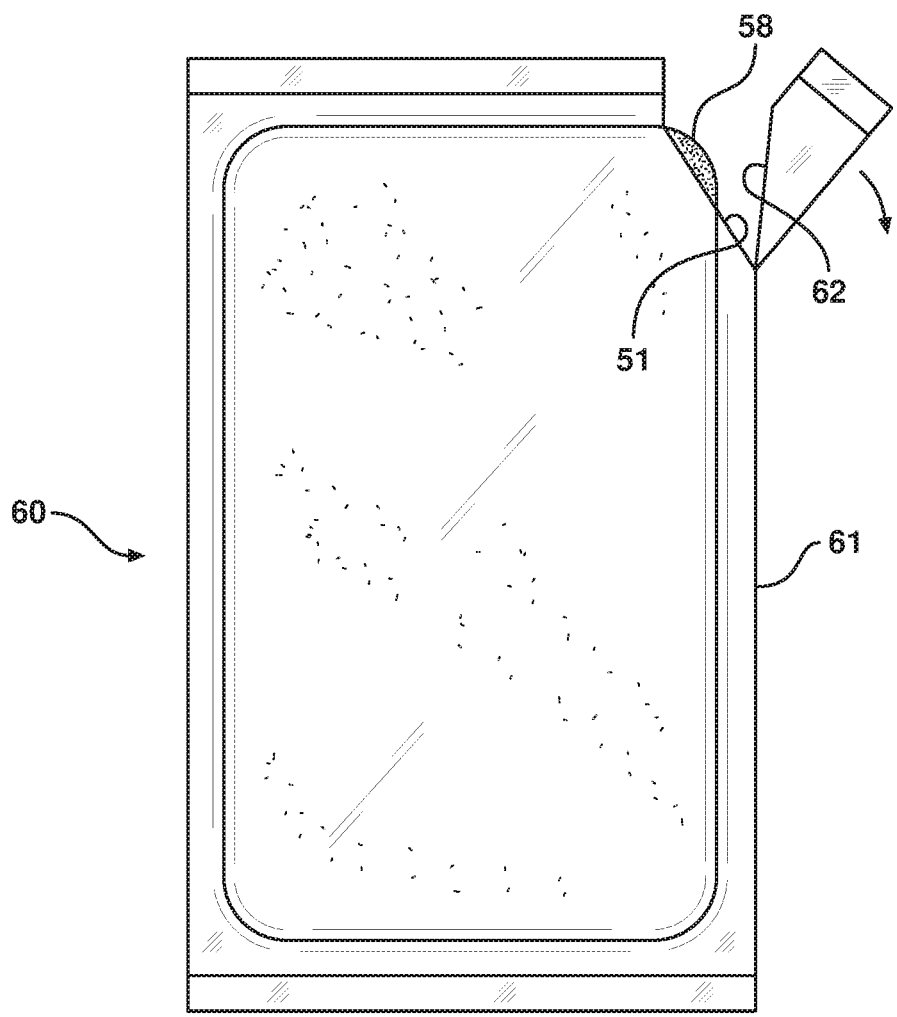
FIG. 12 is a schematic of a comparative packaged product exhibiting a tear character that does not allow tearing for the full length of the bag.

FIG. 12 illustrates a perspective view of comparative package 60 after tearing has been initiated and propagated almost to completion, i.e., almost to termination at side edge 61, about 15 to 20 percent down the length of the package. Package 60 is representative of most heat-shrinkable bags in the marketplace today, which, if provided with a tear initiator in the bag skirt, undergo this type of "dog-leg" manual tear 62 initiation and propagation to side edge 61, whereby meat product 58 cannot be readily removed from torn package 60.

Figure 13:
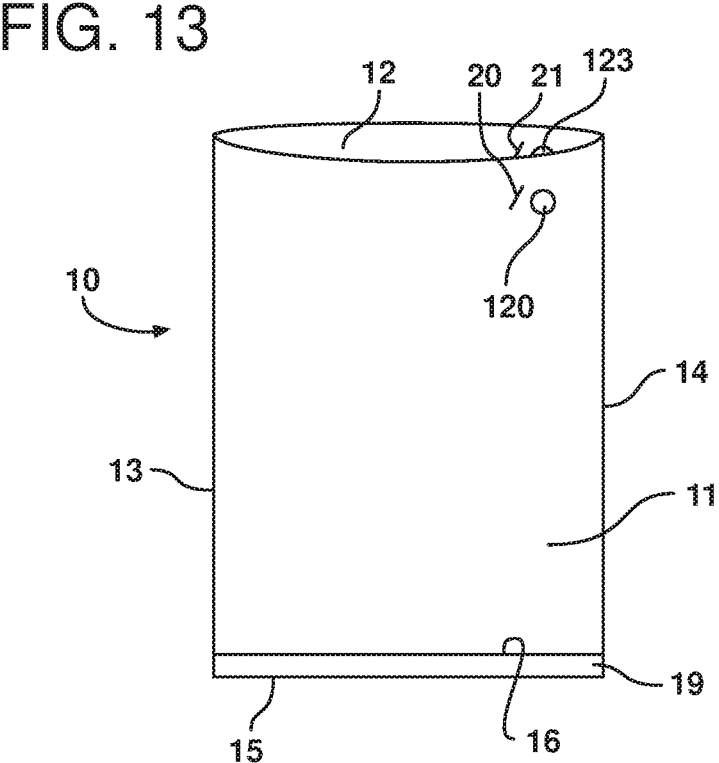
FIG. 13 is a schematic of an alternative heat-shrinkable end-seal bag in lay-flat configuration.

FIG. 13 illustrates a schematic of an alternative heat-shrinkable end-seal bag 10, in a lay-flat position. End-seal bag 10 comprises heat-shrinkable bag film 11, bag top edge 12 defining an open top, folded first side edge 13, folded second side edge 14, bottom edge 15, and end seal 16. End-seal bag 10 further has bag skirt 19 outward of end seal 16. The end-seal bag has slit 20 that is a tear initiator in the first lay-flat side of the bag, and slit 21 that is a tear initiator in the second lay-flat side of the bag. The end-seal bag also has hole 120 that is a grip assister in the first lay-flat side of the bag, and hole 123 that is a grip assister in the second lay-flat side of the bag. The tear initiator and the grip assister are located near bag top edge 12. When a product is placed in the bag and the bag sealed closed so that it surrounds the product, the tear initiator and the grip assister will then be located in the excess bag length known as the "bag tail" or as the bag "header". Frequently, the bag tail provides more area for inclusion of the tear initiator and the grip assister than bag skirt 19.

Figure 14:
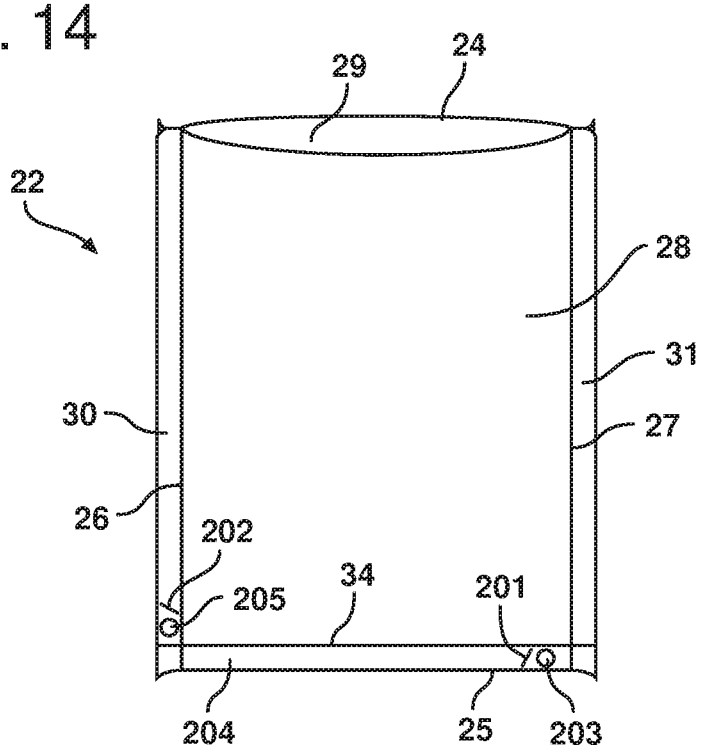
FIG. 14 is a schematic of an alternative heat-shrinkable side-seal bag in lay-flat configuration.

FIG. 14 illustrates a schematic view of alternative side-seal bag 22 in lay-flat configuration. Side-seal bag 22 comprises top edge 24 defining an open top, folded bottom edge 25, first side seal 26, and second side seal 27, transverse bottom seal 34, first lay-flat side 28, second lay-flat side 29, first bag skirt 30, and second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiator 201 and first grip assister 203, each of which is present in both lay-flat sides of bag 22. First bag skirt 30 comprises second tear initiator 202 and second grip assister 204, each of which are present in both lay-flat sides of bag 22. After a product is placed in the bag, and the bag sealed closed, side-seal bag 22 can be opened by making a first tear propagated from first tear initiator 201, the tear being propagated for the full length of bag 22, thereby opening the bag for removal of the product. Thereafter, side-seal bag 22 can undergo a second tear propagated from second tear initiator 202, the second tear being propagated across the full remaining width of bag 22, enhancing the ease of removal of the product from the opened package.

Figure 15:
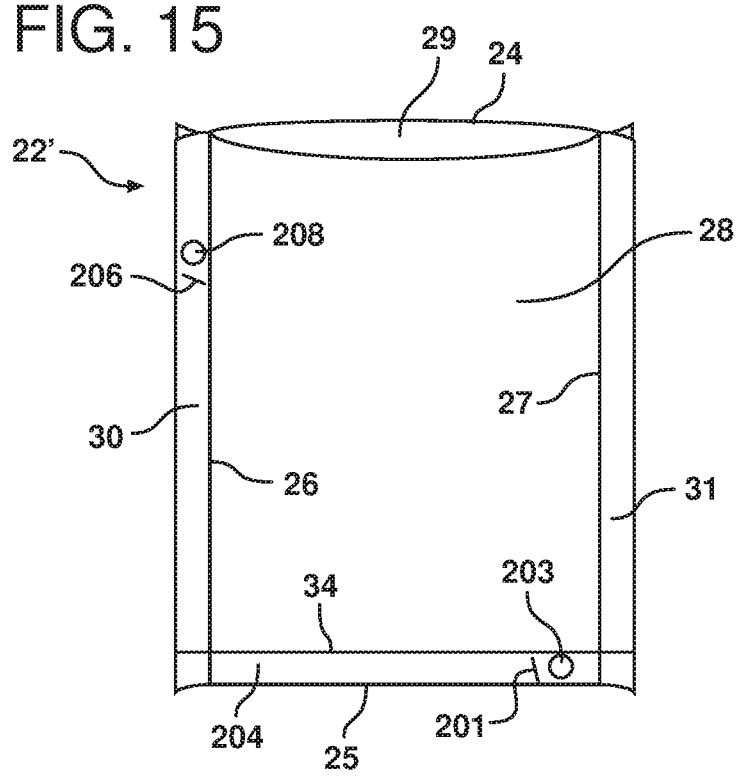
FIG. 15 is a schematic of another alternative side-seal bag in lay-flat configuration.

FIG. 15 illustrates a schematic view of alternative side-seal bag 22' in lay-flat configuration. Bag 22' has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiator 201 and first grip assister 203, each of which is present in both lay-flat sides of bag 22. First bag skirt 30 comprises second tear initiator 206 and second grip assister 208, each of which are present in both lay-flat sides of bag 22'. After a product is placed in the bag, and the bag sealed closed, the package made from bag 22' can be opened by making a first tear propagated from first tear initiator 201, the tear being propagated for the full lengths of bag 22', thereby opening the bag for removal of the product. Thereafter, bag 22' can undergo a second tear propagated from second tear initiator 206, the second tear being propagated across the full remaining width of bag 22', thereby enhancing the ease of removal of the product from the opened package. Unlike bag 22 of FIG. 14, the order of which tear is made first is not important in the opening of bag 22'.

Figure 16:
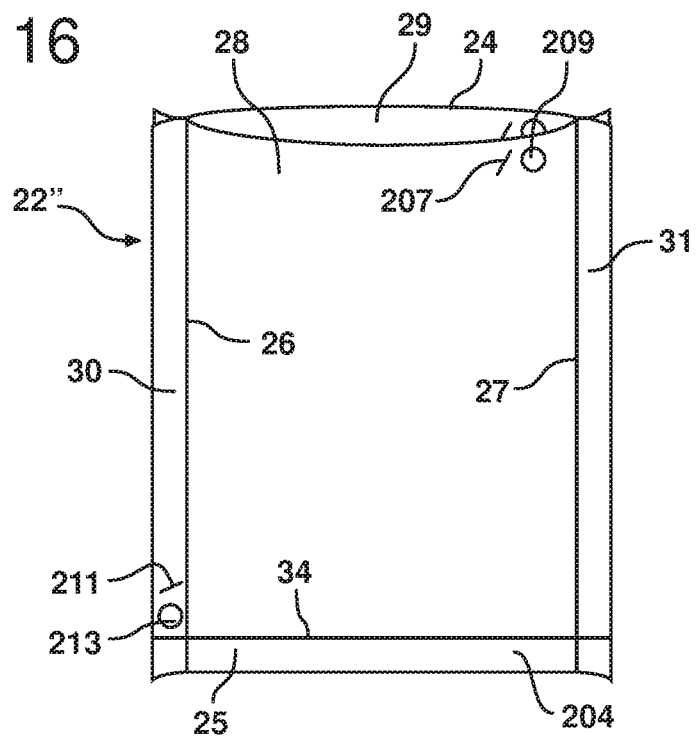
FIG. 16 is a schematic of yet another side-seal bag in lay-flat configuration.

FIG. 16 illustrates a schematic view of alternative side-seal bag 22" in lay-flat configuration. Bag 22" has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outward of bottom seal 34. Near the top edge 24 of bag 22", in a region intended to be a bag tail after a product is placed into bag 22" and a seal made across bag 22" so that the product is fully enclosed within the bag, is first tear initiator 207 and first grip assister 209, each of which are present in both lay-flat sides of bag 22". First bag skirt 30 comprises second tear initiator 211 and second grip assister 213, each of which are present in both lay-flat sides of bag 22" After a product is placed in bag 22", and the bag sealed closed, the package made from bag 22" can be opened by making a first tear propagated from first tear initiator 207, the tear being propagated for the full lengths of bag 22", thereby opening the bag for removal of the product. Thereafter, bag 22" can undergo a second tear propagated from second tear initiator 211, the second tear being propagated across the full remaining width of bag 22", thereby enhancing the ease of removal of the product from the opened package.

Figure 17:
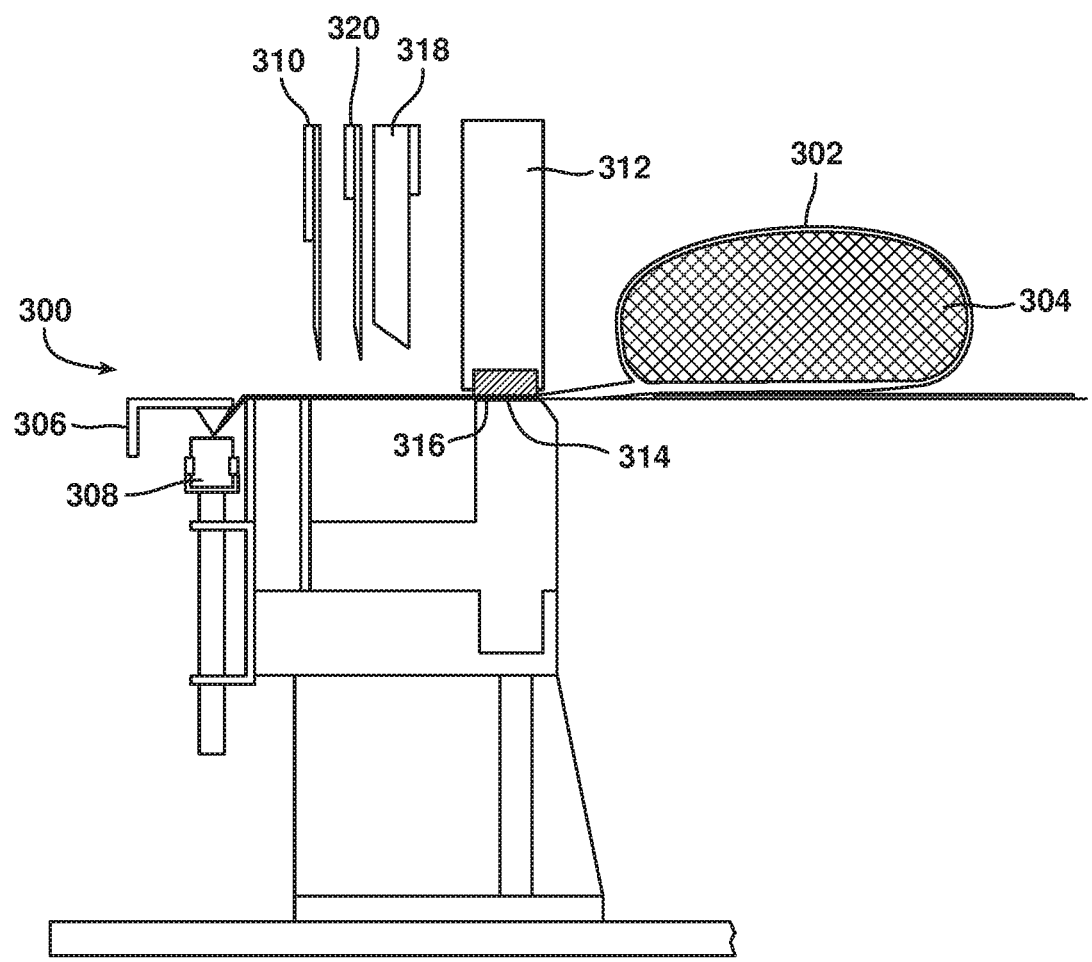
FIG. 17 is a schematic of an apparatus for carrying out the process of placing tear initiators in the header region of a packaging article.

FIG. 17 is a schematic of an apparatus for carrying out the process of placing tear initiators in the header region of a heat-shrinkable end-seal bag, with the tear initiators being made in the header during the packaging process. The tear initiators (and the optional grip assisters) can be made in the bag either before or after the product is placed into the packaging article, either before or after the bag is evacuated, and either before or after the heat seal is made to close the bag. Placing the tear initiators in the bag after the product is placed in the bag eliminates the potential for the tear initiator to cause the bag to tear during loading. Although the packaging article in FIG. 17 is an end-seal bag, the packaging article could be any packaging article in accordance with any one or more of the various aspects of the invention described above.

FIG. 17 illustrates a portion of vacuum chamber packaging machine 300, such as a series 8600 automated rotary chamber vacuum packaging machine from Cryovac, Inc. After end-seal bag 302 having product 304 therein is placed into the opened vacuum chamber, vacuum chamber lid 306 comes down to close the vacuum chamber and clamp across the top (header) portion of bag 302, so that bag 302 is clamped between chamber lid 306 and vacuum chamber base 308. For simplicity, only small portions of chamber lid 306 and chamber base 308 are illustrated in FIG. 17. For more detailed information on this machine, see U.S. Pat. No. 4,550,548, which is hereby incorporated by reference, in its entirety.

Once bag 302 is clamped into position and chamber lid 306 closed, one or more holes are punched through both sides of the header portion of bag 302 by the downward movement of piercing knife 310, which thereafter is retracted to the position illustrated. These holes allow atmosphere to readily evacuate bag 302 as the atmosphere is evacuated from the closed vacuum chamber. After atmospheric evacuation has been completed, seal seat 312 moves downward (i.e., into the position illustrated in FIG. 17) so that bag 302 is clamped between heat seal wires 314 and heat seal platen 316. Heat seal wires 314 are heated to produce a heat seal across bag 302, resulting in the closure of bag 302 and the formation of a packaged product. Shortly thereafter, tear-initiator knife 318 is activated downward and then retracted, with tear-initiator knife 318 piercing both sides of bag 302 to produce machine-direction tear initiators in each side of the header of bag 302. Optionally, a separate grip-assister knife (not illustrated, but preferably located alongside and spaced a short distance from knife 318) is activated downwardly and then retracted, so that it cuts through both sides of the header of bag 302, to form a grip assister in each side of bag 302. Cut-off knife 320 is then downwardly activated to cut off the excess length from the header of bag 302. Then the chamber is opened and the now easy-open packaged product is removed from the chamber.

While the process described above with respect to FIG. 17 could be used to make an easy open packaged product, alternatively the process could be carried out on vertical form fill and seal machines or on horizontal form fill and seal machines, to produce easy open packaged products. Typically, vertical and horizontal form fill and seal processes are not carried out under vacuum. Such equipment, packages, and processes are set forth in U.S. Pat. Nos. 4,905,452, 4,861,414, and 4,768,411, each of which is hereby incorporated, in its entirety, by reference thereto.

The tear initiators (and the optional grip assisters) can also be designed to facilitate automated opening, in addition to being designed to facilitate manual tearing to open the package. Automated tearing devices include hooks actuated by pneumatic actuators (air or hydraulic or electric), divergent hooks on chain conveyors, motorized hooks, and clamps in place of hooks.

Figure 18:
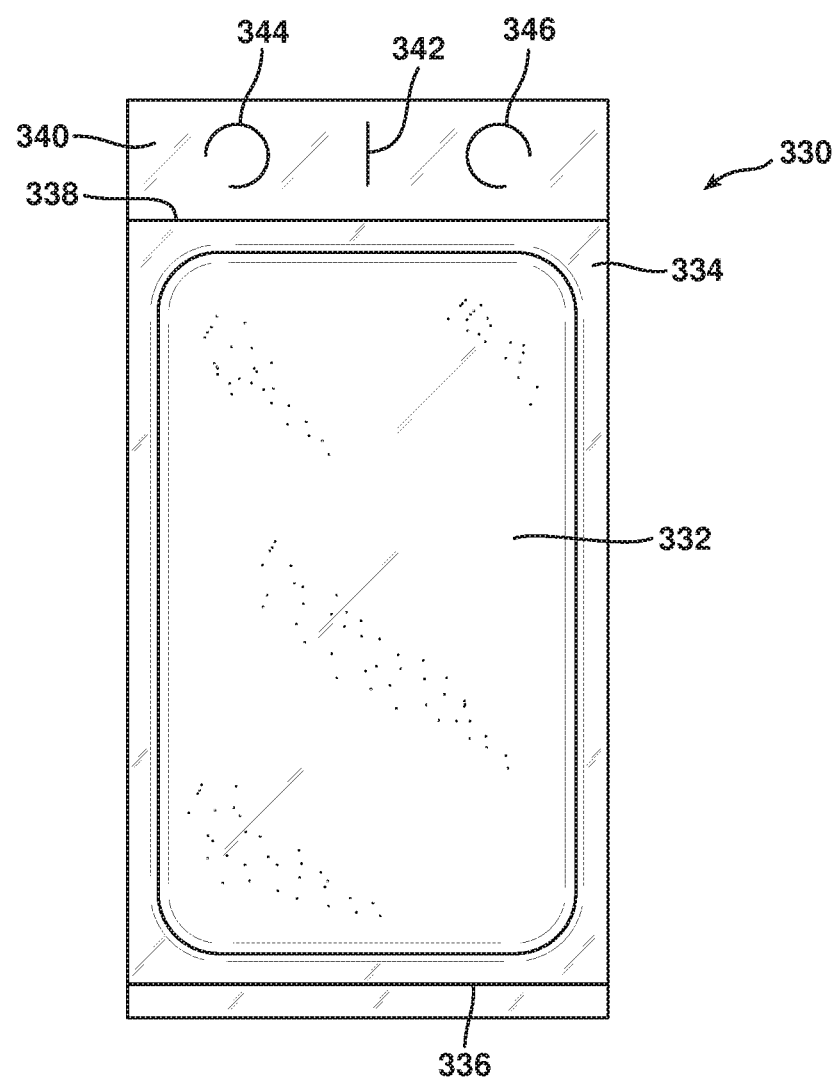
FIG. 18 illustrates a schematic of an easy open package in which the easy open feature is similar to the feature in FIG. 6J, but which is designed for automated package opening.

FIG. 18 illustrates a schematic of packaged product 330 in which product 332 is packaged inside packaging article 334 having factory seal 336 and customer seal 338. Packaging article 334 includes header 340 with tear initiator 342 through each side of the package and with pairs of grip assisters 344 and 346, each pair being through both sides of the package, with one pair being on a first side of tear initiator 342, and the other pair being on the other side of tear initiator 342. In this manner, pairs of hooks or clamps can grip the package utilizing grip assisters 344 and 346 to thereafter automatically open packaging article 334. A robot, or another device that grips and tears the package open, or hanging the packaged product on hooks on diverging tracks, could be used to automatically open package 334.

Figure 19:
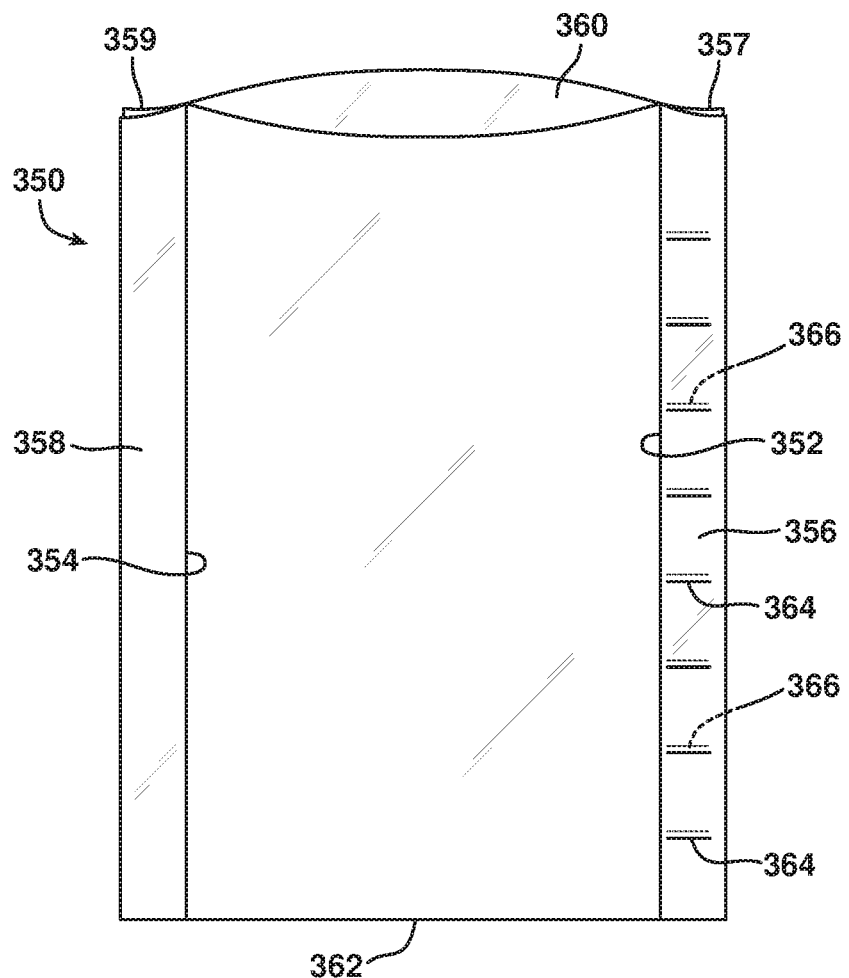
FIG. 19 illustrates a schematic of a heat-shrinkable, easy-open, side-seal bag having a plurality of pairs of tear initiators at intervals along one of the bag skirts.

FIG. 19 illustrates side-seal bag 350 having first side seal 352, second side seal 354, skirt sides 356 and 357 outward of first side seal 352, skirt sides 358 and 359 outward of second side seal 354, open top 360, and folded bottom edge 362. Skirt side 356 has a plurality of tear initiators 364 therein, and skirt side 357 has therein a plurality of tear initiators 366 (illustrated with dotted lines). The plurality of tear initiators 364 are positioned at intervals along skirt side 356, and the plurality of tear initiators 366 are positioned at intervals along skirt side 357. Each individual tear initiator 364 in skirt side 356 is paired with an individual tear initiator 366 in skirt side 357, so that paired sets of tear initiators 364 and 366 are provided. In the embodiment of FIG. 19, bag 350 is shown in lay-flat configuration, with each individual tear initiator 364 aligning directly over each individual tear initiator 366.

Upon packaging a product in bag 350 and sealing bag 350 closed and shrinking bag 350 around the product inside, a tearing force exerted at a paired set of individual tear initiators 364 and 366 simultaneously initiates two machine-direction tears, each tear passing through heat seal 352 and thereafter propagating across the film along a line traversing a portion of the film that corresponds with what was a single lay-flat side of bag 350 before the shrinking of the film around the product. The tears are propagated through skirt sides 356 and 357, through heat seal 352, across the package, through seal 354, and then through skirt sides 358 and 359, so that a portion of the film can be detached from the remainder of the film, in order to expose a portion of the product and/or allow the product to be removed from the package. Of course, if the film has been shrunk tightly around the product, the removal of a portion of the film leaves the remainder of the film wrapped tightly around the product, thereby preserving freshness. As is also apparent from FIG. 19, tear initiators 364 and 366 can be slits oriented perpendicular to seal 352. As such, tear initiators 364 and 366 are oriented directly in line with the machine direction in which the film was produced.

In FIG. 19, skirt sides 356 and 357 are each provided with a plurality of tear initiators so that upon packaging a product within bag 350 and shrinking the film around the product, two tears can be initiated from a first paired set of tear initiators 364 and 366, i.e., a pair of tear initiators close to either folded bottom edge 362 or the transverse heat seal (not illustrated) made across the top of bag 350 to close bag 350 after the product is placed into bag 350. The two tears can be propagated across the film in tears corresponding with the width of the package. Each tear is made across what was originally one lay-flat side of bag 350. The result of tearing all the way across the package is that a portion of the film making up the package is removed to expose a portion of the product, while leaving a remainder of the product covered by the remaining portion of the film making up the package. In this manner, most or substantially all of the unused portion of the product can remain covered by the film, with the remainder of the product thereby retaining greater freshness than if it is exposed to the environment, including handling.

If desired, the now-exposed end of the remainder of the product can be covered with a separate cover, such as a separate piece of film, such as stretch film or the like. As more product is desired for consumption, the next pair of individual tear initiators in the sequence can be utilized to make another tear across the entirety of the package, and more product removed, and the process repeated, until all of the product is consumed.

Figure 20:
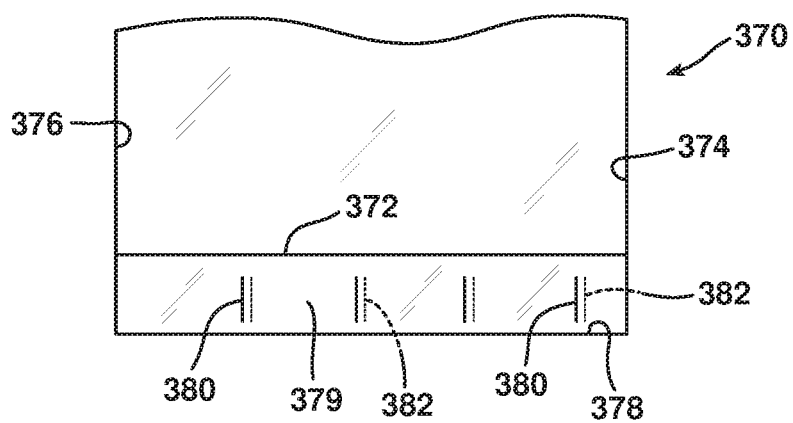
FIG. 20 illustrates a schematic of a portion of a heat-shrinkable, easy-open, end-seal bag 370 having a pair of tear initiators along at intervals along the bag skirt.

FIG. 20 illustrates a portion of an end-seal bag 370 having end seal 372, first folded side edge 374, second folded side edge 376, bottom edge 378, skirt 379, a plurality of first tear initiators 380 in a first side of skirt 379, a plurality of second tear initiators 382 (illustrated with dotted lines) in a second side (not illustrated) of skirt 379, with the plurality of first tear initiators 380 being positioned at intervals along the first side of skirt 379, and the plurality of second tear initiators 382 being positioned at intervals along the second side of skirt 379. Each individual tear initiator 380 in the first side of skirt 379 is paired with an individual tear initiator 382 in the second side of skirt 379, to together provide a paired set of two tear initiators. When end-seal bag 370 is in the lay-flat configuration, each of the first tear initiators 380 aligns directly over a corresponding second tear initiator 382. After placing a product in the bag and sealing it closed under vacuum and shrinking the bag around the product, a manual tearing action at the location of a single pair of tear initiators 380 and 382 causes the simultaneous initiation of two machine-direction tears down the length of each lay-flat side of bag 350. In the embodiment of FIG. 20, end-seal bag 370 is showing in lay-flat configuration, with each individual tear initiator 384 aligning directly over each individual tear initiator 386. Each tear passes through heat seal 372 and thereafter propagates down the length of bag 370 along a line traversing a portion of the film that corresponds with what was a single lay-flat side of bag 370 before the shrinking of the film around the product. The tears thereafter pass through the top seal (not illustrated) as well as through the header (not illustrated) above the top seal, so that a portion of the film can be detatched from the remainder of the film, exposing a portion of the product and/or allowing the product to be removed from the package. As in FIG. 19, in FIG. 20 skirt 379 is provided with a plurality of tear initiators for use in a manner analogous to the manner described above for FIG. 19.

Figure 21:
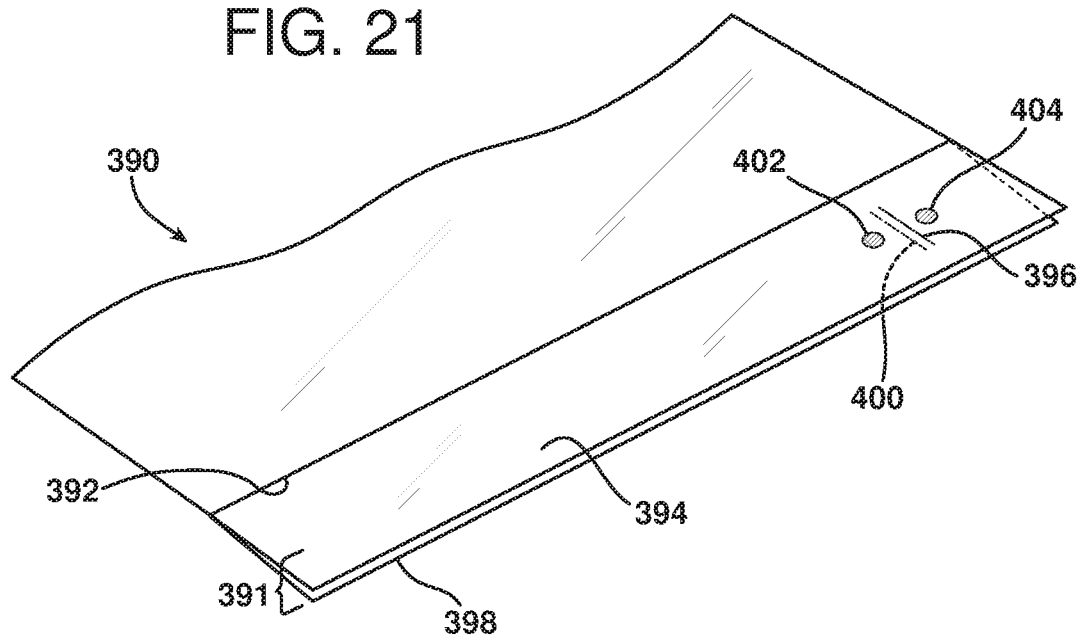
FIG. 21 is an enlarged detailed view of a portion of a header or skirt having a pair of tear initiators with heatset, bonded regions on each side of the pair of tear initiators.

FIG. 21 is an enlarged detailed view of a portion of side seal bag 390 having side seal 392 outward of which is skirt 391 having first tear initiator 396 on first side 394 and second tear initiator 400 on second side 398, with spot heat seals 402 and 404 at which first side 394 of skirt 391 is heat sealed to second side 398 of skirt 391. Those portions of the skirt 391 within spot seals 402 and 404 are heatset. Moreover, a small area of film surrounding the spot seals is also heatset, as the heat from the sealing operation generally radiates outward, heatsetting more film than just the bonded areas. After placing a product into bag 390 and evacuating the atmosphere from within bag 390 and sealing across the top of bag 390 to seal the product within the package, the packaged product is typically passed through a hot air tunnel to shrink the film around the product. Heatsetting reduces the tendency of skirt 391 to shrink during shrinking of the remainder of the film surrounding the product. Heatsetting also reduces the curling of skirt sides 394 and 398 during the shrinking of the film. The diminished curling and diminished shrink resulting from the heatsetting of portions of skirt 391 provides improved identification and utilization of tear initiators 396 and 400 by a consumer of the package.

Figure 22:
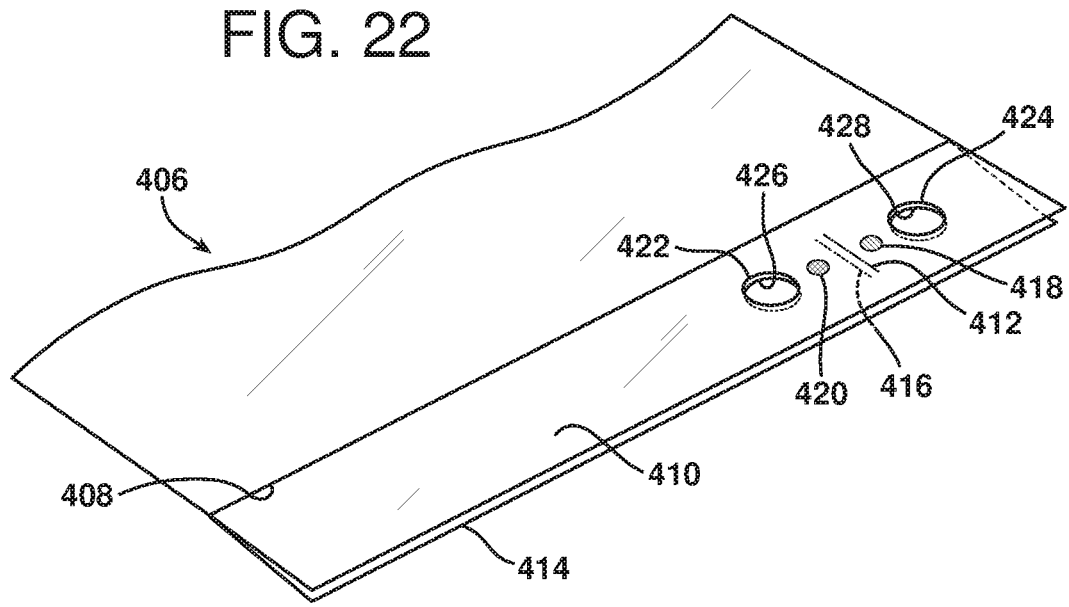
FIG. 22 is an enlarged, detailed view of a portion of a header or skirt having a pair of tear initiators with heatset, bonded regions and grip assisters.

FIG. 22 is an enlarged detailed view of a portion of side seal bag 406 having side seal 408 outward of which is skirt 410 having tear initiator 412 and skirt 414 having tear initiator 416, with spot heat seals 418 and 420 at which skirt 410 is heat sealed to skirt 414. As with the embodiment of FIG. 21, those portions of the films within spot seals 418 and 420 are heatset, as are small areas of film surrounding the spot seals. In addition, the embodiment of FIG. 22 has grip assisting holes having borders 422 and 424 in first skirt 410, and respective grip assisting holes having borders 426 and 428 in skirt 414. Grip assisting holes bounded by borders 422, 424, 426, and 428 provide locations that are easier to grip for the purpose of initiating tears from tear initiators 412 and 416.

Figure 23:
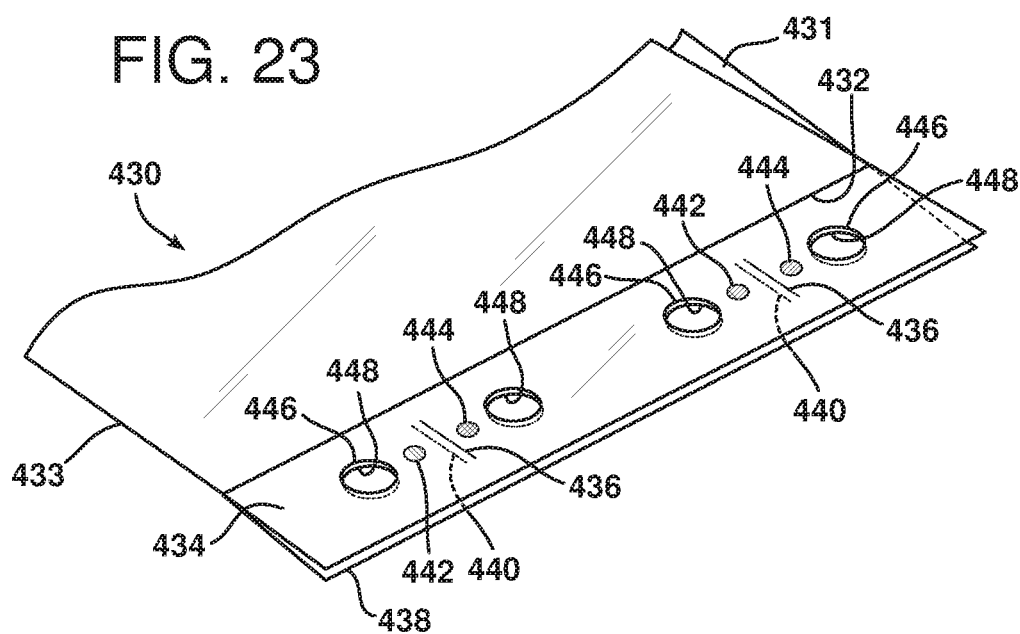
FIG. 23 is an enlarged, detailed view of a portion of a header or skirt having a plurality of pairs of tear initiators, with a pair of heatset, bonded regions associated with each pair of tear initiators and a pair of grip assisters associated with each pair of tear initiators.

FIG. 23 is an enlarged detailed view of a portion of side seal bag 430 having open top 431, folded bottom edge 433, side seal 432 outward of which is skirt 434 having a plurality of tear initiators 436, skirt 438 having a plurality of tear initiators 440, and a plurality of spot heat seals 442 and 444 on either side of each of tear initiators 436 and 440, at which skirt 434 is heat sealed to skirt 438. As with the embodiment of FIG. 21, those portions of the films within spot seals 442 and 444 are heatset, as are small areas of film surrounding spot seals 442 and 444. In addition, the embodiment of FIG. 23 has grip assisting holes having borders 446 on either side of each tear initiator 436 in first skirt 434, and respective grip assisting holes having borders 448 on either side of each tear initiator 440 in skirt 438. The embodiment of FIG. 23 provides multiple locations of paired tear initiators 436 and 440 so that portions of the package can be torn off, leaving a remainder of the film around the product in the bag. For purposes of simplicity, only two pairs of tear initiators are illustrated in FIG. 23.

Figure 24:
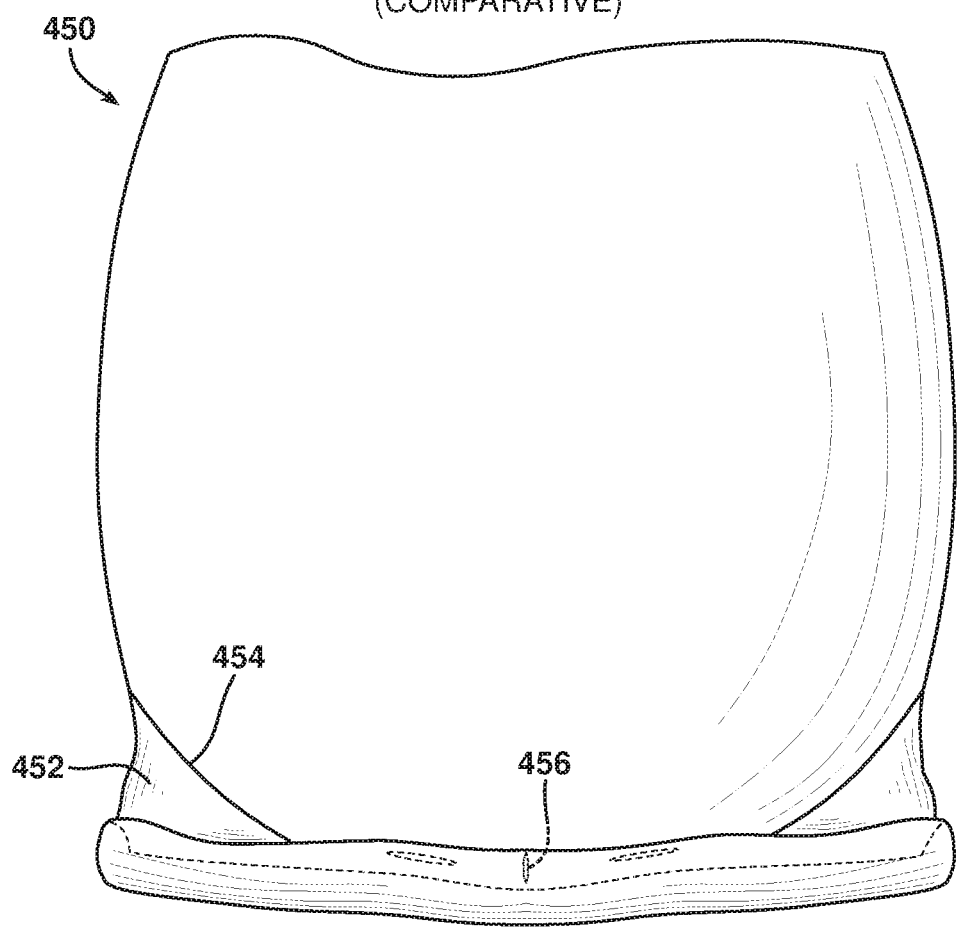
FIG. 24 is a perspective partial view of a packaged product made from an end-seal bag shrunk around a product, with curling of the shrunken skirt obscuring tear initiators and grip assisters.

FIG. 24 illustrates a perspective view of a portion of a comparative packaged product 450 made by placing a product into an end seal bag, after which the atmosphere is evacuated from the bag and the bag sealed closed with a heat seal made across the top of the bag (not illustrated), with the film having been shrunk tight against the product. The bag has a skirt (452) below end seal (454), with skirt (452) having two lay-flat sides, with each lay-flat side being provided with a tear initiator (456) therethrough. While the end seal bag is provided with tear initiators in the form of slits through each lay-flat side of the bag skirt, during shrinkage of the film the tear initiator slits take on the somewhat "pointed oval" shape of tear initiators 456, as illustrated in FIG. 24. The excess bag length has been trimmed off of the header (not illustrated) and the packaged product run through a shrink tunnel in which the film was heated and shrunk around the product. During shrinking of the film, skirt 452 undergoes substantially unrestrained free shrink and curling, thereby partially or fully obscuring tear initiators from direct view, making it more difficult to find and use the tear initiators.

Figure 25:
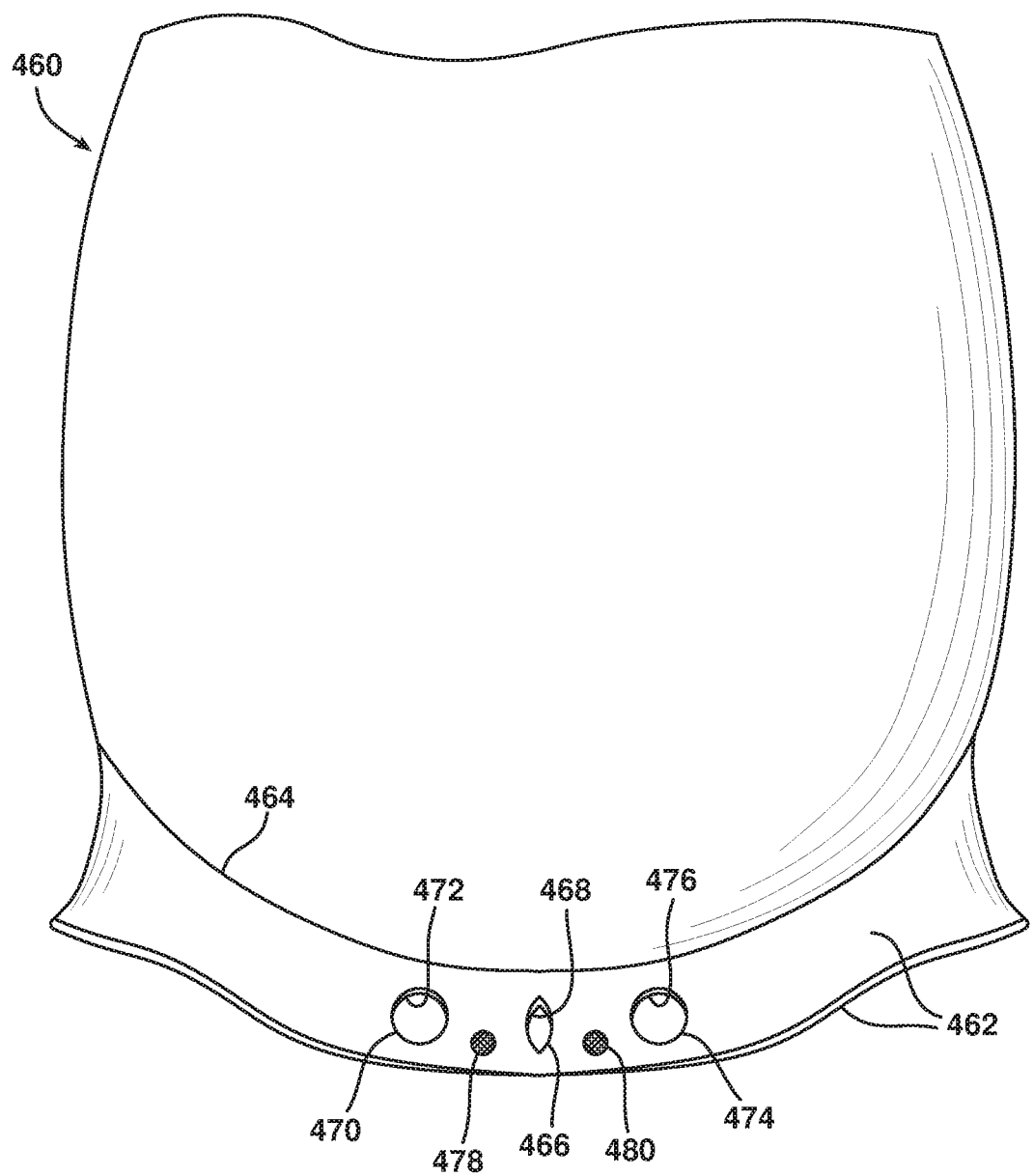
FIG. 25 is a perspective view of a packaged product as in FIG. 24, but with two spot seals of the skirt to itself.

FIG. 25 illustrates a perspective view of a portion of a packaged product 460 also made using an end seal bag from which the atmosphere is evacuated and the bag sealed closed with a heat seal made across the top of the bag (not illustrated), with the film having been shrunk tight against the product. Skirt (462) extends below end seal (464), with skirt (462) having two lay-flat sides, with each lay-flat side being provided with a tear initiator (466 and 468, respectively). During the shrinking of the film, transverse shrinkage causes tear initiation slits to take on the somewhat pointed oval shape of tear initiators 466 and 468 of FIG. 25. Grip assisting holes defined by borders 470 and 474 are located on either side of tear initiator 466, and grip assisting holes defined by borders 472 and 476 are located on either side of tear initiator 468. The two lay-flat sides of skirt 462 are also heat sealed together at spot seals 478 and 480. In addition to providing a mechanical bond of the lay-flat sides to one another to resist curling, the film is heatset in the region of spot seals 470 and 472, and an area extending radially outward a short distance around each of spot seals 470 and 472 is also heatset. The heatsetting of these portions of skirt 462 reduces shrinking of the skirt during the shrinking of the film, causing skirt 462 to undergo less free shrink and curling than would occur without the heatsetting. As a result, it is apparent from FIG. 25 that tear initiators 466 and 468, as well as grip assisting holes defined by borders 470, 472, 474, and 476, are more readily identified and used by a consumer, due to less shrinkage and less curing, making it easier to find and use the tear initiators 466 and 468 than for the embodiment of FIG. 24.

Figure 26:
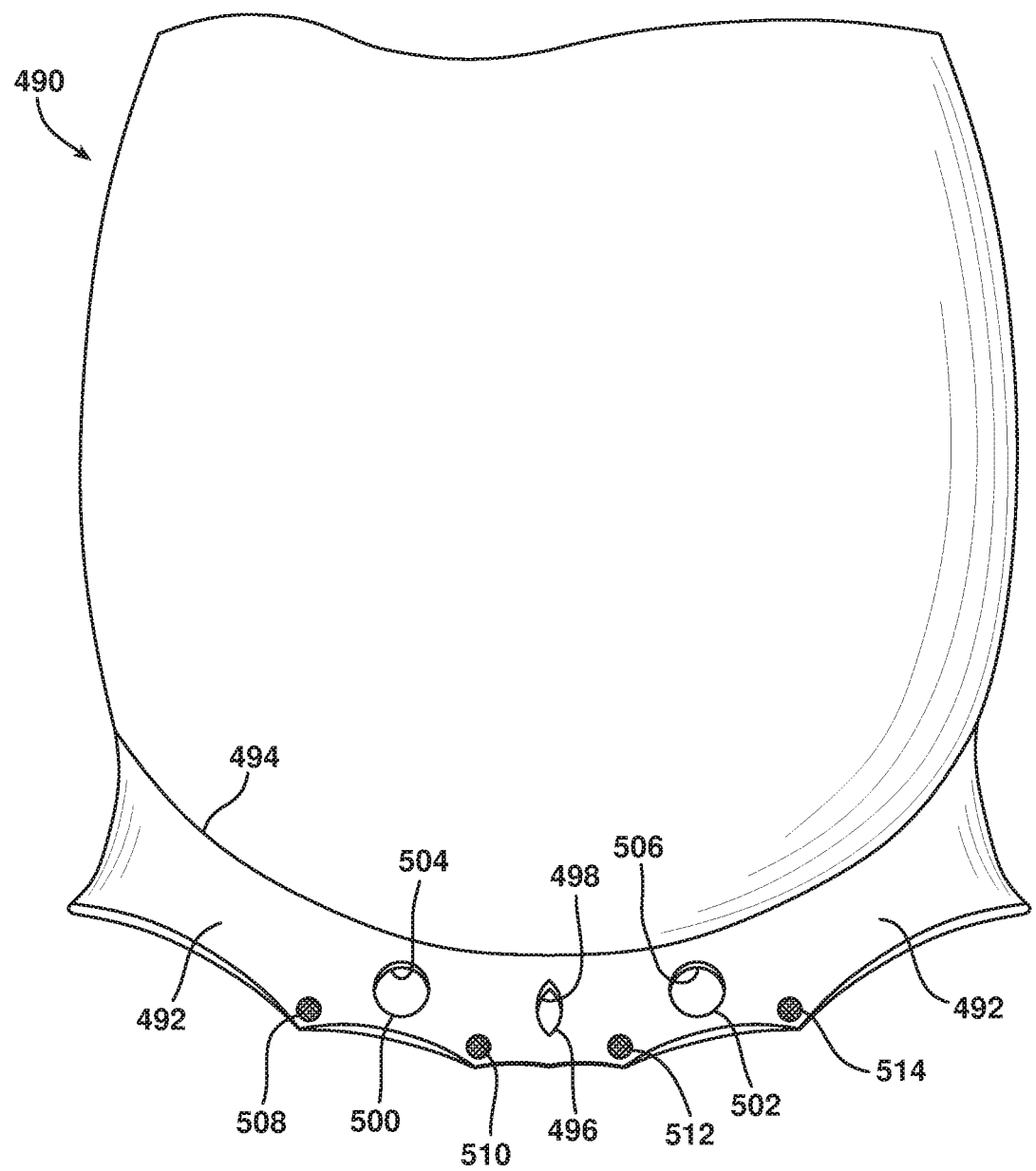
FIG. 26 is a perspective view of a packaged product as in FIG. 24, but with four spot seals of the skirt to itself.

FIG. 26 illustrates a perspective view of a portion of a packaged product 490 also made using an end seal bag from which the atmosphere is evacuated and the bag sealed closed with a heat seal made across the top of the bag (not illustrated), with the film having been shrunk tight against the product. As in the package of FIG. 25, packaged product 490 of FIG. 26 has skirt 492 extending below end seal (494), with skirt (492) having two lay-flat sides, each of which is provided with a tear initiator (496 and 498, respectively). Grip assisting holes defined by borders 500 and 502 are located on either side of tear initiator 496, and grip assisting holes defined by borders 504 and 506 are located on either side of tear initiator 498. The two lay-flat sides of skirt 462 are heat sealed together at four discrete spot seals: 508, 510, 512, and 514, each of which heatsets the film in the seal region as well as a region extending radially outward a short distance around each of the spot seals. The heatsetting of these portions of skirt 492 reduces shrinking of the skirt during the shrinking of the film, causing skirt 462 to undergo less free shrink and curling than would occur without the heatsetting. As a result, it is apparent from FIG. 26 that tear initiators 496 and 498, as well as grip assisting holes defined by borders 470, 472, 474, and 476, are even more readily apparent than in FIG. 25, making it still making it easier to find and use the tear initiators 466 and 468 than for the embodiment of FIG. 25.

Figure 27:
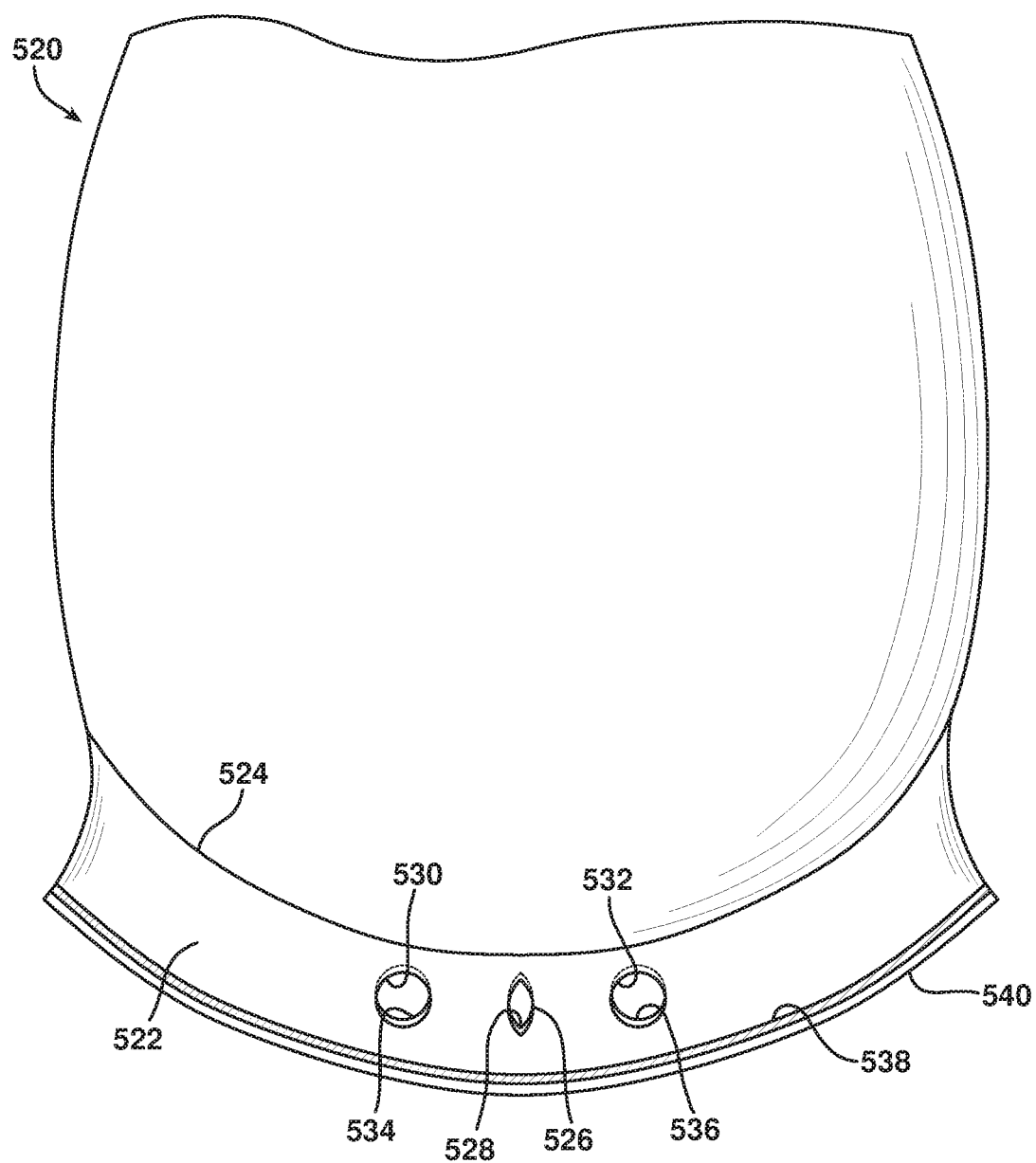
FIG. 27 is a perspective view of a packaged product as in FIG. 24, but with a perimeter seal of the skirt to itself.

FIG. 27 illustrates a perspective view of a portion of an alternative packaged product 520 also made using an end seal bag from which the atmosphere is evacuated and the bag sealed closed with a heat seal made across the top of the bag (not illustrated), with the film having been shrunk tight against the product. As in the package of FIG. 25, packaged product 520 of FIG. 27 has skirt 522 extending below end seal (524), with skirt (522) having two lay-flat sides, each of which is provided with a tear initiator (526 and 528, respectively). Grip assisting holes defined by borders 530 and 532 are located on either side of tear initiator 526, and grip assisting holes defined by borders 534 and 536 are located on either side of tear initiator 528. The two lay-flat sides of skirt 522 are heat sealed together at perimeter heat seal 538 that extends the full width of skirt 522 and is located near the bottom edge 540 of packaged product 520. Perimeter heat seal 540 heatsets the portion of the film in the seal region as well as a region extending outward a short in both directions from the seal itself.

The heatsetting of this portion of skirt 522 reduces shrinking of the skirt during the shrinking of the film, causing skirt 522 to undergo less free shrink and curling than would occur without the heatsetting. As a result, it is apparent from FIG. 27 that tear initiators 526 and 528, as well as grip assisting holes defined by borders 530, 532, 534, and 536, are in a configuration to be more easily seen by a consumer, and more readily used by a consumer. It also helps a consumer distinguish the design and intended use of the package. Less curling, together with the opening up of the tear initiation slits, makes it easier to place fingers through the grip assist holes. Less curling and the opening up of the tear initiation slits also makes it easier to utilize automated machinery to open the package. Heatsetting makes it easier to detect, find, and use tear initiators 526 and 528 as well as the grip assisting holes defined by borders 530, 532, 534, and 536. The heat setting of particular areas prevents shrink of the tab, makes them easier to grip, and allows the notches to open into an easily seen oval holes.

FIG. 28 illustrates a lay-flat schematic view of an alternative embodiment of a side-seal bag 550 having first side seal 552, second side seal 554, skirts 556 and 558 outward of first side seal 552, skirts 560 and 562 outward of second side seal 554, open top 564, and folded bottom edge 566. Skirt 556 has a plurality of first tear initiators 568 and skirt 558 has a plurality of second tear initiators (not illustrated), with the plurality of first tear initiators 568 being positioned at intervals along skirt 556, and the plurality of second tear initiators (not illustrated) being positioned at intervals along skirt 558. Each individual tear initiator 568 in skirt 556 is paired with an individual tear initiator (not illustrated) in skirt 558, to together provide a set of paired tear initiators. In FIG. 28, bag 550 is showing in lay-flat configuration, with each individual tear initiator 568 in skirt 556 being positioned directly over each individual tear initiator (not illustrated) in skirt 558. The film is heatset along the hatched perimeter area 570 of skirt 556 as well as a corresponding area (not illustrated) of skirt 558. Moreover, the film is heatset at hatched areas 572 and 574 along each side of each tear initiator 568, as well as at corresponding areas (not illustrated) along each side of each corresponding tear initiator (not illustrated) in skirt 558. While heatset areas 570, 572, and 574 of skirt 556, as well as corresponding heatset areas (not illustrated) of skirt 558 can be heated only enough to reduce the shrink of the areas, heatset areas 570, 572, and 574 of skirt 556 and corresponding areas of skirt 558 can further be heat sealed to one another. The heatsetting (and also any heat sealing) results in reduced shrinkage of the heated regions, thereby making it easier to detect, find, and use tear initiators. In addition, skirts 556 and 558 can be provided with grip assisting holes (not illustrated) on one or both sides of the tear initiators.

Resins Utilized in the Examples

Unless otherwise indicated, the following listing of resins identifies the various resins utilized in Examples 1-35 below.

| Resin code | Tradename | Generic Resin Name {additional information} | Density (g/cc) | Melt Index (dg/min) | Supplier |
|---|---|---|---|---|---|
| ION 1 | Surlyn ® 1702-1 | Zinc neutralized ethylene methacrylic acid copolymer | 0.940 | 14 | DuPont |
| ION 2 | Surlyn ® 1650 SB | Zinc neutralized ethylene methacrylic acid copolymer + slip additive | 0.950 | 1.55 | DuPont |
| SSPE 1 | Affinity ® 1280G | Homogeneous ethylene/alpha-olefin copolymer | 0.900 | 6.0 | Dow |
| SSPE 2 | Affinity ® PL 1281G1 | Homogeneous ethylene/octene copolymer | 0.900 g/cc | 6.0 | Dow |
| SSPE3 | Affinity ® PL 1850G | Homogeneous ethylene/octene copolymer | 0.902 | 3.0 | Dow |

-continued

| Resin code | Tradename | Generic Resin Name {additional information} | Density (g/cc) | Melt Index (dg/min) | Supplier |
|---|---|---|---|---|---|
| SSPE4 | Affinity ® PF 1140G | Homogeneous ethylene/octene copolymer | 0.8965 g/cc | 1.6 | Dow |
| SSPE5 | DPF 1150.03 | Homogeneous Ethylene/octene copolymer | 0.901 | 0.9 | Dow |
| SSPE6 | Exceed ® 4518 PA | Homogeneous Ethylene/hexene copolymer | 0.918 | 4.5 | Exxon Mobil |
| VLDPE 1 | XUS 61520.15L | Very low density polyethylene | 0.903 | 0.5 | Dow |
| VLDPE 2 | Attane ® 4203 | Very low density polyethylene | 0.905 | 0.80 | Dow |
| VLDPE 3 | Rexell ® V3401 | Very low density polyethylene | 0.915 | 6.6 | Huntsman |
| VLDPE 4 | ECD 364 | VLDPE (ethylene/hexene copolymer) | 0.912 | 1.0 | ExxonMobil |
| LLDPE 1 | Dowlex ® 2045.03 | Linear Low Density Polyethylene | 0.920 | 1.0 | Dow |
| LLDPE 2 | LL 3003.32 | Heterogeneous Ethylene/hexene copolymer | 0.9175 | 3.2 | Exxon Mobil |
| HDPE | Fortiflex ® T60-500-119 | High density polyethylene | 0.961 | 6.0 | Ineos |
| Ion&Eva&Pb | Appel 72D799 | Blend of ionomer, EVA, and polybutylene | 0.932 | 3.7 | DuPont |
| EVA&PP | Versify XUR-YM 2006268985 | Blend of EVA and Polypropylene | 0.89 | 3.0 | Dow |
| RECLAIM | TO35B | Recycled multilayer film containing wide variety of polymers, including ionomer resin, ethylene homo- and co-polymers, propylene homo- and co-polymers, EVOH, polyamide, anhydride modified polymers, ionomer, antiblock, etc. | — | — | Sealed Air Corp |
| PP1 | Inspire 112 | Propylene homopolymer | 0.9 | 0.4 | Dow |
| PP2 | Basell Pro-Fax PH835 | Propylene homopolymer | 0.902 | 34 | Basell Polyolefins |
| PP3 | PP3155 | Propylene homopolymer | 0.900 | 36 | Exxon Mobil |
| PP4 | Escorene ® PP 3445 | Propylene homopolymer | 0.900 | 36.0 | Exxon Mobil |
| PB | PB8640M | Butene homopolymer | 0.908 | 1 | Basell Polyolefins |
| ssPP | Eltex ® P KS 409 | Propylene/ethylene copolymer | 0.900 | 5.5 | Ineos |
| znPP | Escorene ® PP9012E1 | Propylene/ethylene copolymer | 0.902 | 6.00 | Ineos |
| EPC 1 | Pro-Fas SA 861 | Propylene/ethylene copolymer (single site catalyzed) | 0.902 | 6.5 | Lyondell - basell |
| Et—Pr TER | Vistalon 7800 | Ethylene-propylene diene terpolymer | 0.870 | 1.5 | Exxon Mobil |
| MA-LLD 1 | Tymor ® 1228B | Maleic anhydride modified polyethylene {blended with linear low density polyethylene} | 0.921 | 2.0 | Rohm & Haas |
| MA-LLD 2 | PX 3227 | Maleic anhydride modified polyethylene {blended with linear low density polyethylene} | 0.913 | 1.7 | Equistar Division of Lyondell |
| MA-LLD 3 | PX3236 | Maleic anhydride modified polyethylene {blended with linear low density polyethylene} | 0.922 | 2.00 | Equistar Division of Lyondell |
| MA-EVA | Bynel ® 3101 | Acid/Acrylate Anhydride-Modified Ethylene/Vinyl Acetate Copolymer | 0.943 | 3.2 | DuPont |
| modPP | Admer ® QB510A | Maleic anhydride modified polypropylene | 0.900 | 3.2 | Mitsui |

-continued

| Resin code | Tradename | Generic Resin Name {additional information} | Density (g/cc) | Melt Index (dg/min) | Supplier |
|---|---|---|---|---|---|
| modEVA | SPS-33C-3 | Compounded modified EVA polymer blend | 0.92 | 1.6 | MSI Technology |
| Et-Norb 1 | Topas ® 9506X1 | Ethylene norbornene copolymer | 0.974 | 1.0 | Topas Advanced Polymers Inc. |
| ET-Norb2 | Topas ® 8007 F-04 | Ethylene norbornene copolymer | 1.02 | 1.7 | Topas Advanced Polymers Inc. |
| Nylon 1 | Ultramid ® B40 | Polyamide 6 | 1.13 | — | BASF |
| Nylon 2 | Ultramid ® B40LN01 | Polyamide 6 | 1.14 | — | BASF |
| Nylon 3 | Ultramid ® C33 01 | Polyamide 6/66 | 1.13 | — | BASF |
| Nylon 4 | Grilamid XS 1392 | Blend of Polyamide 6/12 and Polyamide 12 | 1.03 | — | EMS-Grivory |
| EVA 1 | Escorene ® LD 713.93 | Ethylene/vinyl acetate copolymer (14.4% VA) | 0.933 | 3.5 | Exxon Mobil |
| EVA 2 | Escorene LD 318.92 | Ethylene/vinyl acetate copolymer (8.7% VA) | 0.93 | 2.0 | Exxon Mobil |
| EVA 3 | Escorene ® LD 761.36 | Ethylene/vinyl acetate copolymer (26.7% VA) | 0.950 | 5.75 | Exxon Mobil |
| EVA 4 | Escorene ® LD 705.MJ | Ethylene/vinyl acetate copolymer (12.8% VA) | 0.935 | 0.4 | Exxon Mobil |
| EVA 5 | Escorene ® LD 721.IK | Ethylene/vinyl acetate copolymer (18.5% VA) | 0.942 | 2.55 | Exxon Mobil |
| EVA 6 | Elvax ® 3175 | Ethylene/vinyl acetate copolymer (28% VA) | 0.950 | 6 | DuPont |
| EVA 7 | PE 1651 | Ethylene/vinyl acetate copolymer (6.5% VA) | 0.928 | 0.5 | Flint Hills Resources LP |
| EBA | SP 1802 | Ethylene/butyl acrylate copolymer (22.5% BA) | 0.928 | 6 | Eastman Chemical |
| EVOH | Soarnol ® ET3803 | Hydrolyzed ethylene vinyl acetate copolymer (EVOH with 38 mol % ethylene) | 1.17 | 3.2 | Nippon Gohsei |
| PVdC | Saran ® 806 | Vinylidene chloride/ methyl acrylate copolymer | 1.69 | — | Dow |
| Sty-But | Styrolux 656C | Styrene/butadiene copolymer | 1.02 | 99 | BASF |
| AOX | 10555 | Antioxidant in linear low density polyethylene | 0.932 | 2.5 | |
| SLIP 1 | FSU 93E | Slip and antiblock in low density polyethylene | 0.975 | 7.5 | Schulman |
| SLIP 2 | 1062 Ingenia | Slip masterbatch amide wax (erucamide) in linear low density polyethylene | 0.92 | 2 | Ingenia Polymers |
| WCC | 11853 | White color concentrate in linear low density polyethylene | 1.513 | 2.90 | Ampacet |
| CCC | 130374 | Cream color concentrate in low density polyethylene | — | — | Ampacet |
| BCC | 16417-81 blue | Blue color concentrate masterbatch | 0.951 | — | Colortech |
| ABConc | 18042 antiblock concentrate | Optical brightener in linear low density polyethylene | 0.92 | — | Teknor Color |
| procAID1 | 100458 | Processing aid: fluoropolymer in polyethylene | 0.93 | 2.3 | Ampacet |
| procAID2 | IP 1121 | Processing aid: fluoropolymer in linear low density polyethylene | 0.92 | 2 | Ampacet |

Example 1 (Working)

An end-seal bag approximately 7 to 8 inches wide (lay-flat) and approximately 16 inches long was made from a coextruded, multilayer, heat-shrinkable film produced utilizing the apparatus and process set forth in FIG. 8, described above. The multilayer film had a total of 7 layers, in the following order, with the thickness of each layer of the film shown in mils in the bottom row of each column representing a layer of the multilayer structure. The composition of each layer is provided in the second row, with each code corresponding with the composition in the resin table set forth above.

Example 1

| Layer 1 | Layer 2 | Layer 3 | Layer 4 | Layer 5 | Layer 6 | Layer 7 |
|---------|---------|---------|---------|---------|---------|---------|
| 80% SSPE1 20% LLDPE 2 | 70% VLDPE2 30% EVA1 | 100% EVA1 | PVDC | 100% EVA3 | 70% VLDPE1 30% EVA1 | 85% SSPE3 15% LLDPE 1 |
| 0.42 mil | 0.76 mil | 0.08 mil | 0.18 mil | 0.13 mil | 0.25 mil | 0.13 mils |

Both lay-flat sides of the skirt below the end-seal were manually slit (using scissors) about one to two inches from a side edge of the bag, the slit being in the machine direction, the slit extending from the bottom edge of the bag and across about 30 to 50 percent of the 1½ inch wide bag skirt, to produce first and second coincident tear initiators. The bag was then used to package a simulated product, after which it was tested for linear tearing in the machine direction after shrinking by immersion in 185° F. water. The simulated product was a simulated meat product, i.e., simulated by a sealed bag of water, the bag of water containing about 1300 milliliters of water in a heat-shrinkable bag having a lay-flat width of about 5½ inches and a length of about 9 inches, this bag having been sealed closed with the water therein (and minimal air) and thereafter immersed in water at 195° F. and shrunk tightly around the water to result in a simulated product having a substantially round cross sectional area. The bag of water was placed into the heat-shrinkable end-seal bag being tested, with the bag and simulated product then being placed into a vacuum chamber, and the atmosphere evacuated. The bag was then sealed closed and the resulting packaged product removed from the vacuum chamber and immersed in 185° F. water for about 5 seconds, during which the bag shrunk tightly around the simulated product. After removal from the hot water, the bag was allowed to stand for a period of at least 5 minutes, and thereafter a manual tear was made by grasping the shrunken skirt portion of the article on either side of the tear initiators. The manual machine direction tear test results are set forth in the table below, following the examples.

A plurality of side seal bags were produced using the film of Example 1. The bags had a lay-flat length of 13.5 inches and a lay-flat width of 6.25 inches. Each of the skirts had a width of 1 inch. Pairs of tear initiators were made at intervals of 1.5 inches down the full length of one of the skirts. Each of the tear initiators was a slit ⅝ inch long in the machine direction.

Example 2 (Working)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 2

| Layer 1 | Layer 2 | Layer 3 | Layer 4 | Layer 5 | Layer 6 | Layer 7 |
|---------|---------|---------|---------|---------|---------|---------|
| 80% SSPE2 20% LLDPE 2 | 70% VLDPE1 30% EVA1 | 100% EVA1 | PVDC | 100% EVA3 | 70% VLDPE1 30% EVA1 | 80% SSPE3 20% LLDPE 1 |
| 0.43 mil | 0.78 mil | 0.09 mil | 0.18 mil | 0.09 mil | 0.26 mil | 0.17 mils |

Example 3 (Comparative)

An end-seal bag was made from a coextruded, multilayer, heat-shrinkable film produced utilizing the apparatus and process set forth in FIG. 8, described above. The multilayer film had a total of 4 layers, with the order, thickness, and composition being set forth in the table below in a manner corresponding with the description in Example 1, above. The end-seal bag was tear-tested as set forth in Example 1.

Example 3 (Comparative)

| Layer 1 | Layer 2 | Layer 3 | Layer 4 |
|---------|---------|---------|---------|
| 100% VLDPE3 | 100% EVA2 | 100% PVDC | 100% EVA 2 |
| 0.26 mil | 1.26 mils | 0.18 mil | 0.6 mil |

Example 4 (Comparative)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 4 (Comparative)

| Layer 1 | Layer 2 | Layer 3 | Layer 4 | Layer 5 | Layer 6 | Layer 7 |
|---------|---------|---------|---------|---------|---------|---------|
| 90% SSPE1 10% SLIP1 | 80% VLDPE2 20% LLDPE1 | 100% EVA1 | PVDC | 100% EVA3 | 99% VLDPE2 1% AOX | 85% SSPE3 15% LLDPE 1 |
| 0.44 mil | 0.71 mil | 0.09 mil | 0.18 mil | 0.09 mil | 0.27 mil | 0.18 mils |

Example 5 (Comparative)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 5 (Comparative)

| Layer 1 | Layer 2 | Layer 3 | Layer 4 | Layer 5 | Layer 6 | Layer 7 |
|---|---|---|---|---|---|---|
| 80% SSPE2 20% LLDPE2 | 80% VLDPE1 20% VLDPE4 | 100% EVA1 | PVDC | 100% EVA3 | 80% VLDPE1 20% VLDPE4 | 80% SSPE3 20% LLDPE1 |
| 0.46 mil | 1.11 mil | 0.09 mil | 0.18 mil | 0.09 mil | 0.28 mil | 0.18 mils |

Example 6 (Comparative)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 6 (Comparative)

| Layer 1 | Layer 2 | Layer 3 | Layer 4 | Layer 5 | Layer 6 | Layer 7 |
|---|---|---|---|---|---|---|
| 90% SSPE1 10% SLIP 2 | 90% SSPE5 10% Et-PrTER | 100% EVA1 | PVDC | 100% EVA3 | 80% SSPE5 20% VLDPE1 | 100% SSPE3 |
| 0.49 mil | 0.89 mil | 0.1 mil | 0.19 mil | 0.1 mil | 0.26 mil | 0.18 mils |

Example 7 (Comparative)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 7 (Comparative)

| Layer 1 | Layer 2 | Layer 3 | Layer 4 | Layer 5 | Layer 6 | Layer 7 |
|---|---|---|---|---|---|---|
| 100% ION 1 | 100% EVA1 | 100% EVA1 | PVDC | 100% EVA3 | 100% SSPE4 | 85% SSPE3 15% LLDPE1 |
| 0.32 mil | 0.87 mil | 0.16 mil | 0.18 mil | 0.08 mil | 0.21 mil | 0.12 mils |

Example 8 (Comparative)

An end-seal bag was made from a coextruded, multilayer, heat-shrinkable film produced utilizing the apparatus and process set forth in FIG. 8, described above. The multilayer film had a total of 4 layers, with the order, thickness, and composition being set forth in the table below in a manner corresponding with the description in Example 1, above.

Example 8

| Layer 1 | Layer 2 | Layer 3 | Layer 4 |
|---|---|---|---|
| 100% SSPE6 | 84% LLDPE1 16% CCC | 85% EVA2 15% LLDPE1 | 85% EVA2 15% LLDPE1 |
| 0.25 mil | 1.09 mil | 0.76 mil | 0.25 mil |

Example 9 (Comparative)

An end-seal bag was made from a coextruded, multilayer, heat-shrinkable film produced utilizing the apparatus and process set forth in FIG. 8, described above. The multilayer film had a total of 6 layers, with the order, thickness, and composition being set forth in the table below in a manner corresponding with the description in Example 1, above.

Example 9

| Layer 1 | Layer 2 | Layer 3 | Layer 4 | Layer 5 | Layer 6 |
|---|---|---|---|---|---|
| 100% SSPE6 | 100% VLDPE2 | 100% EVA2 | 100% EVA2 | 100% VLDPE2 | 85% EVA2 15% LLDPE1 |
| 0.31 mil | 0.8 mil | 0.09 mil | 0.13 mil | 0.4 mil | 0.27 mils |

Example 10 (Comparative)

An end-seal bag was made from a coextruded, multilayer, heat-shrinkable film produced utilizing the apparatus and process set forth in FIG. 8, described above. The multilayer film had a total of 3 layers, with the order, thickness, and composition being set forth in the table below in a manner corresponding with the description in Example 1, above.

Example 10

| Layer 1 | Layer 2 | Layer 3 |
|---|---|---|
| 80% SSPE1 20% LLDPE2 | 100% EBA | 85% SSPE3 15% LLDPE1 |
| 0.08 mil | 1.84 mil | 0.08 mil |

Example 11 (Working)

An end-seal bag was made from a fully coextruded, multilayer, heat-shrinkable film produced utilizing the apparatus and process set forth in FIG. 8, described above, but without the extrusion coating step. The multilayer film had a total of 3 layers, with the order, thickness, and composition being set forth in the table below in a manner corresponding with the description in Example 1, above. The end-seal bag was tear-tested as set forth in Example 1.

Example 11 (Working)

| Layer 1 | Layer 2 | Layer 3 |
|---|---|---|
| 100% EVA 6 | 75% VLDPE2 25% LLDPE1 | 75% VLDPE2 16.5% LLDPE1 8.5% ABConc |
| 0.68 mil | 3.08 mil | 1.24 mil |

Example 12 (Working)

An end-seal bag marketed commercially by Curwood, Inc., under the name "Protite™ 34" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 12 (Working)

| Layer 1 | Layer 2 | Layer 3 |
|---|---|---|
| Blend of EVA (3% vinyl acetate), LLDPE, and metallocene-catalyzed ethylene/alpha-olefin copolymer | Polyvinylidene chloride | Blend of EVA (3% vinyl acetate), LLDPE, and metallocene-catalyzed ethylene/alpha-olefin copolymer |
| 1.53 mil | 0.21 mil | 0.74 mil |

Example 13 (Comparative)

An end-seal bag marketed commercially by Curwood, Inc., under the name "Cleartite™ 52" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 13 (Comparative)

| Layer 1 | Layer 2 | Layer 3 |
|---|---|---|
| Blend of EVA (4% vinyl acetate), LLDPE, and metallocene-catalyzed ethylene/alpha-olefin copolymer | Polyvinylidene chloride | Blend of EVA (4% vinyl acetate), LLDPE, and metallocene-catalyzed ethylene/alpha-olefin copolymer |
| 1.39 mil | 0.23 mil | 0.68 mil |

Example 14 (Comparative)

An end-seal bag marketed commercially by Curwood, Inc., under the name "Perflex™ 64" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 14 (Comparative)

| Layer 1 | Layer 2 | Layer 3 |
|---|---|---|
| Blend of EVA (4% vinyl acetate), LLDPE, and metallocene-catalyzed ethylene/alpha-olefin copolymer | Polyvinylidene chloride | Blend of EVA (4% vinyl acetate), LLDPE, and metallocene-catalyzed ethylene/alpha-olefin copolymer |
| 1.54 mil | 0.19 mil | 0.63 mil |

Example 15 (Comparative)

An end-seal bag marketed commercially by Asahi Corporation, under the name "SN3" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 15 (Comparative)

| Layer 1 | Layer 2 | Layer 3 | Layer 4 | Layer 5 |
|---|---|---|---|---|
| Polyethylene blend | Ethylene/vinyl acetate copolymer, containing (15 wt % vinyl acetate mer) | Polyvinylidene chloride | Ethylene/vinyl acetate copolymer, containing (15 wt % vinyl acetate mer) | Low Density Polyethylene (possibly a blend) |
| 0.39 mil | 0.7 | 0.35 mil | 0.66 | 0.63 mil |

Example 16 (Working)

An end-seal bag marketed commercially by Pechiney Plastic Packaging, Inc., under the name "Clearshield™" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 16 (Working)

| Layer 1 | Layer 2 | Layer 3 | Layer 4 | Layer 5 | Layer 6 | Layer 7 |
|---|---|---|---|---|---|---|
| Metallocene-catalyzed ethylene/alpha-olefin copolymer (possibly with LDPE or LLDPE) | 100% Ethylene/methyl acrylate copolymer | Blend of polyamide 6 with polyamide 6I, 6T | EVOH (27 mol % ethylene) | Blend of polyamide 6 with polyamide 6I, 6T | 100% Ethylene/methyl acrylate copolymer | Blend of low density polyethylene and linear low density polyethylene |
| 1.58 mil | 0.22 mil | 0.9 mil | 0.21 mil | 0.85 mil | 0.16 mil | 0.57 mil |

Example 17 (Working)

An end-seal bag was made from a coextruded, multilayer, heat-shrinkable film produced utilizing the apparatus and process set forth in FIG. 8, described above. The multilayer film had a total of 7 layers, with the order, thickness, and composition being set forth in the table below in a manner corresponding with the description in Example 1, above. The end-seal bag was tear-tested as set forth in Example 1.

Example 17 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Ion&Eva&PB | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process An end-seal bag was made from the coextruded, multi-layer, heat-shrinkable films of each of Examples 18 through 35, below, using the apparatus and process set forth in FIG. 5, described above. Each of the multilayer films had a total of 7 layers, with the order, thickness, and composition being set forth in the tables below in a manner corresponding with the description in Example 1, above. The end-seal bags were tear-tested as set forth in Example 1.

An end-seal bag was made from the fully coextruded, multilayer, heat-shrinkable films of each of Examples 36-42, below, using the apparatus and process set forth in FIG. 8, described above, except that all layers were extruded from die head 122, and no extrusion coating was employed. Each of the multilayer films of Examples 36-42 had the layer order, thickness, and composition set forth in the corresponding table below. The end-seal bags were tear-tested as set forth in Example 1.

Ten bags made from the film of Example 40 were filled with water and clipped. Before filling some of the bags with water, the header of the basgs were spot sealed. The bags were placed in a smokehouse for 12 hours at 195° F. After 12 hours, one of the bags had experienced a seal failure. Some bags had 2 spot seals and some had 4 spot seals. Spot seals improved the appearance of the header by preventing extreme curling of the header. The 4 spot seal bags had better appearance overall, making it easier to see the holes and slit of the header.

Example 18 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% EVA&PP | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 19 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 75% EVA2 25% modEVA 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 20 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% Et-Norb2 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mil$^t$ | 80% SSPE3 20% LLDPE1 1.5$^t$ |

$^t$thickness in table represents thickness of extrudate before solid state orientation at trapped bubble stage of process

Example 21 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% Et-Norb1 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 22 (Comparative)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% Sty-But 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 23 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% PP1 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 24 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 70% Sty-But 30% EVA5 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 25 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 70% Sty-But 30% EVA2 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 26 (Working)

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 70% VLDPE2 30% ET-Norb2 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 27 (Working)

| Layer 1 | Layer 2 | Layer 3 | Layer 4 | Layer 5 | Layer 6 | Layer 7 |
|---|---|---|---|---|---|---|
| 90% SSPE1 | 70% ssPP | 50% EVA4 | 100% PVdC | 100% EVA3 | 80% VLDPE1 | 80% SSPE3 |
| 10% SLIP2 | 30% SSPE3 | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 28 (Working)

| Layer 1 | Layer 2 | Layer 3 | Layer 4 | Layer 5 | Layer 6 | Layer 7 |
|---|---|---|---|---|---|---|
| 90% SSPE1 | 70% ssPP | 50% EVA4 | 100% PVdC | 100% EVA3 | 80% VLDPE1 | 80% SSPE3 |
| 10% SLIP2 | 30% EVA2 | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 29 (Working)

| Layer 1 | Layer 2 | Layer 3 | Layer 4 | Layer 5 | Layer 6 | Layer 7 |
|---|---|---|---|---|---|---|
| 90% SSPE1 | 80% SSPE3 | 50% EVA4 | 100% PVdC | 100% EVA3 | 80% VLDPE1 | 80% SSPE3 |
| 10% SLIP2 | 20% WCC | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 30 (Working)

| Layer 1 | Layer 2 | Layer 3 | Layer 4 | Layer 5 | Layer 6 | Layer 7 |
|---|---|---|---|---|---|---|
| 90% SSPE1 | 100% ION 2 | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 31 Working

| Layer 1 | Layer 2 | Layer 3 | Layer 4 | Layer 5 | Layer 6 | Layer 7 |
|---|---|---|---|---|---|---|
| 90% SSPE1 | 100% EVA6 | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 32 (Working)

| Layer 1 | Layer 2 | Layer 3 | Layer 4 | Layer 5 | Layer 6 | Layer 7 |
|---|---|---|---|---|---|---|
| 90% SSPE1 | 100% PB | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 33 (Working)

| Layer 1 | Layer 2 | Layer 3 | Layer 4 | Layer 5 | Layer 6 | Layer 7 |
|---|---|---|---|---|---|---|
| 90% SSPE1 | 85% SSPE1 | 50% EVA4 | 100% PVdC | 100% EVA3 | 80% VLDPE1 | 80% SSPE3 |
| 10% SLIP2 | 15% RECLAIM | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 34 (Working)

| Layer 1 | Layer 2 | Layer 3 | Layer 4 | Layer 5 | Layer 6 | Layer 7 |
|---|---|---|---|---|---|---|
| 90% SSPE1 | 70% SSPE1 | 50% EVA4 | 100% PVdC | 100% EVA3 | 80% VLDPE1 | 80% SSPE3 |
| 10% SLIP2 | 30% RECLAIM | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 35

| Layer 1 | Layer 2 | Layer 3 | Layer 4 | Layer 5 | Layer 6 | Layer 7 |
|---|---|---|---|---|---|---|
| 90% SSPE1 10% SLIP2 | 55% SSPE1 45% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 36

| Layer 1 | Layer 2 | Layer 3 | Layer 4 | Layer 5 |
|---|---|---|---|---|
| SSPE6 | 70% VLDPE4 30% EVA1 | EVA2 | 70% VLDPE4 30% EVA1 | 85% EVA2 15% LLDPE 1 |
| 3.5 | 9 | 0.22 | 4.5 | 3 |

$^t$thickness in table represents thickness of extrudate before solid state orientation at trapped bubble stage of process

Example 37

| Layer 1 | Layer 2 | Layer 3 |
|---|---|---|
| EPC 1 | 70% VLDPE4 30% EVA1 | 80% EVA-7 20% HDPE |
| 5 | 12 | 5.5 |

$^t$thickness in table represents thickness of extrudate before solid state orientation at trapped bubble stage of process

Example 38

| Layer 1 | Layer 2 | Layer 3 |
|---|---|---|
| 98% EPC1 2% BCC | 70% VLDPE4 30% EVA1 | 80% EVA-7 20% HDPE |
| 5 | 12 | 5.5 |

$^t$thickness in table represents thickness of extrudate before solid state orientation at trapped bubble stage of process

Example 39

| Layer 1 | Layer 2 | Layer 3 |
|---|---|---|
| EPC-1 | 70% VLDPE4 28% EVA1 2% BCC | 80% EVA-7 20% HDPE |
| 5 | 12 | 3.5 |

$^t$thickness in table represents thickness of extrudate before solid state orientation at trapped bubble stage of process

Example 40

| Layer 1 | Layer 2 | Layer 3 | Layer 4 |
|---|---|---|---|
| Nylon 3 | MALLD-2 | 70% VLDPE4 30% EVA1 | 80% EVA-7 20% HDPE |
| 2.00 | 1.00 | 10.00 | 3.50 |

$^t$thickness in table represents thickness of extrudate before solid state orientation at trapped bubble stage of process

Example 41

| Layer 1 | Layer 2 | Layer 3 | Layer 4 |
|---|---|---|---|
| 98% Nylon 3 2% BCC | MALLD-2 | 70% VLDPE4 30% EVA1 | 80% EVA-7 20% HDPE |
| 2 | 1 | 10 | 3.5 |

$^t$thickness in table represents thickness of extrudate before solid state orientation at trapped bubble stage of process

Example 42

| Layer 1 | Layer 2 | Layer 3 | Layer 4 |
|---|---|---|---|
| Nylon 3 | MALLD-2 | 70% VLDPE4 28% EVA1 2% BCC | 80% EVA-7 20% HDPE |
| 2 | 1 | 10 | 3.5 |

$^t$thickness in table represents thickness of extrudate before solid state orientation at trapped bubble stage of process A seamless film tubing of each of the films of Examples 1-35 is cut and sealed to form an end-seal bag. A small cut was made in the bag skirt, about 1 to 2 inches from the folded bag side edge. The bag skirt had a width of about 1.5 inches. A product was placed in the bag, and the bag was sealed closed and shrunk around the product. The resulting end-seal bags exhibit the following characteristics.

TABLE

Results of Bag Testing

| Bag of Example No. | Total Film Gauge (mils) | Free Shrink at 185° F. (% MD/% TD) | Straight, Full Length Manual MD Tear after shrinking in water at 185° F. | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 1 | 2.0 | 32/45 | Yes (94.4%)*** | 31 | — | 545 | 98 |
| 2 | 2.0 | 35/51 | Yes (90.5%)*** | 23 | 31 | 598 | 114* |
| 3 | 2.3 | — | No (5%)*** | 22 | 36 | 673 | 54.9* |
| 4 | 1.96 | — | No (0%)*** | 31 | 39 | 566 | 102.6* |
| 5 | 2.4 | — | No (0%)*** | 54 | 58 | 791 | 100* 114.3* 137.2* |
| 6 | 2.2 | — | No (0%)*** | 61 | 68 | 625 | 138.7* 104.5* |
| 7 | 1.9 | — | No (0%)*** | 28 | 34 | 659 | 102* |
| 8 | 2.35 | 17/28 | — | 24.8 | — | — | 113* |
| 9 | 2.0 | 26/42 | — | — | — | — | 110* |
| 10 | 2.0 | — | — | — | — | — | — |
| 11 | 5.0 | — | Yes | 50 | 86 | 1470 | 105* |
| 12 | 2.18 | 32/40 | Yes | 20 | 38 | 840 | 116.3 |
| 13 | 2.03 | 35/39 | No | 22 | 35 | 732 | 73.9 |
| 14 | 2.18 | 22/30* | No | 23 | 44 | 732 | — |
| 15 | 2.47 | 50/50 | No | 279 | 330 | 685 | 71.9 |
| 16 | 4.6 | — | Yes | 284 | 440 | 3110 | 155.0 |
| 17 | 2.42 | 24/36 | Yes (100%)** | 35 | — | 747 | — |
| 18 | 2.48 | 19/36 | Yes (100%)** | 205 | — | 797 | — |
| 19 | 2.48 | 20/35 | Yes (100%)** | 23 | — | 817 | — |
| 20 | — | — | Yes | — | — | — | — |
| 21 | 2.56 | 23/33 | Yes (100%)** | 21 | 30 | 676 | — |
| 22 | 2.53 | 24/36 | Yes (100%)** | 40 | — | 726 | — |
| 23 | 2.53 | 20/33 | Yes (100%)** | 21 | 29 | 724 | — |
| 24 | 2.5 | 23/34 | Yes (100%)** | 32 | 47 | 848 | — |
| 25 | 2.5 | 22/34 | Yes (100%)** | 22 | 35 | 707 | — |
| 26 | 2.51 | 24/32 | Yes (100%)** | 20 | 27 | 723 | — |
| 27 | 2.39 | 18/32 | Yes (100%)** | 13 | 23 | 843 | — |
| 28 | 2.36 | 15/34 | Yes (100%)** | 21 | — | 820 | — |
| 29 | 2.39 | 17/34 | Yes (100%)** | 17 | 30 | 643 | — |
| 30 | 2.29 | — | Yes (100%)** | 71.0 | 81 | 551 | — |
| 31 | 2.31 | — | Yes (100%)** | 15.3 | — | 557 | — |
| 32 | 2.18 | — | Yes (100%)** | 113.0 | 140 | 693 | — |
| 33 | 2.55 | — | Yes (100%)** | 55.0 | 50 | 427 | — |
| 34 | 2.41 | — | Yes (100%)** | 57.3 | 55 | 477 | — |
| 35 | 2.45 | — | Yes (100%)** | 40.2 | 46 | 638 | — |
| 36 | 2.0 | 26/37 | Yes**** (100%) | " | " | " | " |
| 37 | 2.34 | 14/26 | Yes**** (100%) | " | " | " | " |
| 38 | 2.4 | 19/32 | Yes**** (100%) | " | " | " | " |
| 39 | 2.4 | 19/29 | Yes**** (100%) | " | " | " | " |

TABLE-continued

Results of Bag Testing

| Bag of Example No. | Total Film Gauge (mils) | Free Shrink at 185° F. (% MD/% TD) | Straight, Full Length Manual MD Tear after shrinking in water at 185° F. | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 40 | 2.4 | 17/33 | Yes**** (100%) | " | " | " | " |
| 41 | 2.4 | 19/32 | Yes**** (100%) | " | " | " | " |
| 42 | 2.4 | 19/28 | Yes**** (100%) | " | " | " | " |

*impact strength tested on different sample of film with same designation
**test results based on tearing 5 samples
***test results based on tearing 20 samples
****test results based on tearing 10 samples The various preferred features in preferred embodiments of the invention as set forth above are useful in combination with one another. Any of the various preferred film compositions (e.g., blend of ethylene/hexene copolymer and ethylene/vinyl acetate copolymer) are preferred in combination with any one or more of the various preferred film properties (e.g., thickness of from 1.5 to 5 mils, peak load impact strength of from 50 to 250 Newtons, etc.) and/or in combination with any one or more preferred types of packaging articles (e.g., end-seal bag, etc).

What is claimed is:

1. A heat-shrinkable packaging article comprising a heat-shrinkable multilayer film having an inside seal layer heat sealed to itself at a heat seal, the article having a first side and a second side, the article having a skirt or header outward of the heat seal, the skirt or header comprising an article edge and a plurality of pairs of tear initiators, each pair of tear initiators having a first tear initiator and a second tear initiator, the first tear initiator being in the first side of the article, and the second tear initiator being in the second side of the article, each pair of tear initiators being at a location for generating a manually-initiated, manually-propagated first tear in the first side of the article, and a manually-initiated and manually-propagated second tear in the second side of the article, the first tear and the second tear each being capable of being propagated in a machine direction from the respective first and second tear initiators, with each tear being capable of being propagated in the machine direction through the heat seal and down the length of the article, or across the article, with each tear being capable of being manually propagated in the machine direction through and to an opposite article edge, so that upon using the multilayer film to make a packaged product by providing a product inside the article with the article being sealed closed around the product so that a package is formed, and thereafter shrinking the film around the product, the resulting package can be manually opened, with tearing from one or more of the pairs of tear initiators allowing a portion of the package to be removed from the packaged product so that an uncovered portion of the product can be separated from a remainder of the product, leaving a remainder of the package around at least a portion of the remainder of the product, by initiating first and second machine-direction tears from at least one pair of tear initiators, with the tears being propagated through the seal and toward the opposite edge of the article, with the multilayer film exhibiting a Peak Load Impact Strength of at least 50 Newtons per mil measured using ASTM D 3763-95A, with at least one layer of the multilayer film containing at least one incompatible polymer blend selected from the group consisting of:

(A) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent;

(B) a blend of ionomer resin with ethylene/unsaturated ester copolymer, and/or polybutylene, and/or propylene homopolymer and/or propylene copolymer;

(C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and/or antiblock;

(D) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer;

(E) a blend of from 90 to 15 weight percent ethylene/alpha-olefin copolymer with from 10 to 75 weight percent polypropylene and/or polybutylene and/or ethylene/norbornene;

(F) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer;

(G) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;

(H) a blend of polyamide with polystyrene and/or ethylene/alpha-olefin copolymer and/or ethylene/vinyl acetate copolymer and/or styrene/butadiene copolymer; and (I) a blend of polyamide 6 and polyamide 6I6T.

2. The heat-shrinkable packaging article according to claim 1, wherein the packaging article is a lay-flat, side-seal bag made from a seamless tubing, the side-seal bag having an open top, a folded bottom edge, and first and second side seals with respective first and second bag skirts outward of respective first and second side seals, with the plurality of pairs of tear initiators being spaced apart along the first bag skirt, with each tear being capable of being manually propagated across the full width of the side-seal bag through both side seals and through second skirt.

3. The heat-shrinkable packaging article according to claim 1, wherein at least a portion of the skirt or header comprising the plurality of tear initiators is heatset, in order to reduce the shrinkage of the skirt or header upon shrinking the film around the product.

4. The heat-shrinkable packaging article according to claim 3, wherein at least a portion of a first side of the skirt or header is heat sealed to the second side of the skirt or header in at least one heat seal.

5. The heat-shrinkable packaging article according to claim 4, wherein the first side of the skirt or header is heat sealed to the second side of the skirt or header in a plurality of spot seals.

6. The heat-shrinkable packaging article according to claim 4, wherein the first side of the skirt or header is heat sealed to the second side of the skirt or header in a heat seal along an outer edge of the skirt or header.

7. The heat-shrinkable packaging article according to claim 2, wherein the plurality of pairs of tear initiators are located at intervals of from 1 to 3 inches.

8. The heat-shrinkable packaging article according to claim 1, wherein each of the first tear initiators is coincident or substantially coincident with the second tear initiator with which it is paired, and each of the first tear initiators is a slit through the first side of the article, and each of the second tear initiators is a slit through the second side of the article, and each of the slits is oriented in the machine direction.

9. The heat-shrinkable packaging article according to claim 1, wherein the multilayer film has been biaxially oriented in the solid state and has a total free shrink, as measured by ASTM D 2732, of from 20 percent to 105 percent at 185° F.

10. The heat-shrinkable packaging article according to claim 9, wherein each of the slits is oriented within 20 degrees of the machine direction.

11. The heat-shrinkable packaging article according to claim 1, wherein the heat-shrinkable multilayer film exhibits a Peak Load Impact Strength, determined using ASTM D 3763-95A, of from 50 to 250 Newtons per mil, and the multilayer film has a total thickness, before shrinking, of from 1.5 mils to 5 mils.

12. The heat-shrinkable packaging article according to claim 1, wherein the multilayer film comprises an $O_2$-barrier layer and the multilayer film exhibits an oxygen transmission rate of from 1 to 20 cc/m$^2$ day atm at 23° C. and 100% relative humidity.

13. The heat-shrinkable packaging article according to claim 1, wherein the multilayer film comprises:
(A) a first layer that is an outer food-contact layer and that also serves as a seal layer, the first layer comprising a blend of homogeneous ethylene/alpha-olefin copolymer and linear low density polyethylene;
(B) a second layer comprising a blend of heterogeneous ethylene/alpha-olefin copolymer and ethylene/vinyl acetate copolymer;
(C) a third layer comprising ethylene/vinyl acetate copolymer;
(D) a fourth layer comprising polyvinylidene chloride;
(E) a fifth layer comprising ethylene/vinyl acetate copolymer;
(F) a sixth layer comprising a blend of heterogeneous ethylene/alpha-olefin copolymer and ethylene/vinyl acetate copolymer; and
(G) a seventh layer comprising a blend of homogeneous ethylene/alpha-olefin copolymer and linear low density polyethylene; and
wherein the layers are present in the order of first/second/third/fourth/fifth/sixth/seventh.

14. The heat-shrinkable packaging article according to claim 1, wherein the header or skirt further comprises at least one grip assister for assisting grip of the multilayer film during manual tearing.

15. The heat-shrinkable article according to claim 1, wherein a portion of the skirt or header on the first side of the article is heatset, and a corresponding portion of the skirt or header on the second side of the article is also heat-set.

16. The heat-shrinkable article according to claim 1, wherein the heat-set portions of the first and seconds sides of the skirt or header comprise a perimeter seal in the skirt or header.

17. The heat-shrinkable article according to claim 1, wherein at least one of the first tear initiators aligns directly over at least one of the second tear initiators, and the skirt or header further comprises a first spot seal within 1 inch of at least one of the first and second tear initiators and a first end of the skirt, and a second spot seal within 1 inch of at least one of the first and second tear initiators and a second end of the skirt or header.

18. The heat-shrinkable packaging article according to claim 1, wherein the multilayer film has an oxygen transmission rate of at least 50 cc/m$^2$ day at stp and 100% relative humidity.

19. The heat-shrinkable packaging article according to claim 1, wherein the multilayer film has a non-symmetrical polymeric layer arrangement.

20. A method of opening the heat-shrinkable packaging article of claim 1 comprising the steps of:
(A) gripping the heat-shrinkable packaging article;
(B) tearing the heat-shrinkable packaging along a substantially linear tear along at least one pair of tear initiators exposing a portion of a product from inside the heat-shrinkable packaging article; and
(C) whereby the portion of the product not exposed remains covered by the heat-shrinkable packaging article.

* * * * *